(12) United States Patent
Onoe et al.

(10) Patent No.: US 8,158,727 B2
(45) Date of Patent: Apr. 17, 2012

(54) AQUEOUS RESIN DISPERSION, METHOD FOR ITS PRODUCTION, COATING MATERIAL AND LAMINATE

(75) Inventors: Masato Onoe, Yokkaichi (JP); Toshiya Seko, Yokkaichi (JP); Yongwoo Shin, Yokohama (JP); Yongjun Jang, Yokohama (JP); Fumihiko Shimizu, Yokohama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 1129 days.

(21) Appl. No.: 11/916,384

(22) PCT Filed: Jun. 2, 2006

(86) PCT No.: PCT/JP2006/311120
§ 371 (c)(1),
(2), (4) Date: Dec. 3, 2007

(87) PCT Pub. No.: WO2006/129804
PCT Pub. Date: Dec. 7, 2006

(65) Prior Publication Data
US 2009/0226728 A1    Sep. 10, 2009

(30) Foreign Application Priority Data

| Jun. 3, 2005 | (JP) | 2005-164597 |
| Jul. 7, 2005 | (JP) | 2005-199454 |
| Feb. 16, 2006 | (JP) | 2006-039898 |
| Mar. 29, 2006 | (JP) | 2006-092591 |

(51) Int. Cl.
*C08C 19/28* (2006.01)
(52) U.S. Cl. ............... 525/385; 525/326.1; 525/383; 525/386
(58) Field of Classification Search ............ 525/326.1, 525/383, 386, 385
See application file for complete search history.

(56) References Cited

U.S. PATENT DOCUMENTS

| 5,534,577 | A | 7/1996 | Namba et al. | |
| 5,965,667 | A | 10/1999 | Evans et al. | |
| 6,140,416 | A | 10/2000 | Evans et al. | |
| 6,451,901 | B1* | 9/2002 | Maekawa et al. | 524/505 |
| 6,774,181 | B1* | 8/2004 | Bechara et al. | 525/66 |
| 2002/0198298 | A1 | 12/2002 | Arikawa et al. | |
| 2003/0055179 | A1* | 3/2003 | Ota et al. | 525/242 |
| 2003/0153686 | A1 | 8/2003 | Onoe et al. | |
| 2005/0124753 | A1* | 6/2005 | Ashihara et al. | 524/543 |
| 2005/0143527 | A1* | 6/2005 | Tsuneka et al. | 525/326.1 |
| 2005/0176888 | A1 | 8/2005 | Schauder et al. | |
| 2006/0025535 | A1 | 2/2006 | Onoe et al. | |
| 2006/0281859 | A1 | 12/2006 | Suzuki et al. | |
| 2007/0004847 | A1 | 1/2007 | Ozaki et al. | |
| 2007/0037923 | A1 | 2/2007 | Shiba et al. | |
| 2009/0092847 | A1 | 4/2009 | Onoe et al. | |
| 2009/0226728 | A1 | 9/2009 | Onoe et al. | |

FOREIGN PATENT DOCUMENTS

| CN | 1109706 C | 5/2003 |
| EP | 0 634 424 A1 | 1/1995 |
| EP | 1 162 233 A1 | 12/2001 |
| EP | 1 423 441 B1 | 11/2005 |
| EP | 1 719 786 A1 | 11/2006 |
| EP | 1 780 249 A1 | 5/2007 |
| JP | 50-58188 | 5/1975 |
| JP | 1-256556 | 10/1989 |
| JP | 3-182534 | 8/1991 |
| JP | 4-88026 | 3/1992 |
| JP | 4-89833 | 3/1992 |
| JP | 6-80738 | 3/1994 |
| JP | 6-80845 | 3/1994 |
| JP | 7-109359 | 4/1995 |
| JP | 7-145216 | 6/1995 |
| JP | 10-273570 | 10/1998 |
| JP | 11-269206 | 10/1999 |
| JP | 2000-302873 | 10/2000 |
| JP | 2001-64396 | 3/2001 |
| JP | 2004-18659 | 1/2004 |
| JP | 2004-83787 | 3/2004 |
| JP | 2004-115712 | 4/2004 |
| JP | 2005-8813 | 1/2005 |
| JP | 2005-126483 | 5/2005 |
| JP | 2005-126615 | 5/2005 |
| JP | 2005-272793 | 10/2005 |
| JP | 2006-83373 | 3/2006 |
| JP | 2007-246871 | 9/2007 |
| JP | 2007-270122 | 10/2007 |
| JP | 2009-287034 | 12/2009 |
| JP | 2010-185084 | 8/2010 |
| JP | 2010-189658 | 9/2010 |
| WO | WO 02/36651 A1 | 5/2002 |
| WO | 2004-104090 | 12/2004 |
| WO | WO 2005/005521 A1 | 1/2005 |

OTHER PUBLICATIONS

Japanese Office Action issued Dec. 14, 2010, in Patent Application No. 2006-325899 (with English-language translation).
Japanese Office Action issued Dec. 14, 2010, in Patent Application No. 2009-203942 (with English-language translation).
"The JEFFAMINE® Polyoxyalkyleneamines", Mitsui Fine Chemicals, Inc. Fine Chemicals Division websites, Apr. 1, 2004,14 pages (with English Translation).
U.S. Appl. No. 12/282,353, filed Sep. 10, 2008, Onoe, et al.
Jiang-Jen Lin, et al., "Synthesis, Characterization, and Interfacial Behaviors of Poly(oxyethylene)-Grafted SEBS Copolymers", Ind. Eng. Chem. Res., vol. 39, No. 1, 2000, pp. 65-71.

* cited by examiner

*Primary Examiner* — Ling-Siu Choi
(74) *Attorney, Agent, or Firm* — Oblon, Spivak, McClelland, Maier & Neustadt, L.L.P.

(57) ABSTRACT

To provide an aqueous dispersion of a resin wherein dispersed particles are stable with fine particle sizes and whereby bleeding out is suppressed, which is thus useful as e.g. a surface treating agent for a polyolefin substrate, an adhesive or a coating material.
A resin dispersion having dispersed in water a polymer (C) having a hydrophilic polymer (B) bonded to a polyolefin (A) in a ratio of (A):(B)=100:5 to 100:500 (weight ratio); a method for producing the resin dispersion; and a coating material and a laminate, employing it.

12 Claims, No Drawings

AQUEOUS RESIN DISPERSION, METHOD FOR ITS PRODUCTION, COATING MATERIAL AND LAMINATE

TECHNICAL FIELD

The present invention relates to an aqueous resin dispersion containing a polyolefin resin, a coating material containing it, a laminate and a method for producing the aqueous resin dispersion.

BACKGROUND ART

Polyolefins such as propylene polymers or propylene-α-olefin copolymers are inexpensive and yet excellent in mechanical properties, heat resistance, chemical resistance, water resistance, etc., and thus, they are used in various fields. However, such polyolefins have no polar groups in their molecules and thus are usually of low polarity and difficult to bond or apply for coating, and their improvements have been desired. Accordingly, various treatments have been tried such as chemical treatment of the surface of a polyolefin molded product with a reagent or the like, or oxidation treatment of the surface of a molded product by such a means as corona discharge treatment, plasma treatment or flame treatment. However, such methods not only require special apparatus but also the effects for improving the coating property or the adhesive property have not been necessarily adequate.

Therefore, in an attempt to impart a good coating property or adhesive property to a polyolefin such as a propylene polymer by a relatively simple method, a so-called chlorinated polypropylene or an acid-modified propylene-α-olefin copolymer, and further an acid-modified chlorinated polypropylene have been developed. Such a modified polyolefin is applied to the surface of a polyolefin molded product as a surface treating agent, an adhesive or a coating material. The modified polyolefin is usually applied in the form of a solution in an organic solvent or a dispersion in water. With a view to safety and health, and reduction of environment pollution, an aqueous dispersion is usually preferably employed.

For example, an aqueous resin dispersion having an acid-modified chlorinated polypropylene hydrophilically modified by using a surfactant and a basic substance (JP-A-3-182534) or an aqueous resin dispersion having an acid-modified polyolefin hydrophilically modified by using a surfactant and a basic substance (JP-A-6-256592 (U.S. Pat. No. 5,534,577), JP-A-2004-002842 (US2005-124753)) may be mentioned. However, such a method has had a problem that in order to make dispersed particle sizes to be fine, it is required to add a large amount of a surfactant, and consequently, a coating material employing such an aqueous dispersion is poor in water resistance or chemical resistance. Further, after coating, the surfactant may sometimes bleed out on the coated surface, thus leading to a defective appearance. Thus, a further improvement has been desired.

Further, there is an aqueous resin dispersion having dispersed in water a polymer having functional segments block-copolymerized to polyolefin segments (JP-A-2001-288372 (US2003-055179). However, the dispersed particle sizes can not be said to be sufficiently fine, and it is not possible to form the dispersion without using a surfactant at all, and a further improvement has been desired.

Further, in a case where the above-mentioned modified polyolefin is to be used as a water base paint or ink, in order to satisfy the performance other than the adhesion, it is common to incorporate a binder resin such as an acrylic resin, a polyurethane resin, a polyester resin, a vinyl acetate resin or an epoxy resin, or a pigment such as titanium oxide or carbon black, as the case requires. However, such components usually do not have high adhesion to a propylene polymer substrate, and accordingly, there is a problem such that even if the propylene polymer resin itself may have a sufficient substrate adhesion, after mixing, the substrate adhesion substantially decreases.

Therefore, there is a case of a water base paint wherein an ethylene polymer resin having a small particle size is incorporated to a binder resin such as an acrylic resin (JP-A-2004-083787). However, as compared with such an ethylene polymer, with a propylene polymer, emulsification is further difficult, and with respect to a water base paint containing a propylene polymer, it has been strongly desired to solve the above-mentioned problem.

On the other hand, a polyolefin has a low polarity as mentioned above and is thus difficult to emulsify. It has been attempted to emulsify it by using a large amount of a surfactant, or to make the particle size to be fine by using a special emulsifier. For example, an emulsion having a modified polyolefin dissolved in e.g. an aromatic solvent and hydrophilically modified by using a basic substance or a surfactant (JP-A-01-256556) or a method for producing an aqueous resin composition employing an emulsifying machine having a special finely pulverizing mechanism (JP-A-11-269206) has been proposed. However, in the method disclosed in JP-A-01-256556, the dispersed particle sizes of the emulsion are as large as from 0.5 to 7 μm, whereby there has been a problem from the viewpoint of the dispersion stability. Further, in the method disclosed in JP-A-11-269206, a special emulsifying machine is employed, where the cost will increase, and practically, a surfactant or a basic substance is essentially required, and there has been a problem that the particle size of the aqueous dispersion is limited to a level of about 0.15 μm, and the blending property is poor when blended with an emulsion having a finner particle size.

As a method to make the dispersed particle size to be fine, a method has also been proposed wherein a modified polyolefin is dissolved in an ether solvent such as propylene glycol monopropyl ether, and water is dropwise added and dispersed in the presence of a base, whereupon the solvent is distilled off (JP-A-2004-018659 (US2005-143527)). However, such an ether solvent is compatible infinitely with water at a commonly employed temperature of from room temperature to the boiling point, whereby water and the ether can not be separated by liquid-liquid separation after the distillation. Accordingly, the distilled solvent is required to be entirely recovered by distillation, thus leading to problems from the environmental and process aspects. Or, a highly hydrophobic polyolefin has a low solubility in an ether solvent and is hardly soluble unless it is in a state having polar groups added to the polyolefin to some extent. Therefore, there is a problem such that an ether solvent can not be used as a solvent for a polymerization reaction or a modifying reaction of a polyolefin.

DISCLOSURE OF THE INVENTION

Means to Solve Problems

The present inventors have conducted an expensive research to solve the above-described problems and has arrived at the present invention. The present invention includes the following first, second, third and fourth embodiments.

Namely, the first embodiment of the present invention is based on a discovery such that a resin dispersion having excellent characteristics can be obtained by bonding a hydrophilic polymer in a prescribed ratio to a polyolefin and dispersing such a polyolefin in water and provides the following 1 to 18. Further, the second embodiment of the present invention is based on a discovery such that an aqueous resin dispersion having a polymer containing a propylene polymer and a specific resin dispersed respectively in water, wherein they are in a specific relation, has an excellent adhesion to a polyolefin substrate and excellent moisture resistance and oil resistance, and provides the following 19 to 35. Further, the third embodiment of the present invention is based on a discovery such that such an excellent aqueous resin dispersion can simply be produced by dissolving a modified polyolefin in a small amount of a solvent which can be mixed with water, then dropwise adding water to disperse the modified polyolefin, followed by distilling off the solvent, and provides the following 36 to 39. Further, the fourth embodiment of the present invention is based on such a discovery that such an excellent aqueous resin dispersion can simply be produced by dropwise adding a mixed solvent of a hydrophilic solvent and water to a solution having a modified polyolefin dissolved in a good solvent to disperse the modified polyolefin, and distilling off the two types of solvents, and provides the following 40 to 53.

1. An aqueous resin dispersion having dispersed in water a polymer (C) having a hydrophilic polymer (B) bonded to a polyolefin (A) in a ratio of (A):(B)=100:5 to 100:500 (weight ratio).

2. The aqueous resin dispersion, wherein the polymer (C) is dispersed in water with its 50% particle diameter of at most 0.5 µm.

3. The aqueous resin dispersion, wherein the polymer (C) is dispersed in water with its 50% particle diameter of at most 0.2 µm.

4. The aqueous resin dispersion, which contains a surfactant in an amount of at most 10 parts by weight per 100 parts by weight of the polymer (C).

5. The aqueous resin dispersion, wherein the polyolefin (A) contains substantially no chlorine.

6. The aqueous resin dispersion, wherein the hydrophilic polymer (B) is bonded in an amount of from 0.01 to 5 mmol per 1 g of the polyolefin (A).

7. The aqueous resin dispersion, wherein the polyolefin (A) is a stereo-block polypropylene polymer having isotactic blocks and atactic blocks and having a propylene content of at least 50 mol %, and/or a propylene-α-olefin copolymer.

8. The aqueous resin dispersion, wherein the polyolefin (A) has at least one member selected from the group consisting of a carboxylic acid group, a dicarboxylic anhydride group and a dicarboxylic anhydride monoester group.

9. The aqueous resin dispersion, wherein the polymer (C) is a graft copolymer having the hydrophilic polymer (B) graft-bonded to the polyolefin (A).

10. The aqueous resin dispersion, wherein the hydrophilic polymer (B) is a polyether resin.

11. The aqueous resin dispersion, wherein the hydrophilic polymer (B) has at least one reactive group per molecule.

12. The aqueous resin dispersion, wherein the hydrophilic polymer (B) has at least an amino group as the reactive group.

13. A method for producing an aqueous resin dispersion having dispersed in water a polymer (C) having a hydrophilic polymer (B) bonded to a polyolefin (A) in a ratio of (A):(B)=100:5 to 100:500 (weight ratio), which comprises preparing a mixture of the polymer (C), water and a solvent other than water, and then, removing the solvent from the mixture to obtain the resin composition.

14. The method for producing an aqueous resin dispersion, wherein the polymer (C) is dissolved in the solvent other than water, and then, water is added to prepare the mixture.

15. A coating material made of the aqueous resin dispersion.

16. A laminate having formed on a thermoplastic resin-molded product (F) a layer comprising a polymer (C) having a hydrophilic polymer (B) bonded to a polyolefin (A) in a ratio of (A):(B)=100:5 to 100:500 (weight ratio).

17. A laminate having a resin layer formed by applying and heating the aqueous resin dispersion or the coating material, on a thermoplastic resin-molded product (F).

18. A method for producing a laminate, which comprises forming a resin layer by applying and heating the aqueous resin dispersion or the coating material, on a thermoplastic resin-molded product (F).

19. An aqueous resin dispersion which has particles made of a polymer (IC) containing a propylene polymer (IA) and particles made of at least one resin (ID) selected from the group consisting of an acrylic resin, a polyester resin, a polyurethane resin, an epoxy resin and a vinyl ester resin, respectively dispersed in water, and which satisfies the following (1) to (4):

(1) the weight ratio of the propylene polymer (IA) to the resin (ID) is from 90:10 to 10:90, (2) the weight ratio of the total amount of the polymer (IC) and the resin (ID) to water is from 5:95 to 60:40, (3) the content of a surfactant is at most 10 parts by weight per 100 parts by weight of the total amount of the polymer (IC) and the resin (ID), and (4) the 50% particle diameter of the particles made of the polymer (IC) is at most 0.5 µm and at most 0.9 time of the 50% particle diameter of the particles of the resin (ID).

20. The aqueous resin dispersion, wherein the polymer (IC) is a polymer having a hydrophilic polymer (IB) bonded to the propylene polymer (IA) in a ratio of (IA):(IB)=100:5 to 100:500 (weight ratio).

21. The aqueous resin dispersion, wherein the polymer (IC) is a polymer having the hydrophilic polymer (IB) bonded in an amount of from 0.01 to 5 mmol per 1 g of the propylene polymer (IA).

22. The aqueous resin dispersion, wherein the polymer (IC) is a graft copolymer having a hydrophilic polymer (IB) graft-bonded to the propylene polymer (IA).

23. The aqueous resin dispersion, wherein the polymer (IC) is a polymer having a carboxylic acid derivative group bonded to the propylene polymer (IA) in an amount of from 0.01 to 5 mmol/g as calculated as a group represented by —C(=O)O— and wherein the hydrophilic polymer (IB) is bonded to the carboxylic acid derivative group.

24. The aqueous resin dispersion, wherein the hydrophilic polymer (IB) is a polyether resin having an amino group.

25. The aqueous resin dispersion, wherein the polymer (IC) is one having a carboxylic acid derivative group bonded to the propylene polymer (IA).

26. The aqueous resin dispersion, wherein the propylene polymer (IA) is a stereo-block polypropylene polymer having isotactic blocks and atactic blocks.

27. The aqueous resin dispersion, wherein the propylene polymer (IA) is a stereo-block polypropylene polymer containing isotactic blocks and atactic blocks, and when peaks derived from the carbon atom of a methyl group of a propylene unit chain portion of a head-to-tail linkage, are observed by $^{13}$C-NMR and the chemical shift of a peak top of a peak attributable to a pentad represented by mmmm is set to be 21.8 ppm, the ratio ($S_1/S$) of the area $S_1$ of a peak having a peak top at 21.8 ppm to the total area S of peaks appearing from 19.8 ppm to 22.1 ppm, is from 20% to 70%, and when the area of a peak (mmmr) having a peak top from 21.5 to 21.7 ppm is represented by $S_2$, $4+2S_1/S_2>5$.

28. The aqueous resin dispersion, wherein the propylene polymer (IA) is a propylene-1-butene copolymer having a propylene content of from 50 mol % to 95 mol %, and the copolymer (IA) has a molecular weight distribution Mw/Mn of at most 3.0 and a melting point Tm of at most 120° C.

29. The aqueous resin dispersion, wherein the propylene polymer (IA) is produced by using a metallocene catalyst.

30. The aqueous resin dispersion, which further contains a pigment (IE), wherein the weight ratio of the total amount of the polymer (IC) and the resin (ID) to the pigment (IE) is from 100:10 to 100:400.

31. A method for producing an aqueous resin dispersion, which comprises mixing a dispersion having dispersed in water a polymer (IC) having a hydrophilic polymer (IB) bonded to a propylene polymer (IA) in a ratio of (IA):(IB) =100:5 to 100:500 (weight ratio) and a dispersion having dispersed in water at least one resin (ID) selected from the group consisting of an acrylic resin, a polyester resin, a polyurethane resin, an epoxy resin and a vinyl ester resin, to obtain an aqueous resin dispersion wherein the weight ratio of the propylene polymer (IA) to the resin (ID) is from 90:10 to 10:90, and the weight ratio of the total amount of the polymer (IC) and the resin (ID) to water is from 5:95 to 60:40.

32. A coating material made of the aqueous resin dispersion.

33. A method for producing a laminate, which comprises forming a resin layer by applying and heating the aqueous resin dispersion or the coating material, on a thermoplastic resin-molded product (F).

34. A laminate having formed on a thermoplastic resin-molded product (IF) a layer comprising a polymer (IC) containing a propylene polymer (IA) and at least one resin (ID) selected from the group consisting of an acrylic resin, a polyester resin, a polyurethane resin, an epoxy resin and a vinyl ester resin in a weight ratio of (IA):(ID)=90:10 to 10:90 and having a surfactant content of at most 10 parts by weight per 100 parts by weight of the total amount of the polymer (IC) and the resin (ID).

35. A laminate having a resin layer formed by applying and heating the aqueous resin dispersion or the coating material, on a thermoplastic resin-molded product (IF).

36. A method for producing an aqueous resin dispersion, which is a method for producing a resin dispersion comprising a modified polyolefin and water, and which comprises a dissolving step of dissolving the modified polyolefin in a solvent (a) wherein the solubility of water at 20° C. is from 1.0 to 95.0 wt %, a dispersing step of adding water thereto, followed by dispersing, and a distillation step of distilling off at least the solvent (a).

37. The method for producing an aqueous resin dispersion, wherein the solvent (a) is an alcohol, a ketone or an ester.

38. The method for producing an aqueous resin dispersion, wherein the dissolving step and/or the dispersing step is carried out under a pressure of at most 1 MPa.

39. The method for producing an aqueous resin dispersion, wherein the 50% particle diameter of the aqueous resin dispersion is at most 0.2 μm.

40. A method for producing an aqueous resin dispersion, which is a method for producing an aqueous resin dispersion comprising a modified polyolefin and water, and which comprises a dispersing step of adding, to a solution having a modified polyolefin dissolved in a solvent (a1) wherein the solubility of water at 20° C. is less than 1.0 wt %, water and a solvent (a2) wherein the solubility of water at 20° C. is at least 1.0 wt %, followed by dispersing, and a distillation step of distilling off at least the solvents (a1) and (a2).

41. The method for producing an aqueous resin dispersion, wherein the solvent (a1) is a hydrocarbon solvent which may be halogenated.

42. The method for producing an aqueous resin dispersion, wherein the solvent (a2) has a boiling point lower than water.

43. The method for producing an aqueous resin dispersion, wherein the dispersing step is carried out under a pressure of at most 1 MPa.

44. The method for producing an aqueous resin dispersion, wherein at the time of carrying out the distillation step, the compositional fraction of the solvent (a1) is smaller than the compositional fraction of the solvent (a1) at the azeotropic point of the solvent (a1), the solvent (a2) and water.

45. The method for producing an aqueous resin dispersion, wherein the 50% particle diameter of the aqueous resin dispersion is at most 0.2 μm.

46. The method for producing an aqueous resin dispersion, wherein a modifying step of subjecting a polyolefin to a modifying reaction to obtain the modified polyolefin, is carried out in the solvent (a1) thereby to obtain a solution having the modified polyolefin dissolved in the solvent (a1).

47. The method for producing an aqueous resin dispersion, wherein a polymerization step of obtaining the polyolefin by a polymerization reaction of a monomer, is further carried out in the solvent (a1).

48. The method for producing an aqueous resin dispersion, which includes a washing step of washing the solution with a solvent (a3) having a solubility in the solvent (a1) at 20° C. of less than 1.0 wt %.

49. A method for producing a modified polyolefin solution, which comprises carrying out a modifying step of subjecting a polyolefin to a modifying reaction in a solvent to obtain a solution containing a modified polyolefin and then a washing step of washing the solution with a solvent having a solubility in said solvent at 20° C. of less than 1.0 wt %.

50. The method for producing a modified polyolefin solution, wherein the modifying step is a step of subjecting the polyolefin to a modifying reaction in a hydrocarbon solvent which may be halogenated, to obtain a solution containing a modified polyolefin, and the washing step is a step of washing the solution with water.

51. The method for producing a modified polyolefin solution wherein after the washing step, a dehydration step is carried out.

52. The method for producing a modified polyolefin solution, wherein the modifying step is a step of reacting a polyolefin with a dicarboxylic anhydride to obtain a solution containing a polyolefin having a dicarboxylic anhydride group bonded thereto.

53. The method for producing a modified polyolefin solution, wherein after the washing step, a dehydration step is carried out and then, a second modifying step of reacting the polyolefin having a dicarboxylic anhydride group bonded thereto, with a hydrophilic polymer, in the solution, to obtain a solution containing a polyolefin having a hydrophilic polymer bonded thereto, is carried out.

EFFECTS OF THE INVENTION

According to the present invention, in each of the first to fourth embodiments, the following effects (1) to (4) are obtainable. In the present invention, it is not required that all of such effects be obtained, and it is acceptable that at least one of such effects be obtainable.

(1) The aqueous dispersion is useful also for an application wherein an organic solvent solution has heretofore been used for coating, such being desirable also from the viewpoint of safety and health. Further, as it is not an organic solvent solution, discharge of VOC (volatile organic compounds) can be reduced, such being desirable from the environmental viewpoint. Yet, it is possible to obtain an aqueous dispersion having excellent properties, which contains substantially no chlorine. As no chlorine is contained, there will be no problem of dioxin or toxicity, such being very desirable from the environmental viewpoint.

(2) A coated film obtained by applying a coating material containing the resin dispersion of the present invention is excellent in water resistance, moisture resistance, oil resistance (GH resistance) and chemical resistance. Therefore, it is suitable also for a coating method for finishing by application of coating only once, such as a solvent type lacquer coating material. The resulting coated film exhibits good adhesion to a polyolefin substrate, particularly to a propylene polymer substrate, or to a plastic substrate containing e.g. a propylene polymer material, and it can be formed also on a hardly adhesive substrate such as non-treated polypropylene, which is usually difficult to bond or apply coating.

(3) The resin dispersion obtainable by the present invention is very useful as a surface treating agent, an adhesive, a coating agent, a coating material, etc., for an olefin polymer having crystallinity.

(4) The laminate of the present invention is excellent in the coated film adhesion and applicable to a wide range of industrial products.

Further, according to the first to fourth embodiments of the present invention, the following effects are respectively obtainable.

According to the first embodiment of the present invention, the polymer (C) is excellent in dispersibility in water and thus has a merit such that the dispersed particles have fine particle sizes and can be dispersed stably. Further, the polymer can be dispersed with substantially no addition of a surfactant, and there is a merit such that bleeding out of a surfactant, which used to be a problem, can be avoided, and a coated product having an excellent appearance can be obtained. Further, according to the method for producing a resin dispersion of the present invention, it is possible to simply obtain an excellent aqueous resin dispersion wherein the dispersed particle sizes are fine, and the resin particles are dispersed stably.

Further, when the polymer (C) of the present invention is used in combination with another resin to form a composite aqueous resin dispersion, it is possible to improve the physical property values derived from such another resin, specifically to improve the strength, water resistance, weather resistance, abrasion resistance, solvent resistance, etc. of the coated film.

According to the second embodiment of the present invention, this polymer (IC) is excellent in dispersibility in water, whereby an aqueous resin dispersion excellent in stability with fine dispersed particle sizes can be obtained by an addition of a small amount of a surfactant or without adding any surfactant. Accordingly, a composite aqueous resin dispersion comprising the polymer (IC) and the resin (ID) has a merit such that it is thereby possible to avoid bleeding out of a surfactant which used to be a problem, and it is possible to obtain a coated product having an excellent appearance.

Further, the particle diameter of particles of the polymer (IC) is small at a level of at most 0.9 time of the particle diameter of particles of the resin (ID), and when a coated film is formed, spaces among the particles of the resin (ID) are filled with the particles of the polymer (IC), whereby the volume of spaces tends to be small, and there will be a merit such that the adhesion to the substrate will be high, and the water resistance and the solvent resistance will be improved. Further, in the coated film, a sea-islands structure is formed wherein the propylene polymer having a high adhesion to a propylene polymer substrate constitutes "sea", and other binder resins providing other functions to the coated film constitutes "islands", whereby there will be a merit such that the adhesion to a substrate will be higher, and the water resistance and the solvent resistance will be improved.

Further, according to the method for producing the resin dispersion of the present invention, it is possible to simply produce an excellent aqueous resin dispersion wherein the dispersed particle sizes are fine, the particle size distribution is narrow, and the resin particles are dispersed stably.

Further, as the composite aqueous resin dispersion contains the resin (ID) together with the polymer (IC), it is possible to improve the physical property values derived from the resin (ID), specifically to improve the strength, water resistance, weather resistance, abrasion resistance, solvent resistance, etc., of the coated film.

By the method for producing an aqueous resin dispersion according to the third embodiment of the present invention, it is possible to simply obtain an excellent aqueous resin dispersion wherein the dispersed particle sizes are fine, the particle size distribution is narrow and the resin particles are dispersed stably. Further, such dispersion can be done substantially without adding or with an addition of a very small amount of a surfactant, whereby there is a merit such that it is possible to avoid bleeding out of a surfactant which used to be a problem, and when the dispersion is used as a coating material, it is possible to obtain a coated product having an excellent appearance.

Further, the solvent used for dispersion can easily be recovered, since it is readily separable from water after the distillation, such being advantageous in either reuse or disposal of the solvent.

By the method for producing an aqueous resin dispersion according to the fourth embodiment of the present invention, it is possible to simply obtain an excellent aqueous resin dispersion wherein the dispersed particle sizes are fine, the particle size distribution is narrow and the resin particles are dispersed stably. Further, such dispersion can be done substantially without adding or with an addition of a small amount of a surfactant, whereby there is a merit such that it is possible to avoid bleeding out of a surfactant which used to be a problem, and when the dispersion is used as a coating material, it is possible to obtain a coated product having an excellent appearance.

Further, as the solvent (a1) of the present invention, a solvent used in e.g. a step of modifying a polyolefin may be used as it is, whereby after completion of the previous step, the next dispersion process can be carried out with the solution as dissolved in the solvent without necessity to once remove or evaporate to dryness the solvent. Thus, the production process can be substantially simplified, thus providing a very useful production method.

BEST MODE FOR CARRYING OUT THE INVENTION

Now, the first to fourth embodiments of the present invention will, respectively, be described. However, descriptions common to the respective embodiments may sometimes be omitted, but it should be understood that descriptions with respect to the respective embodiments may be similarly applicable to other embodiments.

With Respect to the First Embodiment

The resin dispersion of the present invention is one having dispersed in water a polymer (C) having a hydrophilic polymer (B) bonded to a polyolefin (A) in a ratio of (A):(B)=100:5 to 100:500 (weight ratio). Namely, the hydrophilic polymer is bonded in a predetermined ratio to the polyolefin, and the obtained product is dispersed in water, whereby a resin dispersion having excellent characteristics can be obtained.

In the present invention, the dispersion is a concept including a state wherein dispersed particles are very small and dispersed in a unimolecular state, i.e. a state which can be said to be substantially dissolution. Accordingly, there is no particular limit with respect to the lower limit value for the dispersed particle size.

The ratio of the polyolefin (A) to the hydrophilic polymer (B) is (A):(B)=100:5 to 100:500 (weight ratio). As the ratio of the hydrophilic polymer (B) becomes large, the polymer (C) tends to be well dispersed in water, and the dispersed particle sizes tend to be small, whereby the particles will be dispersed stably. For this purpose, the ratio of (B) is made larger than (A):(B)=100:5. On the other hand, as the ratio of the hydrophilic polymer (B) becomes small, the adhesion to a polyolefin substrate increases. For this purpose, the ratio of (B) is made smaller than (A):(B)=100:500.

The method for producing the polymer (C) by bonding the hydrophilic polymer (B) to the polyolefin (A), may usually be a method (R1) wherein a hydrophilic monomer is polymerized in the presence of the polyolefin (A) to form the hydrophilic polymer (B) bonded to the polyolefin (A), or a method (R2) wherein a preliminarily polymerized hydrophilic polymer (B) is bonded to the polyolefin (A). Either method may suitably be selected for use depending upon the types and combination of the polyolefin and the hydrophilic polymer, the desired properties of the polymer (C), etc. Further, as the polyolefin (A) a polyolefin (A1) having no reactive group or a polyolefin (A2) having reactive groups may be used.

Now, the respective cases will be described.

(1) Polyolefin (A)

As the polyolefin (A) of the present invention, a polyolefin (A1) having no reactive group or a polyolefin (A2) having reactive groups may be used.

(1-1) Polyolefin (A1) Having No Reactive Group

As the polyolefin (A1), known various polyolefins and modified polyolefins may be used. It is not particularly limited, and it may, for example, be a homopolymer of ethylene or propylene, a copolymer of ethylene and propylene, or a copolymer of ethylene or/and propylene with another comonomer. A comonomer may, for example, be an α-olefin comonomer having at least two carbon atoms, such as 1-butene, 1-pentene, 1-hexene, 1-heptene, 1-octene, cyclopentene, cyclohexane or norbornene. The α-olefin comonomer is preferably a $C_{2-8}$ α-olefin comonomer, more preferably a $C_{2-6}$ α-olefin comonomer. Or, a copolymer of at least two types of such α-olefin comonomers may also be used.

Further, a copolymer of an α-olefin monomer with a comonomer such as vinyl acetate, an acrylic acid ester or a methacrylic acid ester, or a hydrogenated product of at least two types of monomers selected from aromatic vinyl monomers and conjugated diene monomers, may, for example, be used. Here, when the term "copolymer" is simply mentioned, it may be a random copolymer or a block copolymer. Further, the polyolefin (A1) may be straight-chained or branched.

Further, chlorinated polyolefins having such polyolefins chlorinated may also be used. The chlorination degree of such a chlorinated polyolefin is usually at least 5 wt %, preferably at least 10 wt %, and the chlorination degree is usually at most 50 wt %, preferably at most 30 wt %. However, for the purpose of reducing the environmental load, it is preferred that the polyolefin (A1) contains substantially no chlorine. Here, "contains substantially no chlorine" means, for example, that the chlorination degree of the polyolefin is less than 5 wt %.

Specifically, the polyolefin (A1) may, for example, be a polyethylene, a polypropylene, an ethylene-propylene copolymer, a propylene-butene copolymer, a propylene-hexene copolymer, a chlorinated polyethylene, a chlorinated polypropylene, a chlorinated ethylene-propylene copolymer, a chlorinated propylene-butene copolymer, an ethylene-vinyl acetate copolymer, a hydrogenated product (SEBS) of styrene-butadiene-styrene block copolymer (SBS) or a hydrogenated product (SEPS) of styrene-isoprene-styrene block copolymer (SIS). Preferred is a propylene homopolymer or a copolymer of propylene with another α-olefin, which may be chlorinated. More preferred is a propylene homopolymer, an ethylene-propylene copolymer, a propylene-butene copolymer, a chlorinated polypropylene, a chlorinated ethylene-propylene copolymer or a chlorinated propylene-butene copolymer. Further preferred is a propylene homopolymer, an ethylene-propylene copolymer or a propylene-butene copolymer.

The polyolefin (A1) preferably has a weight average molecular weight Mw of from 1,000 to 500,000, as measured by GPC (Gel Permeation Chromatography) and calculated by a calibration curve of each polyolefin. The lower limit value is more preferably 10,000, further preferably 30,000, particularly preferably 50,000. The upper limit value is more preferably 300,000, further preferably 250,000, particularly preferably 200,000. As Mw becomes higher than the lower limit value, stickiness tends to be less, and the adhesion to the substrate tends to increase, and as it becomes lower than the upper limit value, the viscosity tends to be low, whereby the preparation of the resin dispersion tends to be easy. Here, the GPC measurement is carried out by a conventional method employing a commercially available apparatus and by using e.g. o-dichlorobenzene as a solvent.

Of the polyolefin (A1), the molecular weight distribution Mw/Mn represented by the ratio of the weight average molecular weight Mw to the number average molecular weight Mn, is preferably at most 10, more preferably at most 5, further preferably at most 3. This means that the molecular weight distribution is narrow, and the molecular weight of the polyolefin is uniform. By using such a polyolefin (A1), it becomes easy to control the particle size at the time of dispersion in water, and there will be a merit such that a resin dispersion wherein the dispersed particle sizes are small, the particle size distribution is narrow and the particles are dispersed stably, can be obtained. Preferably, Mw/Mn is at most 3.0. However, it is usually at least 1.0.

The polyolefin (A1) preferably has a melting point Tm of at most 120° C., more preferably at most 110° C., further preferably at most 100° C. It is preferred that the melting point Tm is lower than 120° C., whereby the crystallinity tends to be low, the solubility in the solvent will be improved, and emulsification and dispersion operations tend to be more readily carried out at a low temperature. However, the melting point Tm of the polyolefin (A1) is usually at least 25° C., preferably at least 35° C. Such being advantageous from the viewpoint of high thermal resistance, high hardness and non-tackiness.

The content of propylene in the polyolefin (A1) is preferably at least 50 mol %, more preferably at least 70 mol %. Usually, as the propylene content becomes high, the adhesion to a polypropylene substrate tends to increase.

A preferred example of the polyolefin (A1) is one having entirely or partially an isotactic structure as the stereoregularity of a propylene homopolymer or copolymer. For example, not only a usually isotactic polypropylene but also an isotactic block polypropylene or a stereo-block polypropylene having isotactic blocks and atactic blocks, as disclosed in JP-A-2003-231714 (US2004-162403) or U.S. Pat. No. 4,522,982, may, for example, be preferably used.

Further, in a case where the polyolefin (A1) is a propylene homopolymer, the "mmmm" pentad showing the isotactic stereoregularity is within a range of from 10% to 90%. The lower limit value is preferably 20%, more preferably 30%, further preferably 40%. The upper limit value is preferably 80%, more preferably 70%, further preferably 60%, still further preferably 55%. As a method for measuring the ratio of the pentad, the method disclosed in JP-A-2003-231714 (US2004-162403) may be employed. As the pentad ratio is higher than the lower limit value, the stickiness tends to be small, and as it is lower than the upper limit value, the crystallinity tends to be low, whereby the preparation of the liquid dispersion tends to be easy.

However, in a case where the polyolefin (A1) is a copolymer, even when the apparent stereoregularity is higher, for example, even when the above "mmmm" pentad ratio is larger, it may preferably be used.

Or, another preferred example of the polyolefin (A1) is a propylene-α-olefin copolymer. Such a copolymer has a low melting point as compared with a homopolymer such as polypropylene and thus has a merit such that with a resin dispersion employing such a copolymer, the baking temperature after coating can be lowered. More preferably, the propylene content is from 50 mol % to 95 mol %. Usually, as the propylene content is high, the adhesion to a polypropylene substrate tends to increase. It is preferably at least 60 mol %, more preferably at least 70 mol %. However, the propylene content is at most 95 mol %. Usually, by lowering the propylene content, the melting point of the copolymer can be lowered, and for example, there will be a merit such that the baking temperature after coating can be lowered. It is preferably at most 90 mol %, more preferably at most 85 mol %. Further, the molecular weight distribution Mw/Mn of the copolymer is preferably at most 3.0.

The α-olefin is preferably a $C_{2-8}$ α-olefin, more preferably a $C_{2-6}$ α-olefin, further preferably a $C_{2-4}$ α-olefin, most preferably 1-butene. The 1-butene content is preferably from 5 mol % to 50 mol %. It is more preferably at least 10 mol %, further preferably at least 15 mol %, and it is more preferably at most 40 mol %, further preferably at most 30 mol %. Here, the copolymer may contain a small amount of constituting units derived from an α-olefin other than propylene and 1-butene. For example, it may contain at most 10 mol % of ethylene. More preferably, the ethylene content is at most 5 mol %. In this specification, butene means 1-butene unless otherwise specified.

As a commercial product available as the copolymer, Tafmer XM-7070 or XM-7080, manufactured by Mitsui Chemicals, Inc., may, for example, be mentioned.

As the polyolefin (A1), one type may be used alone, or two or more types may be used in combination.

To sum up the foregoing, preferred as the polyolefin (A1) is a polyolefin wherein the propylene content is at least 50 mol % and is a stereo-block polypropylene polymer having isotactic blocks and atactic blocks, a propylene-α-olefin copolymer, or a combination thereof.

The method for preparing the polyolefin (A1) of the present invention is not particularly limited and may be any method so long as it is capable of producing a polymer satisfying the requirements of the present invention. For example, radical polymerization, cationic polymerization, anionic polymerization or coordination polymerization may be mentioned, and each may be living polymerization.

In the case of coordination polymerization, a method for polymerization by a Ziegler Natta catalyst or a method for polymerization by a single site catalyst or a Kaminsky catalyst may, for example, be mentioned. As a preferred method, a production method by means of a single site catalyst may be mentioned. Namely, in general, with a single site catalyst, by designing the ligand, the reaction can easily be controlled precisely, whereby a polymer having a sharp molecular weight distribution or stereoregularity distribution can be obtained, and as compared with a polymer obtainable by a Ziegler Natta catalyst, the melting point is low, and with a resin dispersion employing such a polymer, it is possible to lower the baking temperature after the coating. As the single site catalyst, a metallocene catalyst or a Brookhart type catalyst may, for example, be used. In the case of the metallocene catalyst, a preferred catalyst may be selected depending upon the stereoregularity of the polyolefin to be polymerized, such as $C_1$ symmetric type, $C_2$ symmetric type, $C_{2V}$ symmetric type or $C_S$ symmetric type. Preferably, a $C_1$ symmetric type or $C_2$ symmetric type metallocene catalyst may be employed.

Further, the polymerization may be of any type such as solution polymerization, slurry polymerization, bulk polymerization or gas-phase polymerization. In the case of solution polymerization or slurry polymerization, the solvent may, for example, be an aromatic hydrocarbon such as toluene or xylene; an aliphatic hydrocarbon such as hexane, octane or decane; an alicyclic aliphatic hydrocarbon such as cyclohexane or methyl cyclohexane; a halogenated hydrocarbon such as methylene chloride, carbon tetrachloride or chlorobenzene; an ester such as methyl acetate, ethyl acetate, propyl acetate or butyl acetate; a ketone such as acetone, methyl ethyl ketone, methyl isobutyl ketone or cyclohexanone; an alcohol such as methanol, ethanol, n-propanol, isopropanol or n-butanol; an ether such as dibutyl ether or tetrahydrofuran; or a polar solvent such as dimethylformamide or dimethylsulfoxide. Among them, an aromatic hydrocarbon, an aliphatic hydrocarbon or an alicyclic hydrocarbon is preferred, and more preferred is toluene, xylene, hexane, heptane, cyclopentane or cyclohexane. These solvents may be used alone or in combination as a mixture of two or more of them.

(1-2) Polyolefin (A2) Having Reactive Groups

As the polyolefin (A2) having reactive groups, it is possible to employ, for example, a copolymer (A2a) obtained by copolymerizing an unsaturated compound having no reactive group with an unsaturated compound having a reactive group at the time of polymerization of a polyolefin, or a polymer (A2b) obtained by graft-polymerizing a radical polymerizable unsaturated compound having a reactive group to a polyolefin, or a polymer (A2c) obtained by converting a polyolefin having unsaturated terminal groups to one having groups of an element of Group 13 to 17.

The reactive groups may, for example, be carboxylic acid groups, dicarboxylic anhydride groups, dicarboxylic anhydride monoester groups, hydroxyl groups, amino groups, epoxy groups or isocyanate groups. More preferably, the polyolefin (A2) has at least one member selected from the group consisting of carboxylic acid groups, dicarboxylic anhydride groups and dicarboxylic anhydride monoester groups. These carboxylic acid groups, etc. are highly reactive and can easily be bonded to a hydrophilic polymer. Not only that, there are many unsaturated compounds having such groups, which may easily be copolymerized or graft-polymerized to a polyolefin.

The copolymer (A2a) is a copolymer which is obtainable by copolymerizing an unsaturated compound having no reactive group with an unsaturated compound having a reactive group and which has the unsaturated compound having the reactive group inserted to the main chain. For example, it is obtainable by copolymerizing an α-olefin such as ethylene, propylene or butene with an α,β-unsaturated carboxylic acid or its anhydride such as an acrylic acid or maleic anhydride. Specifically, as the copolymer (A2a), a propylene-butene-maleic anhydride copolymer may, for example, be used. Such polymers may be used alone or in combination as a mixture of two or more of them. As the production method, a method described in (1-1) may be used in the same manner.

The polymer (A2b) is obtainable by graft-polymerizing a radical polymerizable unsaturated compound having a reactive group to a preliminarily polymerized polyolefin, wherein the unsaturated compound having a reactive group is grafted to the main chain. It is for example a polymer obtained by grafting (meth)acrylic acid, fumaric acid, maleic acid or its anhydride, itaconic acid or its anhydride, crotonic acid, 2-hydroxyethyl (meth)acrylate or 2-hydroxypropyl (meth)acrylate, (meth)acrylamino, (dimethylamino)ethyl (meth)acrylate, glycidyl (meth)acrylate, or (2-isocyanate)ethyl (meth)acrylate, to a polyolefin such as a polyethylene or a polypropylene. Such polymers may be used alone or in combination as a mixture of two or more of them. Here, (meth)acrylic acid is a general term for acrylic acid and methacrylic acid, and such applies to other similar cases. As the polyolefin for this reaction, the above-mentioned polyolefin having no reactive group may be used.

Specifically, the polymer (A2b) may, for example, be a maleic anhydride-modified polypropylene or its chlorinated product, a maleic anhydride-modified propylene-ethylene copolymer or its chlorinated product, a maleic anhydride-modified propylene-butene copolymer or its chlorinated product, an acrylic acid-modified propylene or its chlorinated product, an acrylic acid-modified propylene-ethylene copolymer or its chlorinated product, or an acrylic acid-modified propylene-butene copolymer or its chlorinated product. These polymers may be used alone or in combination as a mixture of two or more of them.

The radical polymerization initiator to be used for the graft polymerization may be suitably selected for use from usual radical polymerization initiators, and for example, an organic peroxide or azonitrile may be mentioned. As the organic peroxide, a peroxyketal such as di(t-butylperoxy)cyclohexane, a hydroperoxide such as cumene hydroperoxide, a dialkyl peroxide such as di(t-butyl) peroxide, a diacyl peroxide such as benzoyl peroxide, or a peroxyester such as t-butyl peroxy isopropyl monocarbonate may be used. The azonitrile may, for example, be azobisbutyronitrile or azobisisopropylnitrile. Among them, benzoyl peroxide or t-butyl peroxy isopropyl monocarbonate is particularly preferred. These initiators may be used alone or in combination as a mixture of two or more of them.

The ratio of the radical polymerization initiator to the graft copolymer units to be used is usually within a range of radical polymerization initiator:graft copolymer units=1:100 to 2:1 (molar ratio), preferably within a range of 1:20 to 1:1.

The process for producing the polymer (A2b) is not particularly limited and may be any method so long as it is capable of producing a polymer satisfying the requirements of the present invention. For example, a solution modification method (a method of heating and stirring in a solution for the reaction) or a melt modification method (a method of melting, heating and stirring in the absence of a solvent, or a method of heating and kneading by an extruder for the reaction) may be mentioned.

As the solvent in the case of production in the solution, the solvent mentioned in (1-1) may be used in the same manner.

The reaction temperature is usually at least 50° C., preferably within a range of from 80 to 300° C. More preferably, in the case of the solution modification method, the temperature is within a range of from 80 to 200° C., and in the case of the melt modification method, the temperature is within a range of from 150 to 300° C. The reaction time is usually from about 2 to 20 hours. The reaction time is usually from about 2 to 20 hours.

The polymer (A2c) is usually employed in the case of producing a block copolymer. For example, a polyolefin (A2c1) obtained by converting a double bond portion of a polyolefin having a terminal double bond to a Group 13 element group such as a boron group or an aluminum group, as disclosed in JP-A-2001-288372 (US2003-055179), a polyolefin (A2c2) obtained by converting a double bond portion of a polyolefin having a terminal double bond to a halogen element, as disclosed in JP-A-2005-048172 (EP1645576A1), or a polyolefin (A2c3) obtained by converting a double bond portion of a propylene polymer having a terminal double bond to a mercapto group, as disclosed in JP-A-2001-298140 (U.S. Pat. No. 6,451,901), may be used.

The method for producing a polyolefin having a double bond may, for example, be a method of inducing α-hydrogen detachment during the olefin polymerization, or a method of thermally decomposing a propylene polymer at a high temperature.

The method for converting the double bond portion to a boron group or an aluminum group may, for example, be a method of reacting an organic boron compound or an organic aluminum compound to the double bond in a solvent.

The method for converting the double bond portion to a halogen element may, for example, be a method wherein the above-mentioned polyolefin (A2c1) having an organic boron group is reacted with a base and an aqueous hydrogen peroxide solution to convert it to a propylene polymer having a hydroxyl group, which is then reacted with a halogen group-containing acid halide to convert it to a halogen group-containing ester group.

The method for converting the double bond portion to a mercapto group may, for example, be a method of reacting thioacetic acid in the presence of a radical initiator, followed by treatment with a base.

The method for producing the polymer (A2c) is not particularly limited and may be any method so long as it is capable of producing a polymer satisfying the requirements of the present invention. However, a method of heating and stirring in a solution for the reaction is preferably employed. As the solvent in the case of production in the solution, the solvent mentioned in (1-1) may be used in the same manner.

The content of reactive groups in the polymer (A2a) or (A2b) having reactive groups bonded thereto, is preferably within a range of from 0.01 to 5 mmol per 1 g of the polyolefin i.e. from 0.01 to 5 mol/g. The lower limit value is more preferably 0.05 mmol/g, further preferably 0.1 mmol/g, particularly preferably 0.15 mmol/g. The upper limit value is more preferably 1 mmol/g, further preferably 0.8 mmol/g, particularly preferably 0.5 mmol/g.

The content of reactive groups in the polymer (A2c) having reactive groups bonded thereto is usually at most one reactive group per one molecule of the polymer i.e. at most 1/number average molecular weight Mn (mol/g), in view of its production method, and it tends to be low as compared with the copolymer (A2a) and (A2b). Accordingly, it is preferably within a range of from 0.004 to 2 mmol/g per 1 g of the polyolefin. The lower limit value is more preferably 0.005 mmol/g. The upper limit value is more preferably 0.2 mmol/g.

As the content is higher than the lower limit value, the amount of the hydrophilic polymer (B) bonded increases, and the hydrophilicity of the polymer (C2) increases, whereby the dispersed particle sizes tend to be small. As it is lower than the upper limit value, the adhesion to a crystalline polyolefin as the substrate tends to increase. Here, a dicarboxylic anhydride group may be regarded as containing two carboxylic acid groups in the group, and 1 mol of a dicarboxylic anhydride is counted to be 2 mols of the reactive group.

Polyolefins (A2) may be used alone or in combination as a mixture of two or more of them. Further, as the polyolefin (A2), any of (A2a), (A2b) and (A2c) may be used, but preferred is usually the polymer (A2b). It has a merit such that the amount of the hydrophilic polymer (B) to be bonded can easily be controlled.

In the present invention, as the polyolefin (A), both of the polyolefin (A1) having no reactive group and the polyolefin (A2) having reactive groups may suitably by used depending upon the combination with the hydrophilic polymer (B) or the desired properties of the polymer (C). However, at least, it is preferred to contain the polyolefin (A2) having reactive groups, in view of merits such that the amount of the hydrophilic polymer (B) to be bonded can easily be controlled, and various reactions may be employed for such bonding. Only the olefin (A2) having reactive groups may be used.

(2) Hydrophilic Polymer (B)

In the present invention, the hydrophilic polymer is such a polymer that when it is dissolved in water at 25° C. at a concentration of 10 wt %, the insoluble content is at most 1 wt %. As the hydrophilic polymer (B), any polymer may be used without any particular restriction so long as the effects of the present invention are not substantially impaired, and any of a synthetic polymer, a semi-synthetic polymer and a natural polymer may be employed. It may have reactive groups.

The synthetic polymer is not particularly limited, and for example, a poly(meth)acrylic resin, a polyether resin, a polyvinyl alcohol resin or a polyvinyl pyrrolidone resin may, for example, be used. The natural polymer is not particularly limited, and for example, a starch such as corn starch, wheat starch, sweet potato starch, potato starch, tapioca starch or rice starch, a seaweed such as dried layer, agar or sodium alginate, a plant mucilage such as gum Arabic, tragacauth gum or konjac, an animal protein such as hide glue, casein or gelatin, or a fermented mucilage such as pullulan or dextrin may, for example, be used. The semisynthetic polymer is not particularly limited, and for example, a starch such as carboxyl starch, cation starch or dextrin, or a cellulose such as viscose, methyl cellulose, ethyl cellulose, carboxylmethyl cellulose or hydroxyethyl cellulose may, for example, be used.

Among them, preferred is a synthetic polymer whereby the degree of hydrophilicity can easily be controlled, and the properties are stabilized. More preferred is an acrylic resin such as a poly(meth)acrylic resin, a polyvinyl alcohol resin, a polyvinyl pyrrolidone resin or a polyether resin. They may be used alone or in combination as a mixture of two or more of them. A highly hydrophilic polyether resin is most preferred.

The acrylic resin to be used in the present invention is usually obtained by polymerizing an unsaturated carboxylic acid or its ester or anhydride by radical polymerization, anionic polymerization or cationic polymerization. The method for bonding it with the polyolefin (A) is not particularly limited, and for example, a method of carrying out radical polymerization in the presence of a polyolefin, or a method of reacting an acrylic resin having a reactive group such as a hydroxyl group, an amino group, a glycidyl group or a carboxylic (anhydride) group with a polyolefin having a reactive group, may, for example, be mentioned.

The hydrophilic unsaturated carboxylic acid or its ester or anhydride may preferably be (meth)acrylic acid, hydroxylethyl (meth)acrylate, dimethylaminoethyl (meth)acrylate, a quaternary product of dimethylaminoethyl (meth)acrylate or (meth)acrylamide.

Further, within a range wherein hydrophilicity is shown, a hydrophobic radical polymerizable compound (a hydrophobic monomer) may be copolymerized thereto. A copolymerizable hydrophobic monomer may, for example, be a (meth)acrylic acid ester monomer having a $C_{1-12}$ alkyl, aryl or arylalkyl group, or a polymerizable vinyl monomer having a $C_{1-12}$ hydrocarbon group.

The (meth)acrylic acid ester monomer having a $C_{1-12}$ alkyl group may, for example, be methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, hexyl (meth)acrylate, cyclohexyl (meth)acrylate, octyl (meth)acrylate, 2-ethylhexyl (meth)acrylate, nonyl (meth)acrylate, decyl (meth)acrylate or dodecyl (meth)acrylate.

The (meth)acrylic acid ester monomer having a $C_{1-12}$ aryl or arylalkyl group may, for example, be phenyl (meth)acrylate, toluoyl (meth)acrylate or benzyl (meth)acrylate.

The polymerizable vinyl monomer having a $C_{1-12}$ hydrocarbon group may, for example, be vinyl acetate or a styrene monomer.

Preferred may, for example, be a (meth)acrylic acid ester such as methyl (meth)acrylate or butyl (meth)acrylate, or vinyl acetate.

Otherwise, a radical polymerizable unsaturated compound may be polymerized in the presence of a radical polymerization initiator to form a polymer and at the same time to bond it to the polyolefin (A), followed by modifying it to the hydrophilic polymer (B). For example, a method wherein t-butyl (meth)acrylate is polymerized and then hydrolyzed under an acidic condition to convert it to a poly(meth)acrylic acid, or a method wherein vinyl acetate is polymerized and then saponified to modify it to a polyvinyl alcohol, may be mentioned. In such a case, as the polyolefin (A), a polyolefin (A2) having reactive groups bonded thereto may be used, but usually, a polyolefin (A1) having no reactive group is employed.

The polyvinyl alcohol resin to be used in the present invention is obtained usually by polymerizing vinyl acetate to obtain a polyvinyl acetate, followed by saponification. The saponification degree may be complete saponification or partial saponification.

The polyvinyl pyrrolidone resin to be used in the present invention is obtained usually by polymerizing vinyl pyrrolidone.

The polyether resin to be used in the present invention is obtained usually by subjecting a cyclic alkylene oxide or a cyclic alkylene imine to ring-opening polymerization. The method for bonding it to the polyolefin (A) is not particularly limited, and for example, a method of subjecting a cyclic alkylene oxide to ring-opening polymerization in the polyolefin (A2) having reactive groups, or a method of reacting a hydrophilic polymer having reactive groups such as a polyether polyol or a polyether amine obtained by e.g. ring-opening polymerization, with the polyolefin (A2) having reactive groups, may, for example, be mentioned.

The polyether amine is a compound having a primary amino group as a reactive group at one terminal or both terminals of a resin having a polyether skeleton. The polyether polyol is a compound having a hydroxyl group as a reactive group at both terminals of a resin having a polyether skeleton.

The hydrophilic polyalkylene oxide or polyalkylene imine may preferably be polyethylene oxide, polypropylene oxide, polypropylene oxide or polyethylene imine.

Or, as the polyether amine, Jeffamine M series, D series or ED series, manufactured by Huntsman Corporation may, for example, be used.

Before bonding to the polyolefin (A), the hydrophilic polymer (B) to be used in the present invention preferably has at least one reactive group which is reactive thereto. As such a reactive group, a carboxylic acid group, a dicarboxylic anhydride group, a dicarboxylic anhydride monoester group, a hydroxyl group, an amino group, an epoxy group or an isocyanate group may, for example, be mentioned. Preferably, it has at least an amino group. The amino group has a high reactivity with various reactive groups such as a carboxylic acid group, a carboxylic anhydride group, a glycidyl group and an isocyanate group, whereby it is easy to bond the hydrophilic polymer to the polyolefin. The amino group may be primary, secondary or tertiary, but more preferred is a primary amino group.

At least one reactive group may be present, but more preferably, it has only one reactive group. If it has two or more reactive groups, at the time of bonding it to the polyolefin (A), it tends to form a three dimensional network structure and is likely to be geled.

However, it may have a plurality of reactive groups, if a reactive group having a higher reactivity than others is only one. For example, a hydrophilic polymer having a plurality of hydroxyl groups and one amino group having a higher reactivity than the hydroxyl groups, is a preferred example. Here, the reactivity is a reactivity with the reactive group of the polyolefin (A).

The hydrophilic polymer (B) in the present invention is required to have a high molecular weight in order to impart sufficient hydrophilicity, and it is one having a weight average molecular weight Mw of at least 200, as measured by GPC and calculated by a calibration curve of polystyrene. The lower limit value is preferably 300, more preferably 500. However, the weight average molecular weight Mw is preferably at most 200,000. The upper limit value is more preferably 100,000, further preferably 10,000. As Mw is higher than the lower limit value, the hydrophilicity of the polymer (C) tends to increase, and the dispersed particle sizes tend to be small so that the dispersion tends to be stabilized, and as it is lower than the upper limit value, the viscosity tends to be low, and the preparation of the resin dispersion tends to be easy. Here, the GPC measurement is carried out by a conventional method using a commercial available apparatus and by using e.g. THF as a solvent.

The amount of the hydrophilic polymer (B) bonded to the polyolefin (A) is preferably from 0.01 to 5 mmol per 1 g of the polyolefin (A), i.e. from 0.01 to 5 mmol/g. The lower limit value is more preferably 0.05 mmol/g, further preferably 0.1 mmol/g, particularly preferably 0.15 mmol/g. The upper limit value is more preferably 1 mmol/g, further preferably 0.8 mmol/g, particularly preferably 0.5 mmol/g, most preferably 0.3 mmol/g. As the amount is higher than the lower limit value, the hydrophilicity of the polymer (C) tends to increase, and the dispersed particle sizes tend to be small so that the dispersion tends to be stabilized, and as it is lower than the upper limit value, the adhesion to a crystalline polyolefin as a substrate tends to increase.

The polyolefin (A) and the hydrophilic polymer (B) may form a graft copolymer having the hydrophilic polymer (B) graft-bonded to the polyolefin (A), or a block copolymer of the polyolefin (A) and the hydrophilic polymer (B) including such a state that the hydrophilic polymer (B) is bonded to one end or both ends of the polyolefin (A). However, preferred is a graft copolymer in view of such merits that the content of the hydrophilic polymer (B) is easy to control, and as compared with a block copolymer, the content of the hydrophilic polymer (B) can easily be increased.

The hydrophilic polymer (B) may be bonded to the polyolefin (A) by various reaction modes. The reaction mode is not particularly limited, but it is, for example, a radical graft reaction or a reaction utilizing reactive groups.

By the radical graft reaction, a bond by a carbon-carbon covalent bond will be formed.

The reaction utilizing reactive groups is one wherein both of the polyolefin (A) and the hydrophilic polymer (B) have reactive groups, and they are bonded by reacting the reactive groups, whereby a covalent bond or an ionic bond will be formed. Such a reaction may, for example, be a (ring-opening) esterification reaction of a carboxylic (anhydride) group with a hydroxyl group, a ring-opening reaction of a carboxylic acid group with an epoxy group, a ring-opening reaction of a primary or secondary amino group with an epoxy group, a (ring-opening) amidation reaction or imidation reaction of a carboxylic (anhydride) group with a primary or secondary amino group, a quaternary ammonium-forming reaction of a carboxylic acid group with a tertiary amino group, an amidation reaction of a carboxylic acid group with an isocyanate group, an urea reaction of a primary or secondary amino group with an isocyanate group, or an urethane reaction of a hydroxyl group with an isocyanate group. Among them, a ring-opening amidation reaction or imidation reaction of a carboxylic anhydride group with a primary or secondary amino group is preferred from the viewpoint of the high reactivity. Further, the amidation is preferred to the imidation, since hydrophilic groups such as a NH group and a COOH group will remain in the groups, whereby the emulsification will be easy. The reaction rate in each reaction may optionally be selected within a range of from 1 to 100%, preferably from 50 to 100%, more preferably from 70 to 100%. In a case where a carboxylic acid group is a dibasic acid or its anhydride, against one equivalent of the dibasic acid or its anhydride, one equivalent may be reacted, or two equivalents may be reacted.

(3) Polymer (C)

Usually, as a method for producing the polymer (C) by bonding the hydrophilic polymer (B) to the polyolefin (A), there is a method (R1) wherein a hydrophilic monomer is polymerized in the presence of the polyolefin (A) to form the hydrophilic polymer (B) bonded to the polyolefin (A), or a method (R2) wherein a preliminarily polymerized hydrophilic polymer (B) is bonded to the polyolefin (A). In either method, as the polyolefin (A), a polyolefin (A1) having no reactive group or a polyolefin (A2) having reactive groups may be used.

(3-1) Method (R1) for Producing Polymer (C)

In this method, a hydrophilic radical polymerizable unsaturated compound (hydrophilic monomer) is polymerized in the presence of a polyolefin to obtain a hydrophilic polymer (B) bonded to the polyolefin. The method for polymerization of the hydrophilic monomer may, for example, be addition polymerization, condensation polymerization or ring-opening polymerization. At that time, a hydrophobic radical polymerizable unsaturated compound (hydrophobic monomer) may be copolymerized within a range where a hydrophilic polymer can be formed. In any case, as the polyolefin, a polyolefin (A1) having no reactive group, or a polyolefin (A2) having reactive groups bonded thereto, may be used.

Specifically, there is, for example, a method wherein a hydrophilic radical polymerizable unsaturated compound is graft-polymerized in the presence of the polyolefin (A) and a radical-polymerization initiator such as a peroxide or azo compound to obtain a graft copolymer of the polyolefin and polyacryl. Further, as disclosed in JP-A-2001-288372 (US2003-055179), there is a method wherein a hydrophilic radical polymerizable unsaturated compound is polymerized in the presence of a polyolefin (A2c1) having a Group 13 element group such as a boron group or an aluminum group at its terminal to obtain a block copolymer of the polyolefin and polyacryl. Further, as disclosed in JP-A-2004-131620 (US2004-110903) or JP-A-2005-048172 (EP1645576A1), there is a method wherein a block copolymer of a propylene polymer and a polyacryl is prepared by an atom transfer living radical method by using a polyolefin (A2c2) having a halogen atom at its terminal and a copper halide, ruthenium halide or the like. Further, as disclosed in JP-A-2001-098140 (U.S. Pat. No. 6,451,901), there is a method wherein a radical initiator and a hydrophilic radical polymerizable unsaturated compound are polymerized in the presence of a polyolefin having a mercapto group at its terminal to obtain a block copolymer of the polyolefin and polyacryl.

The hydrophilic monomer is not particularly limited, and for example, (meth)acrylic acid, hydroxyethyl (meth)acrylate, methoxypolyethylene glycol (meth)acrylate, dimethylaminoethyl (meth)acrylate, quaternary dimethylaminoethyl (meth)acrylate or vinyl pyrrolidone may be mentioned.

As the copolymerizable hydrophobic monomer, one mentioned in (2) may be used in the same manner.

A reactive surfactant or a reactive emulsifier may also be used as an aqueous radical polymerizable unsaturated compound. For example, an alkyl propenylphenol polyethylene oxide adduct, an alkyldipropenylphenol polyethylene oxide adduct and their sulfuric acid ester salts as disclosed in JP-A-04-053802 (U.S. Pat. No. 5,332,854) and JP-A-04-050204 (U.S. Pat. No. 5,324,862) may be mentioned. Among them, an alkylpropenylphenol ethylene oxide 20 mol adduct, 30 mol adduct or 50 mol adduct (Aqualon RN-20, RN-30 or RN-50, manufactured by Daiichi Kogyo Seiyaku Co., Ltd.), or a sulfuric acid ester ammonium salt of an alkylpropenylphenol polyethylene oxide 10 mol adduct, or a sulfuric acid ester ammonium salt of the same 20 mol adduct (Aqualon HS-10 or HS-20, manufactured by Daiichi Kogyo Seiyaku Co., Ltd.) is used preferably.

Otherwise, a radical polymerizable unsaturated compound may be polymerized in the presence of a radical polymerization initiator to form a polymer and at the same time to bond it to a polyolefin, and then, the hydrophilic polymer (B) may be modified. For example, a method wherein t-butyl (meth)acrylate is polymerized and then hydrolyzed in the presence of an acid to modify it to a poly(meth)acrylic acid, or a method of further neutralizing it with a base, or a method wherein vinyl acetate is polymerized and then saponified to modify it to a polyvinyl alcohol, may be mentioned. As a copolymerizable hydrophobic radical polymerizable unsaturated compound, a (meth)acrylic acid ester such as methyl (meth)acrylate or butyl (meth)acrylate, or vinyl acetate may be mentioned. In such a case, as the polyolefin (A), a polyolefin (A2) having reactive groups bonded thereto may be used, but usually, a polyolefin (A1) having no reactive group is employed.

Or, there is a method wherein a polyolefin (A2) having reactive groups is employed, and using such reactive groups as initial terminals, a hydrophilic ring-opening polymerization monomer or the like is polymerized to obtain a hydrophilic polymer (B).

The hydrophilic ring-opening polymerization monomer may, for example, be ethylene oxide, propylene oxide or ethylene imine. The copolymerizable hydrophobic monomer may, for example, be trimethylene oxide, tetrahydrofuran, β-propiolactone, γ-butyrolactone or ε-caprolactone.

They may be used alone or in combination as a mixture of two or more of them.

The reaction method is not particularly limited so long as a polymer satisfying the requirements of the present invention can thereby be produced. For example, a method of heating and stirring in a solution for the reaction, a method of melting, heating and stirring in the absence of a solvent for the reaction, or a method of heating and kneading by an extruder for the reaction, may be mentioned. The reaction temperature is usually within a range of from 0 to 200° C., preferably within a range of from 30 to 150° C. As the solvent in the case of production in a solution, the solvent mentioned in (1-1) may be used in the same manner.

(3-2) Method (R2) for Producing Polymer (C)

In this method, a preliminarily polymerized hydrophilic polymer (B) is bonded to the polyolefin (A). In this case, as the hydrophilic polymer (B), one mentioned in (2) may be used.

Specifically, there is, for example, a method wherein firstly, at the time of polymerizing a hydrophilic monomer to form a hydrophilic polymer, an unsaturated double bond is retained in its molecule, and then it is graft-polymerized to the polyolefin (A) by means of a radical polymerization initiator. In such a case, as the polyolefin (A), a polyolefin (A2) having reactive groups may be used, but usually, a polyolefin (A1) having no reactive group is used.

Further, there is a method wherein firstly, a hydrophilic polymer having a reactive group at its terminal is formed by polymerization, and then this is bonded to a polyolefin (A2) having reactive groups. The hydrophilic polymer having a reactive group at its terminal may be obtained by polymerizing a hydrophilic monomer by using a compound having a reactive group, as an initiator or a chain transfer agent. Or, it may be obtained by ring-opening polymerization of a hydrophilic ring-opening polymerization monomer such as an epoxy compound.

As the hydrophilic monomer which may be used in such a case, various hydrophilic monomers mentioned in (3-1) may be used in the same manner.

They may be used alone or in combination as a mixture of two or more of them.

The reaction method is not particularly limited and may be any method so long as a polymer satisfying the requirements of the present invention can thereby be produced. For example, a method of heating and stirring in a solution for the reaction, a method of melting, heating and stirring in the absence of a solvent for the reaction, or a method of heating and kneading by an extruder for the reaction, may be mentioned. The reaction temperature is usually within a range of from 0 to 200° C., preferably within a range of from 30 to 150° C. As the solvent in the case of production in a solution, the solvent mentioned in (1-1) may be used in the same manner.

(4) Method for Producing Aqueous Resin Dispersion

The method for producing a resin dispersion of the present invention is not particularly limited, and for example, a method which comprises preparing a mixture of the polymer (C), water and a solvent other than water, and then, removing the solvent from the mixture to obtain an aqueous dispersion, or a method which comprises melting the polymer (C) at a temperature of at least the melting temperature of the polymer (C), and then, adding water thereto to obtain a dispersion, may be mentioned.

Preferred is the former. By the method which comprises preparing a mixture of the polymer, water and a solvent other than water, and then, removing the solvent from the mixture to obtain an aqueous dispersion, an aqueous dispersion with fine particle sizes can easily be prepared. At the time of preparing the mixture, heating may be applied as the case requires. The temperature is usually from 30 to 150° C. The proportion of the solvent other than water in the resin dispersion is made to be usually at most 50%, finally. It is preferably at most 20%, more preferably at most 10%, particularly preferably at most 1%.

More preferred is a method wherein the solvent other than water is added to the polymer (C), and after dissolving it, if necessary, by heating, water is added, whereby an aqueous dispersion with finner particle sizes can easily be prepared. The temperature at the time of dissolving the polymer in the solvent or at the time of adding water, is usually from 30 to 150° C. In a case where the solvent is once dissolved in the solvent other than water, the solvent may be distilled off after the addition of water. The proportion of the solvent other than water in the resin dispersion is as described above.

The solvent other than water to be used in this method may, for example, be an aromatic hydrocarbon such as toluene or xylene; an aliphatic hydrocarbon such as hexane, octane or decane; an alicyclic aliphatic hydrocarbon such as cyclohexane or methyl cyclohexane; a halogenated hydrocarbon such as methylene chloride, carbon tetrachloride or chlorobenzene; an ester such as methyl acetate, ethyl acetate, propyl acetate or butyl acetate; a ketone such as acetone, methyl ethyl ketone, methyl propyl ketone, methyl isobutyl ketone or cyclohexanone; an alcohol such as methanol, ethanol, n-propanol, isopropanol, n-butanol, 2-butanol, isobutanol, t-butanol, cyclohexanol, ethylene glycol, propylene glycol or butanediol; an ether such as dipropyl ether, dibutyl ether or tetrahydrofuran; an organic solvent having two or more functional groups, such as 2-methoxyethanol, 2-ethoxyethanol, 2-butoxyethanol, 2-methoxypropanol, 2-ethoxypropanol or diacetone alcohol; or a polar solvent such as dimethylformamide or dimethylsulfoxide.

Among them, a solvent soluble in water in an amount of at least 1 wt % is preferred, and more preferred is one soluble in water in an amount of at least 5 wt %. For example, methyl ethyl ketone, methyl propyl ketone, cyclohexanone, n-propanol, isopropanol, n-butanol, 2-butanol, isobutanol, t-butanol, cyclohexanol, tetrahydrofuran, 2-methoxyethanol, 2-ethoxyethanol, 2-butoxyethanol, 2-methoxypropanol, 2-ethoxypropanol or diacetone alcohol is preferred.

An example of a particularly preferred method for producing an aqueous resin dispersion of the present invention may be a production method which comprises a dissolving step of dissolving the polymer (C) in a solvent (a) wherein the solubility of water at 20° C. is from 1.0 to 95.0 wt %, and a dispersing step of adding water thereto, followed by dispersing, and a distillation step of distilling off at least the solvent (a). This method will be described in detail in "WITH RESPECT TO THE THIRD EMBODIMENT".

Another example of a particularly preferred production method may be a production method which comprises a dispersing step of adding, to a solution having the polymer (C) dissolved in a solvent (a1) wherein the solubility of water at 20° C. is less than 1.0 wt %, water and a solvent (a2) wherein the solubility of water at 20° C. is at least 1.0%, followed by dispersing, and a distillation step of distilling off at least the solvents (a1) and (a2). This method will be described in detail in "WITH RESPECT TO THE FOURTH EMBODIMENT".

An apparatus to produce the resin dispersion by adding water after bringing the polymer in a state melted or dissolved in a solvent, is not particularly limited, and for example, a reactor equipped with a stirrer, or a single screw or twin screw kneader may be used. The stirring speed at that time varies to some extent depending upon the choice of the apparatus, but it is usually within a range of from 10 to 1,000 rpm.

(5) Aqueous Resin Dispersion

The polymer (C) of the present invention is excellent in dispersibility in water, and according to the method for producing a resin dispersion of the present invention, an aqueous resin dispersion with fine dispersed particle sizes can be obtained. Therefore, the aqueous resin dispersion of the present invention has merits such that the dispersed particle sizes are fine, and the resin is dispersed stably. Accordingly, when it is used, a coated product having an excellent appearance can be obtained.

With respect to the dispersed particle sizes of the polymer (resin) in the resin dispersion, when the particle diameter at 50% on cumulative basis from the finest particle diameter as calculated by volume (which is referred to as the 50% particle diameter, the 50% average particle diameter, the volume average particle diameter, or the median diameter) is obtained, the 50% particle diameter is usually at most 10 µm, preferably at most 1 µm. According to the present invention, the 50% particle diameter may be made to be at most 0.5 µm, more preferably at most 0.3 µm, further preferably at most 0.2 µm, most preferably at most 0.1 µm. When the 90% particle diameter is likewise obtained, more preferably, the 90% particle diameter may be made to be at most 1 µm, particularly preferably at most 0.5 µm. By adjusting the dispersed particle diameter to be small, it is possible to improve the dispersion stability, whereby agglomeration tends to hardly take place, and the particles can be dispersed more stably. Further, the ratio of the 90% particle diameter to the 50% particle diameter being small means that the particle size distribution is narrow, and consequently, the dispersion stability is improved.

In the resin dispersion of the present invention, the solid content is preferably at least 5 wt %, more preferably at least 10 wt %, further preferably at least 20 wt %, based on the entirety. And, it is preferably at most 70 wt %, more preferably at most 60 wt %, further preferably at most 50 wt %, particularly preferably at most 40 wt %. The smaller the amount of the solid content, the lower the viscosity, whereby the dispersion can be applied to various coating methods and is easy to use, and the stability as a dispersion tends to be high. However, for example, when it is used as a primer or an adhesive, the solid content is preferably high in order to save the energy and time for drying water after the coating.

As described in the foregoing, the aqueous resin dispersion of the present invention has merits such that no surfactant is required, and yet, the dispersed particle sizes are very fine.

However, a surfactant may be incorporated as the case requires depending upon the application or other purposes.

As the surfactant, a cationic surfactant, an anionic surfactant, a nonionic surfactant, an amphoteric surfactant or a reactive surfactant may, for example, be used. As a surfactant, one having, as a hydrophobic group, an alkyl, alkenyl, alkylaryl or alkenylaryl group having at least 4 carbon atoms, is usually employed. The carbon number is preferably at least 8, more preferably at least 12. However, the carbon number is usually at most 30.

The nonionic surfactant may, for example, be polyoxyethylene cetyl ether, polyoxyethylene stearyl ether, polyoxyethylene nonyl phenyl ether or polyoxyethylene sorbitan monolaurate. The anionic surfactant may, for example, be sodium dodecylbenzenesulfonate, sodium sulfosuccinate, sodium lauryl sulfate, or sodium polyoxyethylene lauryl sulfate. The cationic surfactant may, for example, be stearyl trimethylammonium chloride, or cetyl trimethylammonium bromide. The amphoteric surfactant may, for example, be lauryl dimethylamino succinic acid betaine.

Further, as the above surfactant, a so-called reactive surfactant having a radical polymerization functional group may, for example, be used. When such a reactive surfactant is used, the water resistance of the coating film formed by using such a resin dispersion can be improved. A typical commercially available reactive surfactant may, for example, be Eleminol JS-2 (manufactured by Sanyo Chemical Industries, Ltd.) or Latemul S-180 (manufactured by Kao Corporation).

The amount of the surfactant per 100 parts by weight of the polymer (C) is usually at most 50 parts by weight, preferably at most 30 parts by weight.

However, no surfactant being required is one of merits of the present invention. Accordingly, the amount of the surfactant should better be small, and the content of the surfactant in the resin dispersion is preferably at most 10 parts by weight per 100 parts by weight of the polymer (C). It is more preferably at most 5 parts by weight, further preferably at most 2 parts by weight. The surfactant may not substantially be contained. The surfactant being not substantially contained means that the content is less than 1 part by weight per 100 parts by weight of the polymer (C).

By reducing the amount of the surfactant, it is possible to prevent bleeding out which used to be a problem, and there is a merit that a coated product having an excellent appearance can be obtained, and the resin dispersion of the present invention can be used as a coating material for the outermost surface of the coating. Further, if a surfactant is contained, the water resistance of the coating tends to be low, and from this viewpoint, the amount of the surfactant should better be small.

However, a nonionic surfactant tends to hardly deteriorate the water resistance as compared with other surfactants, and accordingly, a nonionic surfactant may be contained in a relatively large amount. For example, in a case where surfactants other than a nonionic surfactant should be at most 5 parts by weight per 100 parts by weight of the polymer (C), the nonionic surfactant may be at most 10 parts by weight.

Further, it is also one of merits of the present invention that the amount of the surfactant can be reduced even without using a chlorinated polyolefin, whereby the environmental load can be reduced.

To the resin dispersion of the present invention, an acidic substance or a basic substance may be added as the case requires. As the acidic substance, an inorganic acid such as hydrochloric acid or sulfuric acid, or an organic acid such as acetic acid, may, for example, be mentioned. As the basic substance, an inorganic base such as sodium hydroxide or potassium hydroxide, or an organic base such as ammonia, methylamine, ethylamine, propylamine, butylamine, hexylamine, octylamine, ethanolamine, propanolamine, diethanolamine, N-methyldiethanolamine, dimethylamine, diethylamine, triethylamine, tripropylamine, N,N-dimethylethanolamine, 2-dimethylamino-2-methyl-1-propanol, 2-amino-2-methyl-1-propanol or morpholine, may, for example, be mentioned.

It is preferred to add a basic substance in a case where the resin has acidic groups and to add an acidic substance in a case when the resin has basic groups, whereby there will be a merit that the hydrophilicity of the resin can be increased, and the dispersed particle sizes can be made finner.

To the resin dispersion of the present invention, various additives may be incorporated as the case requires within a range not to substantially impair the effects of the present invention. For example, various stabilizers such as an ultraviolet absorber, an antioxidant, a weather resistant stabilizer or a heat resistant agent; colorants such as titanium oxide and an organic pigment; and various additives such as pigment, carbon black, an electroconductivity-imparting agent such as ferrite, a dye, a pigment dispersant, a leveling agent, a defoaming agent, a thickener, an antiseptic, a mildewcide, an anti-corrosion agent and a wetting agent, may be incorporated.

The defoaming agent may, for example, be SURFYNOL 104PA or SURFYNOL 440 manufactured by Air Products.

In order to further improve various coating film properties such as water resistance and solvent resistance, a crosslinking agent may be added in an amount of from 0.01 to 100 parts by weight per 100 parts by weight of the resin in the dispersion. As such a crosslinking agent, a self-crosslinkable crosslinking agent, a compound having a plurality of functional groups reactive with carboxyl groups in its molecule, or a metal complex having polyvalent coordination positions, may, for example, be used. Among them, an isocyanate compound, a melamine compound, a urea compound, an epoxy compound, a carbodiimide compound, an oxazoline group-containing compound, a zirconium salt compound or a silane coupling agent may, for example, be preferred. Or, such crosslinking agents may be used in combination.

In a case where the resin dispersion of the present invention is to be used as a primer, coating material or ink, a hydrophilic organic solvent other than water may be incorporated for the purpose of increasing the drying speed or to obtain a good finished surface. Such a hydrophilic organic solvent may, for example, be an alcohol such as methanol or ethanol, a ketone such as acetone, a glycol such as ethylene glycol or propylene glycol, or its ether, or N-methylpyrrolidone. Preferred is isopropanol, ethanol, propylene glycol monomethyl ether, ethylene glycol monobutyl ether or N-methylpyrrolidone. The content of such a hydrophilic organic solvent is usually at most 20 wt %, preferably at most 10 wt %, more preferably at most 5 wt %, based on the total amount of water and the organic solvent.

(5-1) Combined Use of Other Resins

To the resin dispersion of the present invention, an aqueous resin or a resin dispersible in water may be mixed for use, as the case requires, within a range not to substantially impair the effects of the present invention. For example, such a combined use is effective for improving the coating exterior appearance (glazing or delustering) or to reduce tackiness. It may be a resin dispersible by means of a surfactant. As an aqueous resin, a resin mentioned as a hydrophilic polymer (B) may, for example, be used, and for example, an aqueous solution having such a resin dissolved in water may be mixed to the resin dispersion of the present invention.

The resin dispersible in water may, for example, be an acrylic resin, a polyepoxy resin, a polyester resin, a polyurethane resin, a melamine resin or an alkyd resin. The form of the resin dispersion containing such a resin and the polymer (C) is not particularly limited. For example, such a resin and the polymer (C) may, respectively, be emulsified and then mixed. By this method, particles made of such a resin and particles made of the polymer (C) are respectively separately formed, and an aqueous resin dispersion having the respective particles dispersed in water is obtainable.

Or, there is a method wherein such a resin and the polymer (C) are mixed and then emulsified. By this method, an aqueous resin dispersion is obtainable wherein particles each made of a mixture of such a resin and the polymer (C), are dispersed in water. For example, by permitting the polymer (C) to be coexistent during the polymerization of such a resin, two of them can be mixed and emulsified and dispersed in water to form particles each containing such a resin and the polymer (C). Otherwise, the resin and the polymer (C) may be separately synthesized, followed by e.g. melt-kneading to mix them, followed by emulsification and dispersion in water to form particles each containing the resin and the polymer (C).

An aqueous resin dispersion wherein particles made of the polymer (C) and particles made of the resin are separately present, is preferred in order to let the polymer (C) and the resin exhibit the respective properties effectively. Such an aqueous resin dispersion may be obtained, for example, by mixing a dispersion having the polymer (C) emulsified and dispersed in water and a dispersion having the resin emulsified and dispersed in water.

The weight ratio of the polyolefin (A) to said another resin is preferably from 90:10 to 10:90. Namely, based on 100 parts by weight of the total amount of the polyolefin component and another resin, the amount of the polyolefin (A) is preferably at least 10 parts by weight and at most 90 parts by weight. If the amount of the polyolefin (A) is less than 10 parts by weight, the adhesion to a polyolefin substrate tends to be inadequate. It is preferably at least 15 parts by weight, more preferably at least 20 parts by weight. If the amount of the polyolefin (A) exceeds 90 parts by weight, the physical properties of a coating film obtainable from such a composite aqueous resin dispersion, specifically, the strength, water resistance, weather resistance, abrasion resistance, solvent resistance, etc. of the coating film, tend to be inadequate. It is preferably at most 85 parts by weight, more preferably at most 80 parts by weight.

The weight ratio of the total amount of the polymer (C) and said another resin to water is preferably from 5:95 to 60:40. Namely, based on 100 parts by weigh of the total amount of the polymer (C), another resin and water, the total amount of the polymer (C) and another resin is at least 5 parts by weight and at most 60 parts by weight. If the total amount is less than 5 parts by weight, the working efficiency for coating, heat-curing, etc. tends to be poor, such being not practical. It is preferably at least 10 parts by weight, more preferably at least 15 parts by weight. If it exceeds 60 parts by weight, the viscosity of the aqueous resin dispersion tends to be too high, the coating property tends to deteriorate, and a uniform coating film tends to be hardly formed. It is preferably at most 55 parts by weight, more preferably at most 50 parts by weight.

In order to emulsify said another resin to form an aqueous resin dispersion, a surfactant may be used as the case requires. As such a surfactant, one mentioned in (5) may, for example, be used.

The content of the surfactant is usually at most 20 parts by weight per 100 parts by weight of the resin. It is preferably at most 10 parts by weight, more preferably at most 5 parts by weight, further preferably at most 2 parts by weight as the content of the surfactant is small, bleeding out of the surfactant tends to hardly take place. Most preferably, the surfactant is not substantially used.

Further, the surfactant may be used also in the method wherein the polymer (C) and the resin are mixed and then emulsified.

Said another resin is preferably at least one resin selected from the group consisting of an acrylic resin, a polyester resin, a polyurethane resin, an epoxy resin and a vinyl ester resin. The resin dispersion containing such a resin is suitable for a coating material. Hereinafter, such a resin will be generally referred to as a resin (D). With respect to a description of the resin (D), the description of resin (ID) in (5-1) under "WITH RESPECT TO THE SECOND EMBODIMENT" applies.

(5-2) Addition of Pigment

A pigment (E) may be added to the resin dispersion of the present invention. The aqueous resin dispersion containing the pigment (E) is suitable as a coating material.

The pigment which may be used is not particularly limited and may, for example, be a coloring pigment, such as an inorganic pigment such as titanium oxide, carbon black, iron oxide, chromium oxide, iron blue, red oxide, chrome yellow or yellow oxide, or an organic pigment such as an azo pigment, an anthracene pigment, a perynone pigment, a perylene pigment, a quinacridone pigment, an isoindolynone pigment, an indigo pigment or a phthalocyanine pigment; an extender pigment such as talc, calcium carbonate, clay, kaolin, silica or precipitated barium sulfate; a conductive pigment such as conductive carbon or whiskers coated with antimony-doped tin oxide; or a colorless or colored metal glitter such as a metal or alloy such as aluminum, copper, zinc, nickel, tin or aluminum oxide. They may be used alone or in combination as a mixture of two or more of them.

The amount of the pigment (E) to be added to the resin dispersion is preferably at least 10 parts by weight per 100 parts by weight of the resins (the total amount of the polymer (C) and other resins). It is more preferably at least 50 parts by weight. However, it is preferably at most 400 parts by weight, more preferably at most 200 parts by weight. As the amount increases from the lower limit value, the color-forming or hiding property tends to be high, and as the amount is smaller than the upper limit value, the adhesion, moisture resistance and oil resistance tend to be high.

At that time, a pigment dispersant may be employed. For example, an aqueous acrylic resin such as JONCRYL resin manufactured by Johnson Polymer Corporation; an acidic block copolymer such as BYK-190 manufactured by BYK-Chemie; a styrene-maleic acid copolymer; an acetylene diol derivative such as SURFYNOL T324 manufactured by Air Products; a water-soluble carboxymethylacetate butyrate such as CMCAB-641-0.5 manufactured by Eastman Chemical Company, may, for example, be mentioned. By using such a pigment dispersant, a stable pigment paste can be prepared.

As a method for dispersing the pigment (E) in the resin dispersion of the present invention, a known method may be employed without any particular restriction. For example, the pigment may be preliminarily mixed with water, a pigment dispersant, a thickener, a defoaming agent, etc., to prepare a pigment base, and then, this pigment base may be mixed with the aqueous resin dispersion. If necessary, a freeze-thaw stabilizer, a film-forming assistant, an antiseptic or a mildewcide may, for example, be incorporated. Otherwise, the pigment, water, the aqueous resin dispersion and other additives may simultaneously be mixed. For mixing, a mixer such as a dissolver, a homogenizer or a homomixer, or a dispersing machine such as a paint shaker, a ball mill, a sand mill, an attractor, a roll mill or a kneader, may be employed.

The resin dispersion of the present invention is useful for a primer, a primerless coating material, an adhesive, an ink, etc. The present invention is particularly useful for a primer, a coating material or an adhesive. It is particularly suitable for a polyolefin substrate. For example, it is useful as a coating material for automobiles such as for interior or exterior of automobiles, a coating material for home electronics such as mobile phones or personal computers or a coating material for building materials.

(6) Laminate

The resin dispersion of the present invention or a coating material containing it may be applied and heated on a substrate to form a resin layer thereby to obtain a laminate. This resin layer is a layer comprising a polymer (C) having a hydrophilic polymer (B) bonded to a polyolefin (A) in a ratio of (A):(B)=100:5 to 100:500 (weight ratio).

Such a laminate is useful for various applications for e.g. automobiles, home electronics or buildings. The substrate may be of any form such as a film, sheet or plate.

The resin dispersion of the present invention may be applied on a molded product (a substrate) of an olefin polymer having crystallinity to form a coating film. The olefin polymer as the substrate may, for example, be an olefin polymer such as high pressure method polyethylene, medium or low pressure method polyethylene, polypropylene, poly-4-methyl-1-pentene, poly-1-butene or polystyrene, or an olefin copolymer such as an ethylene-propylene copolymer, an ethylene-butene copolymer or a propylene-butene copolymer. Among these olefin copolymers, a propylene polymer is preferably employed. Further, it may be used also for the surface treatment of a molded product made of polypropylene and synthetic rubber, a molded product made of a polyamide resin, an unsaturated polyester resin, a polybutylene terephthalate resin or a polycarbonate resin, such as a molded product such as a bumper for an automobile, a steel plate, or a steel plate for electrodeposition.

The molded product to which the resin dispersion of the present invention may be applied, may be one obtained by molding any one of the above-mentioned various polymers or resins by any method selected from known molding methods such as injection molding, compression molding, blow molding, extrusion molding and rotation molding.

Also in a case where an inorganic filler such as talc, zinc white, glass fiber, titanium white or magnesium sulfate, a pigment, etc., is incorporated to such a molded product, it is possible to form a coating film with good adhesion.

(6-1) Method for Producing Laminate

The method for forming a resin layer on a substrate is not particularly limited, and a conventional method may be used. For example, various coating methods for the resin dispersion or the coating material may be mentioned such as spray coating, bar coating, spin coating, dip coating, gravure coating, etc. Usually, coating by spray coating is carried out on large size molded products such as bumpers for automobiles or home electronic products, and coating by gravure coating or bar coating is carried out on plastic films or sheets.

After applying the resin dispersion or the coating material, the coated film is cured usually by heating by a nichrome wire, infrared ray or radiofrequency wave to obtain a laminate having a desired coated film on its surface. The conditions for curing the coated film are suitably selected depending upon the material and shape of the substrate, the composition of the coating material used, etc. The curing temperature is not particularly limited, but in consideration of practical efficiency, it is usually at least 50° C., preferably at least 60° C. However, it is usually at most 150° C., preferably at most 130° C.

The thickness (after curing) of the resin layer to be laminated may suitably selected depending upon the material and shape of the substrate, the composition of the coating material used, etc., but it is usually at least 0.1 μm, preferably at least 1 μm, more preferably at least 5 μm. However, it is usually at most 500 μm, preferably at most 300 μm, more preferably at most 200 μm, particularly preferably at most 100 μm.

(6-2) Thermoplastic Resin Molded Product (F)

As the substrate for the laminate of the present invention, a thermoplastic resin molded product is preferred. The thermoplastic resin molded product (F) is not particularly limited, and for example, it is a molded product made of a polyolefin resin, a polyamide resin, a polyethylene terephthalate resin, a polybutyrene terephthalate resin or a polycarbonate resin. Among them, the present invention is preferably applicable to a thermoplastic resin molded product (F) made of a polyolefin resin (hereinafter referred to as a polyolefin molded product). And it is particularly preferably applicable to a thermoplastic resin molded product (F) made of a propylene polymer (hereinafter referred to as a propylene polymer molded product).

The polyolefin molded product is usually a molded product of crystalline polyolefin, and known various polyolefins may be employed without any particularly restriction. For example, a homopolymer of ethylene or propylene, a copolymer of ethylene and propylene, a copolymer of ethylene or/and propylene with another comonomer such as an α-olefin comonomer having at least two carbon atoms, such as 1-butene, 1-pentene, 1-hexene, 1-heptene, 1-octene, cyclopentene, cyclohexane or norbornene, or a copolymer of two or more types of such comonomers, may be used.

As the α-olefin comonomer, a $C_{2-6}$ α-olefin comonomer is preferred. Further, a copolymer of an α-olefin monomer with a comonomer such as vinyl acetate, an acrylic acid ester or a methacrylic acid ester, a copolymer thereof with a comonomer such as an aromatic vinyl monomer, or its hydrogenated product, or a hydrogenated product of a conjugated diene block copolymer may, for example, be also used. Here, when a simple term of a copolymer is used, it may be a random copolymer or a block copolymer. Further, the polyolefin may be modified as the case requires.

They may be used alone or in combination as a mixture depending upon the particular application.

The melt flow rate (MFR: 230° C., load: 2.16 kg) of the polyolefin is preferably at least 2 g/10 min, more preferably at least 10 g/10 min, particularly preferably at least 25 g/10 min. However, it is preferably at most 300 g/10 min, more preferably at most 200 g/10 min. When MFR is higher than the lower limit value, the flowability of the polyolefin tends to increase. Inversely, when MFR is lower than the upper limit value, the mechanical properties tend to be high. MFR of the polyolefin may be adjusted during the polymerization or may be adjusted after the polymerization by an organic peroxide such as diacyl peroxide or dialkyl peroxide.

The polyolefin is more preferably a propylene polymer molded product. The propylene polymer molded product is usually a molded product of a crystalline propylene polymer, and a known product may be employed. For example, a homopolymer of propylene, or a copolymer of propylene with other comonomer, for example, at least one member of α-olefin type comonomers having at least two carbon atoms, such as ethylene, 1-butene, 1-pentene, 1-hexene, 1-heptene, 1-octene, cyclopentene, cyclohexane and norbornene, may be employed.

Preferred is a propylene homopolymer and/or propylene-ethylene copolymer. Here, a propylene-ethylene copolymer is a propylene-ethylene random copolymer and/or a propylene-ethylene block copolymer, more preferably a propylene-ethylene block copolymer. Here, a propylene-ethylene block copolymer comprises crystalline polypropylene portions (a unit portions) and ethylene-propylene random copolymer portions (b unit portions).

The above a unit portions are obtained usually by homopolymerization of propylene, or in some cases, by copolymerization of propylene with a small amount of another α-olefin.

MFR (MFR: 230° C., load: 2.16 kg) of the polypropylene homopolymer for the a unit portions is preferably at least 10 g/10 min, more preferably at least 15 g/10 min, further preferably at least 20 g/10 min, particularly preferably at least 40 g/10 min. Further, it is preferably at most 500 g/10 min, more preferably at most 400 g/10 min, further preferably at most 300 g/10 min.

As this MFR is higher than the lower limit value, the fluidity tends to increase. Inversely, as MFR is lower than the above upper limit value, the mechanical properties tend to be high.

On the other hand, the b unit portions are a rubber component obtainable by random copolymerization of propylene and ethylene. The propylene content in the propylene-ethylene random copolymer portion of the b unit portions is preferably at least 30 wt %, more preferably at least 40 wt %, further preferably at least 50 wt %. However, it is preferably at most 85 wt %, more preferably at most 80 wt %, further preferably at most 75 wt %. When the propylene content is within this range, its dispersibility and the glass transition temperature will be in proper ranges, and the impact properties tend to be good. The propylene content can be adjusted by controlling the concentration ratio of propylene to ethylene at the time of polymerization of the propylene-ethylene random copolymer portion.

The molecular weight of the propylene-ethylene random copolymer portion of the b unit portions is not particularly limited. However, in consideration of the dispersibility and impact resistance, the weight average molecular weight (Mw) is preferably from 200,000 to 3,000,000, more preferably from 300,000 to 2,500,000, further preferably from 400,000 to 2,000,000.

The amounts of the a unit portions and the b unit portions are not particularly limited. However, usually, the a unit portions are preferably at most 95 wt %, more preferably from 50 to 95 wt %, further preferably from 60 to 90 wt %, based on the entire amount, and the b unit portions are preferably at least 5 wt %, more preferably from 5 to 50 wt %, further preferably from 10 to 40 wt %, based on the entire amount. When the amount of the b unit portions is higher than the lower limit value, the impact resistance tends to be high, and when it is lower than the upper limit value, the rigidity, strength and heat resistance tend to be high.

In the present invention, the amount of the b unit portions is measured by means of a temperature-raising elution fractionation method. Namely, in extraction with o-dichlorobenzene, the a unit portions will not be eluted at a temperature of at most 100° C., but the b unit portions will be easily eluted. Accordingly, the propylene-ethylene block copolymer after the production is subjected to the above extraction analysis by means of o-dichlorobenzene, whereby the composition is determined.

The ratio of the amounts of the a unit portions and the b unit portions is determined by the polymerization amount of the propylene homopolymer portion and the polymerization amount of the propylene-ethylene random copolymer portion. Accordingly, it can be adjusted, for example, by controlling the respective polymerization periods of time.

The method for producing the propylene homopolymer and the propylene-ethylene block copolymer are not particularly limited, and they are suitably selected from known methods and conditions.

As a polymerization catalyst for propylene, a highly stereoregular catalyst is usually employed. For example, a catalyst obtained by combining an organic aluminum compound and an aromatic carboxylic acid ester, with a titanium trichloride composition obtained by reducing titanium tetrachloride with an organic aluminum compound and further treating it with various electron donors and electron acceptors (JP-A-56-100806 (U.S. Pat. No. 4,533,705), JP-A-56-120712 (U.S. Pat. No. 4,309,521), or a supported catalyst obtained by contacting a magnesium halide with titanium tetrachloride and various electron donors (JP-A-57-63310 (U.S. Pat. No. 5,539,067)) may, for example, be mentioned. Further, a metallocene catalyst as shown in WO91/04257 (U.S. Pat. No. 5,026,796) may also be mentioned. Here, the metallocene catalyst may not contain alumoxane, but preferred is a catalyst having a metallocene compound and alumoxane combined i.e. a so-called Kaminsky catalyst.

The propylene-ethylene block copolymer is obtained by firstly homo-polymerizing propylene in the presence of the above catalyst by applying a production process such as a gas phase polymerization method, a liquid phase bulk polymerization method or a slurry polymerization method, followed by random polymerization of propylene and ethylene. In order to obtain a propylene-ethylene block copolymer having the above-mentioned melting properties (MFR), it is preferred to carry out multi-stage polymerization by using a slurry method or a gas phase fluidized bed method. Otherwise, it can be obtained by a method of carrying out homopolymerization of propylene by multistages, followed by random polymerization of propylene and ethylene. In a case where a propylene-ethylene block copolymer having a large amount of the b unit portions is to be prepared, a gas phase fluidized bed method is particularly preferred.

The propylene homopolymer is obtained by polymerizing propylene alone in the presence of the above catalyst by applying a production process such as a gas phase polymerization method, a liquid phase bulk polymerization method or a slurry polymerization method. In order to obtain a propylene homopolymer having the above-mentioned melting properties, it is preferred to carry out multistage polymerization by using a slurry method or a gas phase fluidized bed method.

The propylene homopolymer and the propylene-ethylene block copolymer of the present invention are desired to be excellent in mechanical properties and have high rigidity and impact resistance, so that they are useful as structural materials. Namely, the flexural modulus is preferably at least 300 MPa, more preferably from 500 to 3,000 MPa, further preferably from 1,000 to 2,000 MPa. Within such range, they will be excellent in rigidity and will be ones suitable as structural materials. Further, the IZOD impact strength is preferably at least 1 kJ/m$^2$, more preferably from 2 to 100 kJ/m$^2$, further preferably from 5 to 80 kJ/m$^2$, particularly preferably from 8 to 60 kJ/m$^2$. Within this range, they will be excellent in impact resistance and will be ones suitable as structural materials.

The thermoplastic resin molded products may be used alone or in a combination of two or more of them.

(6-3) Inorganic Filler Component

The thermoplastic resin molded product (F) to be used in the present invention may contain an inorganic filler component.

Particularly, by incorporating an inorganic filler component to a crystalline polyolefin, it is possible to improve the mechanical properties such as the flexural modulus, rigidity, etc., of the molded product.

Specifically, a plate-form filler such as talc, mica or montmorillonite; a fiber-form filler such as short glass fiber, long glass fiber, carbon fiber, alamide fiber, alumina fiber, boron fiber or zonolite; a needle-form (whisker) filler such as potassium titanate, magnesium oxysulfate, silicon nitride, aluminum borate, basic magnesium sulfate, zinc oxide, wollastonite, calcium carbonate or silicon carbonate; a particle-form filler such as precipitated calcium carbonate, heavy calcium carbonate or magnesium carbonate; or a balloon-form filler such as glass balloon, may, for example, be mentioned. An inorganic filler or pigment such as zinc white, titanium white or magnesium sulfate may also be used. Among them, from the balance of the physical properties and costs, talc, mica, glass fiber or whisker is preferred, and more preferred is talc, mica or glass fiber.

The inorganic filler component may be surface-treated with e.g. a surfactant or coupling agent. The surface-treated filler has an effect to further improve the strength or heat resistant rigidity of the molded product.

The amount of the inorganic filler component to be used, is selected within a wide range depending upon the purpose and application of the molded product. It is preferably from 1 to 80 parts by weight, more preferably from 2 to 75 parts by weight, further preferably from 5 to 60 parts by weight, per 100 parts by weight of the crystalline polyolefin.

By incorporating the inorganic filler component, the flexural modulus of the crystalline polyolefin can be improved to be preferably at least 1,000 MPa, more preferably 1,500 to 10,000 MPa, further preferably from 2,000 to 8,000 MPa. Further, the IZOD impact strength can be improved to be preferably at least 1 kJ/m$^2$, more preferably from 2 to 80 kJ/m$^2$, further preferably from 4 to 60 kJ/m$^2$.

Such inorganic fillers may be used alone or in combination as a mixture of two or more of them.

Now preferred fillers will be described in detail.

(1) Talc

The average particle diameter of talc to be used in the present invention is usually at most 10 μm, preferably from 0.5 to 8 μm, more preferably from 1 to 7 μm. The average particle diameter value is a particle diameter value at 50 wt % of the cumulative amount read out from a particle size cumulative distribution curve drawn from the results of measurement by a laser diffraction method (such as LA920W, manufactured by HORIBA, Ltd.) or by a liquid phase precipitation system light transmission method (such as CP model, manufactured by Shimadzu Corporation). The value in the present invention is an average particle diameter value measured by the laser diffraction method.

As such talc, fine particulate one obtainable by mechanically finely pulverizing natural talc and further precisely classifying it, is used. One once roughly classified may further be classified.

As the mechanical pulverization method, a method of employing a pulverizer such as a jaw crusher, a hummer crusher, a roll crusher, a screen mill, a jet pulverizer, a colloid mill, a roller mill or a vibration mill may be mentioned. The pulverized talc was once or repeatedly classified in a wet system or dry system by an apparatus such as a cyclone, a cyclone air separator, a microseparator or a sharp cut separator, to adjust the size to the above-mentioned average particle diameter.

As a method for producing talc for the present invention, it is preferred to carry out the classification operation by a sharp cut separator after pulverizing it to a specific particle size.

Such talc may be surface-treated with various organic titanate coupling agents, organic silane coupling agents, modified polyolefins having an unsaturated carboxylic acid or its anhydride grafted, fatty acids, metal salts of fatty acids, or fatty acid esters, for the purpose of improving the adhesion to the polymer or the dispersibility.

(2) Glass fiber

As glass fiber, it is common to employ glass chopped strands. The length of such glass chopped strands is usually from 3 to 50 mm, and the diameter of the fibers is usually from 3 to 25 μm, preferably from 8 to 14 μm.

As such glass chopped strands, it is preferred to employ ones having surface modification applied by means of a silane compound or having surface treatment applied by means of e.g. a polyvinyl alcohol, a polyvinyl acetate, a polyurethane, an epoxy resin or a bundling agent such as an olefin component.

The olefin component as a bundling agent may, for example, be an unsaturated carboxylic acid-modified polyolefin or a low molecular weight polyolefin.

In the present invention, in order to improve the mechanical strength by the interfacial adhesion of the crystalline polyolefin and the glass fiber, a polyolefin modified by an unsaturated carboxylic acid and/or its derivative may be incorporated. Particularly preferred is one modified, with a polypropylene being the matrix, and it is preferred to employ one having a modification ratio of from 0.1 to 10 wt %.

(3) Mica

Mica is preferably one having an average particle diameter of from 2 to 100 μm and an average aspect ratio of at least 10, more preferably one having an average particle diameter of from 2 to 80 μm and an average aspect ratio of at least 15. When the average particle diameter of mica is within the above range, it is possible to more improve the scratch resistance and impact strength of the molded product and to prevent deterioration of the exterior appearance.

Further, the mica may be any one of so-called white mica, gold mica and black mica. However, gold mica or white mica is preferred, and white mica is more preferred.

The method for producing mica is not particularly limited, and it may be produced by a method similar to the above-mentioned method for producing talc. A dry pulverization-wet classification system or a wet pulverization-wet classification system is preferred. The wet pulverization-wet classification system is more preferred.

(6-4) Elastomer Component

In a case where the thermoplastic resin molded product (F) to be used in the present invention is a crystalline polyolefin molded product, an elastomer component may further be incorporated, whereby it is possible to improve the impact resistant strength of the molded product.

Such an elastomer component may, for example, be an ethylene-α-olefin random copolymer rubber, an ethylene-α-olefin-non-conjugated diene copolymer rubber or a styrene-containing thermoplastic elastomer. As a specific example, an ethylene-α-olefin copolymer rubber such as an ethylene-propylene copolymer rubber, an ethylene-1-butene copolymer rubber, an ethylene-1-hexene copolymer rubber or an ethylene-1-octene copolymer rubber; an ethylene-α-olefin-non-conjugated diene copolymer rubber such as an ethylene-propylene-ethylidene norbornene copolymer rubber (EPDM) or a styrene-containing thermoplastic elastomer such as a hydrogenated product of styrene-butadiene-styrene triblock (SEBS) or a hydrogenated product of styrene-isoprene-styrene triblock (SEPS), may be mentioned.

These elastomers may be produced as described below.

MFR (230° C., load: 2.16 kg) of such an elastomer component is preferably from 0.5 to 150 g/10 min, more preferably from 0.7 to 100 g/10 min, further preferably from 0.7 to 80 g/10 min, when exterior material for automobiles is taken into consideration as one of the main applications of the present invention.

Such elastomer components may be used alone or in combination as a mixture of two or more of them.

(6-5) Other Components

The thermoplastic resin molded product (F) may contain, in addition to the above components, optional additives or blend components within a range not to substantially impair the effects of the present invention. Specifically, a coloring pigment, an antioxidant of e.g. phenol type, sulfur type or phosphorus type, an antistatic agent, a photostabilizer such as a hindered amine, an ultraviolet absorber, various nucleating agents such as organic aluminum talc, a dispersant, a neutralizing agent, a blowing agent, a copper inhibitor, a lubricant, a flame retardant, and a resin such as a polyethylene resin, may, for example, be mentioned.

(6-6) Method for Producing Thermoplastic Resin Molded Product (F)

To the above-mentioned resin, various components are blended as the case requires, followed by mixing and melt-kneading. The kneading method is not particularly limited, and by kneading and granulating by means of a usual kneading machine such as a single screw extruder, a twin screw extruder, a banbury mixer, a roll mixer, a bravender plastograph or a kneader, a thermoplastic resin composition to constitute the thermoplastic resin molded product (F) of the present invention will be obtained. It is preferred to employ a twin screw extruder in order to let the respective components be well dispersed.

At the time of such kneading and granulation, the above-mentioned respective components may simultaneously be kneaded, or in order to improve the performance, the respective components may be separately kneaded.

Then, the thermoplastic resin composition is molded to obtain the thermoplastic resin molded product (F). As a molding method, various known methods may be employed.

For example, injection molding (inclusive of gas injection molding), compression molding, injection compression molding (press injection), extrusion molding, blow molding, rotational molding, calendar molding, inflation molding, uniaxially stretched film forming or biaxial stretched film forming may, for example, be mentioned. Preferably, injection molding, compression molding or injection compression molding is employed, and in consideration of the productivity, etc., injection molding is particularly preferred.

(6-7) Application of Laminate

The laminate of the present invention is excellent in coating film adhesion and further has an excellent physical property balance with respect to rigidity and impact resistance. Further, in a case where the resin layer constituting the laminate contains substantially no surfactant, there will be no bleeding out, and the exterior appearance will be excellent. Further, it is not required to contain a halogen such as chlorine, whereby the environmental load can be reduced.

Accordingly, the laminate of the present invention is useful for various industrial components for e.g. automobiles, home electronic products and building materials, and it provides a practically sufficient performance as a component or material which is made to have a thin wall thickness, a high functionality or a large size.

For example, it can be used as a molding material for various industrial components, such as an automobile component such as a bumper, an instrument panel, a trim or a garnish; a home electronic instrument component such as a TV casing, a washing machine vessel, a refrigerator component, an air conditioner component or a cleaner component; a toiletry component such as a toilet sheet, a toilet sheet cover or a water tank; a component around a bathroom such as a bath tub, a wall of a bathroom, a ceiling or drainage.

With Respect to the Second Embodiment

An aqueous resin dispersion of the present invention has particles made of a polymer (IC) containing a propylene polymer (IA) and particles made of at least one resin (ID) selected from the group consisting of an acrylic resin, a polyester resin, a polyurethane resin, an epoxy resin and a vinyl ester resin, respectively dispersed in water, and satisfies the following (1) to (4):

(1) the weight ratio of the propylene polymer (IA) to the resin (ID) is from 90:10 to 10:90, (2) the weight ratio of the total amount of the polymer (IC) and the resin (ID) to water is from 5:95 to 60:40, (3) the content of a surfactant is at most 10 parts by weight per 100 parts by weight of the total amount of the polymer (IC) and the resin (ID), and (4) the 50% particle diameter of the particles made of the polymer (IC) is at most 0.5 µm and at most 0.9 time of the 50% particle diameter of the particles of the resin (ID).

By the use of the resin (ID) in combination with the polymer (IC), it is possible to obtain not only high adhesion to a polyolefin substrate by the polymer (IC) but also high adhesion to a resin other than polyolefin which can not be accomplished by the polymer (IC) alone. Further, there is a merit such that the physical properties such as the strength, water resistance, weather resistance, abrasion resistance and solvent resistance of the coating film, can be improved. Further, it is effective also to improve the external appearance of the coating (glazing or delustering) or to reduce tackiness.

In the present invention, in order to let the polymer (IC) and the resin (ID) exhibit the respective characteristics effectively, particles made of the polymer (IC) and particles made of the resin (ID) are respectively separately dispersed in water. Such an aqueous resin dispersion may, for example, be obtained by mixing a dispersion having the polymer (IC) emulsified and dispersed in water, with a dispersion having the resin (ID) emulsified and dispersed in water.

The weight ratio of the propylene polymer (IA) to the resin (ID) is from 90:10 to 10:90. Namely, based on 100 parts by weight of the total amount of the propylene polymer component and other resins, the amount of the propylene polymer (IA) is at least 10 parts by weight and at most 90 parts by weight. If the amount of the propylene polymer (IA) is less than 10 parts by weight, the adhesion to a propylene polymer substrate tends to be inadequate. It is preferably at least 15 parts by weight, more preferably at least 20 parts by weight. If the amount of the propylene polymer (IA) exceeds 90 parts by weight, the physical properties of a coating film obtainable from such a composite aqueous resin dispersion, specifically the strength, water resistance, weather resistance, abrasion resistance, solvent resistance, etc. of the coated film, tend to be inadequate. It is preferably at most 80 parts by weight, more preferably at most 70 parts by weight.

The weight ratio of the total amount of the polymer (IC) and the resin (ID) to water is from 5:95 to 60:40. Namely, based on 100 parts by weight of the total amount of the polymer (IC), the resin (ID) and water, the total amount of the polymer (IC) and the resin (ID) is at least 5 parts by weight and at most 60 parts by weight. If it is less than 5 parts by weight, the working efficiency in e.g. the coating or heat-curing tends to be poor, such being not practical. It is preferably at least 10 parts by weight, more preferably at least 15 parts by weight. If it exceeds 60 parts by weight, the viscosity of the aqueous resin dispersion tends to be too high, and the coating property tends to be poor, and it tends to be difficult to form a uniform coating film. It is preferably at most 55 parts by weight, more preferably at most 50 parts by weight.

The content of a surfactant is at most 10 parts by weight per 100 parts by weight of the resin component (the total amount of the polymer (IC) and the resin (ID)). Further, the 50% particle diameter of the particles made of the polymer (IC) is at most 0.5 μm and at most 0.9 time of the 50% particle diameter of the particles of the resin (ID).

The propylene copolymer (IA) in the present invention is excellent in dispersibility in water, and even without using or using a very small amount of a surfactant, it is possible to obtain an aqueous resin dispersion wherein the dispersed particle sizes are fine, the particle size distribution is narrow, and the particles are dispersed stably. Thus, when the resin dispersion of the present invention is used as a coating material, bleeding out can be prevented, and it is possible to obtain a coated product excellent in the exterior appearance, and it is also possible to improve the water resistance or oil resistance (GH resistance) of the coating.

The 50% particle diameter of the polymer (IC) particles is preferably at most 0.3 μm, more preferably at most 0.2 μm, most preferably at most 0.1 μm. When the 90% particle diameter is likewise obtained, more preferably, the 90% particle diameter can be made to be at most 1 μm, particularly preferably at most 0.5 μm. By reducing the dispersed particle sizes, it is possible to improve the dispersion stability to prevent agglomeration and to disperse the particles more stably. Further, the ratio of the 90% particle diameter to the 50% particle diameter being small, means that the particle size distribution is narrow, and consequently, the dispersion stability will be improved.

By reducing the particle diameter of the polymer (IC) particles to a level of at most 0.9 time of the particle diameter of the resin (ID) particles, when a coating film is formed, spaces among the resin (ID) particles will be filled with the polymer (IC) particles, and the volume of spaces will be small, whereby the adhesion to a substrate will be high, and the water resistance and solvent resistance will be improved. Further, in the coated film, a sea-islands structure is formed wherein the propylene polymer having a high adhesion to a propylene polymer substrate constitutes "sea", and other binder resins providing other functions to the coated film constitutes "islands", whereby there will be a merit such that the adhesion to a substrate will be higher, and the water resistance and the solvent resistance will be improved. The particle diameter of the polymer (IC) particles is preferably at most 0.8 time, more preferably at most 0.6 time, of the particle diameter of the resin (ID) particles.

The polymer (IC) is preferably one having a hydrophilic polymer (IB) or an acidic group bonded to a propylene polymer (IA). Such a polymer (IC) is excellent in dispersibility in water, whereby without using or using a very small amount of a surfactant, it is possible to obtain an aqueous resin dispersion wherein dispersed particle sizes are fine, the particle size distribution is narrow, and the particles are dispersed stably.

More preferably, the polymer (IC) is one having the hydrophilic polymer (IB) bonded to the propylene polymer (IA) in a ratio of (IA):(IB)=100:5 to 100:500 (weight ratio). The ratio of the propylene polymer (IA) to the hydrophilic polymer (IB) is (IA):(IB)=100:5 to 100:500 parts by weight. If the ratio of the hydrophilic polymer (IB) is smaller than this range, the polymer (IC) will not be well dispersed in water, the dispersed particle sizes tend to be very large, whereby the particles tend to be agglomerated or separated. On the other hand, if the ratio of the hydrophilic polymer (IB) is larger than this range, the adhesion to a propylene polymer substrate tends to be poor.

The method for producing the polymer (IC) by bonding the hydrophilic polymer (IB) to the propylene polymer (IA), may usually be a method (IR1) wherein a hydrophilic monomer is polymerized in the presence of the propylene polymer (IA) to form the hydrophilic polymer (IB) bonded to the propylene polymer (IA), or a method (IR2) wherein a preliminarily polymerized hydrophilic polymer (IB) is bonded to the propylene polymer (IA). Either method may suitably be selected for use depending upon the types and combination of the polyolefin and the hydrophilic polymer, the desired properties of the polymer (IC), etc. Further, as the polyolefin (A) a polypropylene polymer (IA1) having no reactive group or a polypropylene polymer (IA2) having reactive groups may be used.

Now, more detailed descriptions will be given.

(1) Propylene Polymer (IA)

The propylene polymer (IA) of the present invention is a polymer having a propylene content of at least 50 mol %. The propylene content is preferably at least 60 mol %, more preferably at least 70 mol %. Usually, as the propylene content is high, the adhesion to a polypropylene substrate tends to increase.

As the propylene polymer (IA) of the present invention, a propylene polymer (IA1) having no reactive group or a propylene polymer (IA2) having reactive groups may be used.

(1-1) Propylene Polymer (IA1) Having No Reactive Group

As the propylene polymer (IA1), known various propylene polymers and modified propylene polymers may be used without any particular restrictions. For example, a homopolymer of propylene, a copolymer of ethylene and propylene, a copolymer of propylene with another comonomer, for example, an α-olefin comonomer having at least two carbon atoms, such as 1-butene, 1-pentene, 1-hexene, 1-heptene, 1-octene, cyclopentene, cyclohexene or norbornene, or a copolymer of two or more of such comonomers, may be used. The α-olefin comonomer is preferably a $C_{2-8}$ α-olefin comonomer, more preferably a $C_{2-6}$ α-olefin comonomer.

Further, a copolymer of propylene with a comonomer such as vinyl acetate, an acrylic acid ester or a methacrylic acid ester, a hydrogenated product of a copolymer of two or more monomers selected from aromatic vinyl monomers and conjugated diene monomers, may, for example, be used. Here, when a copolymer is simply mentioned, it may be a random copolymer or a block copolymer. Further, a chlorinated propylene polymer having such a propylene polymer chlorinated, may also be used. The chlorination degree of such a chlorinated propylene polymer is usually at least 5 wt %, preferably at least 10 wt %, and the chlorination degree is usually at most 50 wt %, preferably at most 30 wt %.

Specifically, the propylene polymer (IA1) may, for example, be a polypropylene, an ethylene-propylene copolymer, a propylene-butene copolymer, an ethylene-propylene-butene copolymer, a propylene-hexene copolymer, a chlorinated polyethylene, a chlorinated ethylene-propylene copolymer or a chlorinated propylene-butene copolymer. Preferred is a propylene homopolymer, or a copolymer of propylene with other α-olefin. They may be chlorinated. More preferred is a propylene homopolymer, an ethylene-propylene copolymer, a propylene-butene copolymer, an ethylene-propylene-butene copolymer, a chlorinated polypropylene, a chlorinated ethylene-propylene copolymer, or a chlorinated propylene-butene copolymer.

They may be used alone or in combination as a mixture of two or more of them.

The propylene polymer (IA1) in the present invention preferably has a weight average molecular weight Mw of from 1,000 to 500,000, as measured by GPC and calculated by a calibration curve of each propylene polymer. The lower limit value is more preferably 10,000, further preferably 30,000, particularly preferably 50,000. The upper limit value is more preferably 300,000, further preferably 250,000, particularly preferably 200,000. As Mw becomes higher than the lower limit value, stickiness tends to be less, and the adhesion to the substrate tends to increase, and as it becomes lower than the upper limit value, the viscosity tends to be low, whereby the preparation of the resin dispersion tends to be easy. Here, the GPC measurement is carried out by a conventional method employing a commercially available apparatus and by using e.g. o-dichlorobenzene as a solvent.

One of the most preferred forms of the propylene homopolymer or copolymer is one having entirely or partially an isotactic structure as stereoregularity. For example, not only a usual isotactic polypropylene but also an isotactic block polypropylene or a stereo-block polypropylene may be used.

Preferably, the propylene polymer (IA1) is a homopolymer or copolymer of a stereo-block polypropylene having isotactic blocks and atactic blocks. Most preferred is a stereo-block polypropylene polymer having isotactic blocks and atactic blocks.

More preferably, when peaks derived from the carbon atom of a methyl group of a propylene unit chain portion of a head-to-tail linkage, are observed by $^{13}$C-NMR and the chemical shift of a peak top of a peak attributable to a pentad represented by mmmm is set to be 21.8 ppm, the ratio ($S_1$/S) of the area $S_1$ of a peak having a peak top at 21.8 ppm to the total area S of peaks appearing from 19.8 ppm to 22.1 ppm, is from 20% to 70%. The lower limit value is preferably 30%, further preferably 35%, particularly preferably 40%. The upper limit value is preferably 65%, more preferably 60%, particularly preferably 55%. As it is higher than the lower limit value, the stickiness tends to be less, and as it is lower than the upper limit value, the crystallinity tends to be low, and preparation of the resin dispersion tends to be easy.

Further preferably, when the area of a peak (mmmr) having a peak top from 21.5 to 21.7 ppm is represented by $S_2$, $4+2S_1/S_2>5$.

Further, it is preferred that the propylene polymer (IA1) is a propylene-α-olefin copolymer, which has a propylene content of from 50 mol % to 95 mol %, and the molecular weight distribution Mw/Mn of the polymer (IA1) is at most 3.0. Such a copolymer has a melting point lower than the propylene homopolymer and thus has a merit that with a resin dispersion employing it, the baking temperature after the coating can be lowered. The α-olefin is preferably a $C_{2-8}$ α-olefin, more preferably a $C_{2-6}$ α-olefin, further preferably a $C_{2-4}$ α-olefin, most preferably 1-butene.

Usually, as the propylene content is high, the adhesion to a polypropylene substrate tends to increase. It is preferably at least 60 mol %, more preferably at least 70 mol %. However, the propylene content is at most 95 mol %. Usually, by lowering the propylene content, the melting point of the copolymer can be lowered, and for example, there will be a merit such that the baking temperature after coating can be lowered. It is preferably at most 90 mol %, more preferably at most 85 mol %.

The 1-butene content is preferably from 5 mol % to 50 mol %. It is more preferably at least 10 mol %, further preferably at least 15 mol %. Further, it is more preferably at most 40 mol %, further preferably at most 30 mol %.

The polymer (IA1) may contain a small amount of constituting units derived from an α-olefin other than propylene and 1-butene. For example, it may contain at most 10 mol %, more preferably at most 5 mol %, of ethylene.

The polymer (IA1) may be a random copolymer or a block copolymer, preferably a random copolymer, whereby the melting point of the copolymer can more effectively be lowered. Further, the polymer (IA1) may be straight-chained or branched.

Preferably, the polymer (IA1) is one wherein the molecular weight distribution Mw/Mn represented by the ratio of the weight average molecular weight Mw to the number average molecular weight Mn is at most 3.0. This means that the molecular weight distribution is narrow, and the molecular weight of the copolymer is uniform. By using such a polymer (IA1), control of the particle size becomes easy at the time of dispersing in water, and there will be a merit such that a resin dispersion wherein the dispersed particle sizes are small, the particle size distribution is narrow and the particles are dispersed stably, can be obtained. It is more preferably at most 2.5. However, usually, it is at least 1.0. The molecular weight distribution Mw/Mn can be obtained by GPC.

More preferably, the melting point Tm of the polymer (IA1) is preferably at most 120° C. It is more preferably at most 100° C., further preferably at most 90° C. As the melting point Tm is lower than 120° C., the crystallinity tends to be low, and the solubility in the solvent will be improved, and the emulsification and dispersion operations tend to be more readily carried out at a low temperature, such being desirable. Further, in a case where such a resin dispersion is used in an application as e.g. a coating material or adhesive, it is advantageous that it melts at a low baking temperature. However, the melting point Tm of the polymer (IA1) is usually at least 35° C., preferably at least 50° C., more preferably at least 60° C., further preferably at least 65° C., most preferably at least 70° C. It is advantageous from the viewpoint of high thermal resistance, high hardness and non-tackiness. The melting point Tm can be measured by a differential scanning calorimeter (DSC).

As a commercial product available as the polymer (IA1), Tafmer XM-7070 or XM-7080, manufactured by Mitsui Chemicals, Inc., may, for example, be mentioned.

As the polyolefin (A1), one type may be used alone, or two or more types may be used in combination.

The method for preparing the propylene polymer (IA1) of the present invention is not particularly limited and may be any method so long as it is capable of producing a polymer satisfying the requirements of the present invention. For example, radical polymerization, cationic polymerization, anionic polymerization or coordination polymerization may be mentioned, and each may be living polymerization.

In the case of coordination polymerization, a method for polymerization by a Ziegler Natta catalyst or a method for polymerization by a single site catalyst or a Kaminsky catalyst may, for example, be mentioned. As a preferred method, a production method by means of a single site catalyst may be mentioned. As a reason, it may be mentioned that in general, with a single site catalyst, by designing the ligand, the molecular weight distribution or the stereoregularity distribution can be made sharp. Further, as the single site catalyst, a metallocene catalyst or a Brookhart type catalyst may, for example, be used. In the case of the metallocene catalyst, a preferred catalyst may be selected depending upon the stereoregularity of the polyolefin to be polymerized, such as $C_1$ symmetric type, $C_2$ symmetric type, $C_{2V}$ symmetric type or $C_S$ symmetric type. Preferably, a $C_1$ symmetric type or $C_2$ symmetric type metallocene catalyst may be employed.

Further, the polymerization may be of any type such as solution polymerization, slurry polymerization, bulk polymerization or gas-phase polymerization. In the case of solution polymerization or slurry polymerization, the solvent may, for example, be an aromatic hydrocarbon such as toluene or xylene, an aliphatic hydrocarbon such as hexane, octane or decane, an alicyclic aliphatic hydrocarbon such as cyclohexane or methyl cyclohexane, a halogenated hydrocarbon such as methylene chloride, carbon tetrachloride or chlorobenzene, an ester such as methyl acetate, ethyl acetate, propyl acetate or butyl acetate, a ketone such as acetone, methyl ethyl ketone, methyl isobutyl ketone or cyclohexanone, an alcohol such as methanol, ethanol, n-propanol, isopropanol or n-butanol, an ether such as dibutyl ether or tetrahydrofuran, or a polar solvent such as dimethylformamide or dimethylsulfoxide. Among them, an aromatic hydrocarbon, an aliphatic hydrocarbon or an alicyclic hydrocarbon is preferred, and more preferred is toluene, xylene, hexane, heptane, cyclopentane or cyclohexane. These solvents may be used alone or in combination as a mixture of two or more of them.

(1-2) Propylene Polymer (IA2) Having Reactive Groups

As the propylene polymer (IA2) having reactive groups, a copolymer (IA2a) having an unsaturated compound having no reactive group and an unsaturated compound having a reactive group copolymerized at the time of polymerization, or a polymer (IA2b) having a radical polymerizable unsaturated compound having a reactive group graft-polymerized to a propylene polymer, may, for example, be used.

The copolymer (IA2a) is a copolymer which is obtainable by copolymerizing an unsaturated compound having no reactive group with an unsaturated compound having a reactive group and which has the unsaturated compound having the reactive group inserted to the main chain. For example, it is obtainable by copolymerizing propylene with an α,β-unsaturated carboxylic acid or its anhydride such as an acrylic acid or maleic anhydride. Specifically, as the copolymer (IA2a), a propylene-acrylic acid copolymer, or a propylene-an acrylic acid ester-maleic anhydride copolymer, may, for example, be used. These copolymers may be used alone or in combination as a mixture of two or more of them. As the production method, a method described in (IA1) may be used in the same manner.

The polymer (IA2b) is obtainable by graft-polymerizing a radical polymerizable unsaturated compound having a reactive group to a preliminarily polymerized propylene polymer, wherein the unsaturated compound having a reactive group is grafted to the main chain. It is, for example, a polymer obtained by grafting e.g. (meth)acrylic acid, fumaric acid, maleic acid or its anhydride, itaconic acid or its anhydride, crotonic acid, 2-hydroxyethyl (meth)acrylate or 2-hydroxypropyl (meth)acrylate, (meth)acrylamide, (dimethylamino) ethyl (meth)acrylate, glycidyl (meth)acrylate, or (2-isocyanate)ethyl (meth)acrylate, to a propylene polymer such as a polyethylene or a propylene-butene copolymer. These polymers may be used alone or in combination as a mixture of two or more of them. Here, (meth)acrylic acid is a general term for acrylic acid and methacrylic acid, and such applies to other similar cases.

As the propylene polymer in this reaction, the above-mentioned propylene polymer (IA1) having no reactive group may be used.

Specifically, the polymer (IA2b) may, for example, be a maleic anhydride-modified polypropylene or its chlorinated product, a maleic anhydride-modified ethylene-propylene copolymer or its chlorinated product, a maleic anhydride-modified propylene-butene copolymer, an acrylic acid-modified propylene or its chlorinated product, an acrylic acid-modified ethylene-propylene copolymer or its chlorinated product, or an acrylic acid-modified propylene-butene copolymer. These copolymers may be used alone or in combination as a mixture of two or more of them.

The radical polymerization initiator to be used for the graft polymerization may be suitably selected for use from usual radical polymerization initiators, and for example, an organic peroxide or azonitrile may be mentioned. As the organic peroxide, a peroxyketal such as di(t-butylperoxy)cyclohexane, a hydroperoxide such as cumene hydroperoxide, a dialkyl peroxide such as di(t-butyl) peroxide, a diacyl peroxide such as benzoyl peroxide, or a peroxyester such as t-butyl peroxy isopropyl monocarbonate may be used. The azonitrile may, for example, be azobisbutyronitrile or azobisisopropylnitrile. Among them, benzoyl peroxide or t-butyl peroxy isopropyl monocarbonate is particularly preferred. These initiators may be used alone or in combination as a mixture of two or more of them.

The ratio of the radical polymerization initiator to the graft copolymer units to be used is usually within a range of radical polymerization initiator:graft copolymer units=1:100 to 2:1 (molar ratio), preferably within a range of 1:20 to 1:1.

The process for producing the polymer (A2b) is not particularly limited and may be any method so long as it is capable of producing a polymer satisfying the requirements of the present invention. For example, a solution modification method (a method of heating and stirring in a solution for the reaction) or a melt modification method (a method of melting, heating and stirring in the absence of a solvent, or a method of heating and kneading by an extruder for the reaction) may be mentioned.

As the solvent in the case of production in the solution, the solvent mentioned in (1-1) may be used in the same manner.

The reaction temperature is usually at least 50° C., preferably within a range of from 80 to 300° C. More preferably, in the case of the solution modification method, the temperature is within a range of from 80 to 200° C., and in the case of the melt modification method, the temperature is within a range of from 150 to 300° C. The reaction time is usually from about 2 to 20 hours. The reaction time is usually from about 2 to 20 hours.

The content of reactive groups in the propylene polymer (IA2a) having reactive groups is preferably within a range of from 0.01 to 5 mmol per 1 g of the propylene polymer i.e. from 0.01 to 5 mol/g. The lower limit value is more preferably 0.05 mmol/g, further preferably 0.1 mmol/g, particularly preferably 0.15 mmol/g. The upper limit value is more preferably 1 mmol/g, further preferably 0.8 mmol/g. As it is higher than the lower limit value, the amount of the hydrophilic polymer (IB) bonded increases, and the hydrophilicity of the polymer (IC) increases, whereby the dispersed particle sizes tend to be small, and as it is lower than the upper limit value, the adhesion to a crystalline propylene polymer as a substrate tends to increase.

Here, the propylene polymer (IA2) may be a straight-chained or branched.

In the present invention, both of the propylene polymer (IA1) having no reactive group and the propylene polymer (IA2) having reactive groups may suitably be used depending upon the combination with the hydrophilic polymer (IB) or the desired properties of the polymer (IC). However, preferred is the propylene polymer (IA2) having reactive groups. The amount of the hydrophilic polymer (IB) to be bonded can thereby be easily controlled, and there is a merit such that various reactions may be employed for the bonding.

The reactive groups may, for example, be carboxylic acid groups, dicarboxylic anhydride groups, dicarboxylic anhydride monoester groups, hydroxyl groups, amino groups, epoxy groups or isocyanate groups. More preferably, the propylene polymer (IA) has carboxylic acid derivative groups i.e. at least one group selected from the group consisting of carboxylic acid groups, dicarboxylic anhydride groups and dicarboxylic anhydride monoester groups. These carboxylic acid groups, etc. are highly reactive and can easily be bonded to a hydrophilic polymer. Not only that, there are many unsaturated compounds having such groups, which may easily be copolymerized or graft-polymerized to a propylene polymer.

In the case of a carboxylic acid derivative group, the content of the reactive group is an amount calculated as a group represented by —C(=O)O—. Namely, a dicarboxylic anhydride group is regarded as containing two carboxylic acid groups in the group, and accordingly, 1 mol of the dicarboxylic anhydride group is counted as 2 mols of the reactive group.

Either one of the polymer (IA2a) and the polymer (IA2b) may be used. Usually, however, preferred is the polymer (IA2b), since it has a merit such that the amount of the hydrophilic polymer (IB) to be bonded can easily be controlled.

(2) Polymer (IC) Having an Acidic Group Bonded to Propylene Polymer (IA)

One having an acidic group bonded to a propylene polymer (IA) may be used as it is, as the polymer (IC).

The acidic group in the present invention is meant for an electron pair accepting group and is not particularly limited. For example, a carboxylic acid group (—COOH), a sulfo group (—SO$_3$H), a sulfino group (—SO$_2$H) or a phosphono group (—PO$_2$H) may be mentioned. The carboxylic acid group may be in the state of a dicarboxylic anhydride group (—CO—O—OC—) before being dispersed in water. Among them, a carboxylic acid derivative group i.e. at least one member selected from the group consisting of a carboxylic acid group, a dicarboxylic anhydride group and a dicarboxylic anhydride monoester group, is preferred. The carboxylic acid derivative group may, for example, be a (meth)acrylic acid group, a fumaric acid group, a maleic acid group or its anhydride group, an itaconic acid group or its anhydride group, or a crotonic acid group.

The amount of the acidic group bonded is preferably within a range of from 0.4 to 5 mmol per 1 g of the propylene polymer (IA), i.e. from 0.4 to 5 mmol/g. The more preferred lower limit value is 0.6 mmol/g, a further preferred lower limit value is 0.8 mmol/g. A more preferred upper limit value is 3 mmol/g, and a further preferred upper limit value is 1.6 mmol/g. As it is higher than the lower limit value, the polarity of the polymer increases, and the hydrophilicity increases, whereby the dispersed particle sizes tend to be small. As it is lower than the upper limit value, the adhesion to a crystalline polyolefin as a substrate tends to increase. In the case of the carboxylic acid derivative group, the content of the acidic group is an amount calculated as a group represented by —C(=O)O—.

(3) Hydrophilic Polymer (IB)

As the hydrophilic polymer (IB), any one of a synthetic polymer, a semisynthetic polymer and a natural polymer may be employed without any particular restriction so long as it does not substantially impair the effects of the present invention. It may have reactive groups.

The synthetic polymer is not particularly limited, and for example, a poly(meth)acrylic resin, a polyether resin, a polyvinyl alcohol resin or a polyvinyl pyrrolidone resin may, for example, be used. The natural polymer is not particularly limited, and for example, a starch such as corn starch, wheat starch, sweet potato starch, potato starch, tapioca starch or rice starch, a seaweed such as dried layer, agar or sodium alginate, a plant mucilage such as gum Arabic, tragacauth gum or konjac, an animal protein such as hide glue, casein or gelatin, or a fermented mucilage such as pullulan or dextrin may, for example, be used. The semisynthetic polymer is not particularly limited, and for example, a starch such as carboxyl starch, cation starch or dextrin, or a cellulose such as viscose, methyl cellulose, ethyl cellulose, carboxylmethyl cellulose or hydroxyethyl cellulose may, for example, be used.

Among them, preferred is a synthetic polymer whereby the degree of hydrophilicity can easily be controlled, and the properties are stabilized. More preferred is an acrylic resin such as a poly(meth)acrylic resin, a polyvinyl alcohol resin, a polyvinyl pyrrolidone resin or a polyether resin. They may be used alone or in combination as a mixture of two or more of them. A highly hydrophilic polyether resin is most preferred.

The acrylic resin to be used in the present invention is usually obtained by polymerizing an unsaturated carboxylic acid or its ester or anhydride by radical polymerization, anionic polymerization or cationic polymerization. The method for bonding it with the propylene polymer (IA) is not particularly limited, and for example, a method of carrying out radical polymerization in the presence of a propylene polymer, or a method of reacting an acrylic resin having a reactive group such as a hydroxyl group, an amino group, a glycidyl group or a carboxylic (anhydride) group with a propylene polymer having a reactive group, may, for example, be mentioned.

The hydrophilic unsaturated carboxylic acid or its ester or anhydride may preferably be (meth)acrylic acid, hydroxylethyl (meth)acrylate, dimethylaminoethyl (meth)acrylate, a quaternary product of dimethylaminoethyl (meth)acrylate or (meth)acrylamide.

The polyvinyl alcohol resin to be used in the present invention is obtained usually by polymerizing vinyl acetate to obtain a polyvinyl acetate, followed by saponification. The saponification degree may be complete saponification or partial saponification.

The polyvinyl pyrrolidone resin to be used in the present invention is obtained usually by polymerizing vinyl pyrrolidone.

The polyether resin to be used in the present invention is obtained usually by subjecting a cyclic alkylene oxide or a cyclic alkylene imine to ring-opening polymerization. The method for bonding it to the propylene polymer (IA) is not particularly limited, and for example, a method of subjecting a cyclic alkylene oxide to ring-opening polymerization in a propylene polymer having reactive groups, or a method of reacting a hydrophilic polymer having reactive groups such as a polyether polyol or a polyether amine obtained by e.g. ring-opening polymerization, with a propylene polymer having reactive groups, may, for example, be mentioned.

The polyether amine is a compound having a primary or secondary amino group as a reactive group at one terminal or both terminals of a resin having a polyether skeleton. As such a polyether amine, Jeffamine M series, D series or ED series, manufactured by Huntsman Corporation may, for example, be used. The polyether polyol is a compound having a hydroxyl group as a reactive group at both terminals of a resin having a polyether skeleton.

The polyalkylene oxide or the polyalkylene imine showing hydrophilicity may, for example, be preferably polyethylene oxide, polypropylene oxide or polyethylene imine.

Before bonding to the propylene polymer (A), the hydrophilic polymer (B) to be used in the present invention preferably has at least one reactive group which is reactive thereto. As such a reactive group, a carboxylic acid group, a dicarboxylic anhydride group, a dicarboxylic anhydride monoester group, a hydroxyl group, an amino group, an epoxy group or an isocyanate group may, for example, be mentioned. Preferably, it has at least an amino group. The amino group has a high reactivity with various reactive groups such as a carboxylic acid group, a carboxylic anhydride group, a glycidyl group and an isocyanate group, whereby it is easy to bond the hydrophilic polymer to the propylene polymer. The amino group may be primary, secondary or tertiary, but more preferred is a primary amino group.

At least one reactive group may be present, but more preferably, it has only one reactive group. If it has two or more reactive groups, at the time of bonding it to the propylene polymer (IA), it tends to form a three dimensional network structure and is likely to be geled.

However, it may have a plurality of reactive groups, if a reactive group having a higher reactivity than others is only one. For example, a hydrophilic polymer having a plurality of hydroxyl groups and one amino group having a higher reactivity than the hydroxyl groups, is a preferred example. Here, the reactivity is a reactivity with the reactive group of the propylene polymer (IA).

The hydrophilic polymer (IB) in the present invention is required to have a high molecular weight in order to impart sufficient hydrophilicity to the polymer (IC), and it is one having a weight average molecular weight Mw of at least 200, as measured by GPC and calculated by a calibration curve of polystyrene. The lower limit value is preferably 300, more preferably 500. However, the weight average molecular weight Mw is preferably at most 200,000. The upper limit value is more preferably 100,000, further preferably 10,000. As Mw is higher than the lower limit value, the hydrophilicity of the polymer (IC) tends to increase, and the dispersed particle sizes tend to be small so that the dispersion tends to be stabilized, and as it is lower than the upper limit value, the viscosity tends to be low, and the preparation of the resin dispersion tends to be easy. Here, the GPC measurement is carried out by a conventional method by using a commercial available apparatus and by using e.g. THF as a solvent.

The amount of the hydrophilic polymer (IB) bonded to the propylene polymer (IA) is preferably within a range of from 0.01 to 5 mmol per 1 g of the propylene polymer, i.e. from 0.01 to 5 mmol/g. The lower limit value is more preferably 0.05 mmol/g, further preferably 0.1 mmol/g, particularly preferably 0.15 mmol/g. The upper limit value is more preferably 1 mmol/g, further preferably 0.8 mmol/g. As the amount is higher than the lower limit value, the hydrophilicity of the polymer (IC) tends to increase, and the dispersed particle sizes tend to be small so that the dispersion tends to be stabilized, and as it is lower than the upper limit value, the adhesion to a crystalline propylene polymer as a substrate tends to increase.

The propylene polymer (IA) and the hydrophilic polymer (IB) may form a graft copolymer having the hydrophilic polymer (IB) graft-bonded to the propylene polymer (IA), or a block copolymer of the propylene polymer (IA) and the hydrophilic polymer (IB) including such a state that the hydrophilic polymer (IB) is bonded to one end or both ends of the propylene polymer (IA). However, preferred is a graft copolymer in view of such merits that the content of the hydrophilic polymer (IB) is easy to control, and as compared with a block copolymer, the content of the hydrophilic polymer (IB) can easily be increased.

Heretofore, there has been a method wherein carboxylic acid groups are graft-bonded to a propylene polymer chain, and the carboxylic acid groups are neutralized by a base, followed by dispersion in water. However, according to the method of the present invention wherein the hydrophilic polymer (IB) is graft-bonded to a propylene polymer chain, as compared with the conventional method, the molar amount of the groups graft-bonded directly to the propylene polymer chain may be substantially small to attain dispersion in water. Accordingly, there is a merit such that the adhesion to a polyolefin substrate is made high without impairing the nature of the propylene polymer.

The hydrophilic polymer (IB) can be bonded to the propylene polymer (IA) by various reaction modes. Such modes are not particularly limited, and, for example, a radical graft reaction or a reaction utilizing reactive groups may be mentioned.

According to the radical graft reaction, a bond by a carbon-carbon conjugated bond will be formed.

The reaction utilizing reactive groups is one wherein both of the propylene polymer (IA) and the hydrophilic polymer (IB) have reactive groups and bonded by reacting them to form a conjugated bond or an ionic bond. As such a reaction, one mentioned in (2) under "WITH RESPECT TO THE FIRST EMBODIMENT" may be used in the same manner.

(4) Polymer (IC) Having Hydrophilic Polymer (IB) Bonded to Propylene Polymer (IA)

As a method for producing the polymer (IC) by bonding the hydrophilic polymer (IB) to the propylene polymer (IA), there is usually a method (IR1) wherein a hydrophilic polymer is polymerized in the presence of the propylene polymer (IA) to form the hydrophilic polymer (IB) bonded to the propylene polymer (IA), or a method (IR2) wherein a preliminarily polymerized hydrophilic polymer (IB) is bonded to the propylene polymer (IA). In either method, as the propylene polymer (IA), either a propylene polymer (IA1) having no reactive group or a propylene polymer (IA2) having reactive groups, may be used.

(4-1) Method (IR1) for Producing Polymer (IC)

In this method, a hydrophilic monomer is polymerized in the presence of the propylene polymer (IA) to obtain the hydrophilic polymer (IB) bonded to the propylene polymer (IA). The method for polymerization of the hydrophilic monomer may, for example, be addition polymerization, condensation polymerization or ring-opening polymerization. At that time, a hydrophobic monomer may be copolymerized, so long as it is within a range where a hydrophilic polymer can be formed after the polymerization.

Specifically, there is, for example, a method wherein a hydrophilic radical polymerizable unsaturated compound is polymerized in the presence of a radical polymerization initiator to form a hydrophilic polymer (IB) and at the same time to bond it to the propylene polymer (IA). In such a case, as the propylene polymer (IA), a propylene polymer (IA2) having reactive groups may be used, but usually, a propylene polymer (IA1) having no reactive group is employed.

The hydrophilic radical polymerizable unsaturated compound is not particularly limited, and it may, for example, be (meth)acrylic acid, hydroxyethyl (meth)acrylate, methoxypolyethylene glycol (meth)acrylate, dimethylaminoethyl (meth)acrylate, quaternary dimethylaminoethyl (meth)acrylate or vinyl pyrrolidone. The copolymerizable hydrophobic monomer may, for example, be a (meth)acrylic acid ester such as methyl (meth)acrylate or butyl (meth)acrylate, or vinyl acetate.

Otherwise, a radical polymerizable unsaturated compound may be polymerized in the presence of a radical polymerization initiator to form a polymer and at the same time to bond it to the propylene polymer (IA), followed by modifying it to the hydrophilic polymer (IB). For example, a method wherein t-butyl (meth)acrylate is polymerized and then hydrolyzed under an acidic condition to convert it to a poly(meth)acrylic acid, or a method wherein vinyl acetate is polymerized and then saponified to modify it to a polyvinyl alcohol, may be mentioned. The copolymerizable hydrophobic monomer may, for example, be a (meth)acrylic acid ester such as methyl (meth)acrylate or butyl (meth)acrylate, or vinyl acetate. In such a case, as the propylene polymer (IA), a propylene polymer (IA2) having reactive groups bonded thereto may be used, but usually, a propylene polymer (IA1) having no reactive group is employed.

Or, there is a method wherein a propylene polymer (IA2) having reactive groups is employed, and using such reactive groups as initial terminals, a hydrophilic radical polymerizable unsaturated compound, a hydrophilic ring-opening polymerization monomer or the like is polymerized to obtain a hydrophilic polymer (IB).

As the hydrophilic radical polymerizable unsaturated compound, the above-mentioned one may be used in the same manner. The hydrophilic ring-opening polymerization monomer may, for example, be ethylene oxide, propylene oxide or ethylene imine. The copolymerizable hydrophobic monomer may, for example, be trimethylene oxide, tetrahydrofuran, β-propiolactone, γ-butyrolactone or ε-caprolactone.

They may be used alone or in combination as a mixture of two or more of them.

The reaction method is not particularly limited so long as a polymer satisfying the requirements of the present invention can thereby be produced. For example, a method of heating and stirring in a solution for the reaction, a method of melting, heating and stirring in the absence of a solvent for the reaction, or a method of heating and kneading by an extruder for the reaction, may be mentioned. The reaction temperature is usually within a range of from 0 to 200° C., preferably within a range of from 30 to 150° C. As the solvent in the case of production in a solution, the solvent mentioned in (1-1) may be used in the same manner.

(4-2) Method (IR2) for Producing Polymer (IC)

In this method, a preliminarily polymerized hydrophilic polymer (IB) is bonded to the propylene polymer (IA). In this case, as the hydrophilic polymer (IB), one mentioned in (3) may be used.

Specifically, there is, for example, a method wherein firstly, at the time of polymerizing a hydrophilic monomer to form a hydrophilic polymer, an unsaturated double bond is retained in its molecule, and then it is graft-polymerized to the propylene polymer (IA) by means of a radical polymerization initiator. In such a case, as the propylene polymer (IA), a propylene polymer (IA2) having reactive groups may be used, but usually, a propylene polymer (IA1) having no reactive group is used.

Further, there is a method wherein firstly, a hydrophilic polymer having a reactive group at its terminal is formed by polymerization, and then this is bonded to a propylene polymer (IA2) having reactive groups. The hydrophilic polymer having a reactive group at its terminal may be obtained by polymerizing a hydrophilic monomer by using a compound having a reactive group, as an initiator or a chain transfer agent. Or, it may be obtained by ring-opening polymerization of a hydrophilic ring-opening polymerization monomer such as an epoxy compound.

As the hydrophilic monomer which may be used in such a case, various hydrophilic monomers mentioned in (4-1) may be used in the same manner.

They may be used alone or in combination as a mixture of two or more of them.

The reaction method is not particularly limited and may be any method so long as a polymer satisfying the requirements of the present invention can thereby be produced. For example, a method of heating and stirring in a solution for the reaction, a method of melting, heating and stirring in the absence of a solvent for the reaction, or a method of heating and kneading by an extruder for the reaction, may be mentioned. The reaction temperature is usually within a range of from 0 to 200° C., preferably within a range of from 30 to 150° C. As the solvent in the case of production in a solution, the solvent mentioned in (1-1) may be used in the same manner.

(5) Aqueous Resin Dispersion

In a case where an aqueous resin dispersion of the polymer (IC) is to be produced, its production method is not particularly limited, and for example, a method wherein a solvent other than water is added to the above polymer (IC), and the polymer is dissolved, if necessary, by heating, followed by addition of water to obtain a dispersion, or a method wherein the polymer (IC) is melted at a temperature of at least the melting temperature, and then, water is added to obtain a dispersion, may, for example, be mentioned.

Preferred is the former. By the method which comprises preparing a mixture of the polymer, water and a solvent other than water, and then, removing the solvent from the mixture to obtain an aqueous dispersion, an aqueous dispersion with fine particle sizes can easily be prepared. At the time of preparing the mixture, heating may be applied as the case requires. The temperature is usually from 30 to 150° C. The proportion of the solvent other than water in the resin dispersion is made to be usually at most 50%, finally. It is preferably at most 20%, more preferably at most 10%, particularly preferably at most 1%.

The solvent other than water to be used in this method may, for example, be an aromatic hydrocarbon such as toluene or xylene, an aliphatic hydrocarbon such as hexane, octane or decane, an alicyclic aliphatic hydrocarbon such as cyclohexane or methyl cyclohexane, a halogenated hydrocarbon such as methylene chloride, carbon tetrachloride or chlorobenzene, an ester such as methyl acetate, ethyl acetate, propyl acetate or butyl acetate, a ketone such as acetone, methyl ethyl ketone, methyl propyl ketone, methyl isobutyl ketone or cyclohexanone, an alcohol such as methanol, ethanol, n-propanol, isopropanol, n-butanol, 2-butanol, isobutanol, t-butanol, cyclohexanol, ethylene glycol, propylene glycol or butanediol, an ether such as dipropyl ether, dibutyl ether or tetrahydrofuran, an organic solvent having two or more functional groups, such as 2-methoxyethanol, 2-ethoxyethanol, 2-butoxyethanol, 2-methoxypropanol, 2-ethoxypropanol or diacetone alcohol, or a polar solvent such as dimethylformamide or dimethylsulfoxide.

Among them, a solvent soluble in water in an amount of at least 1 wt % is preferred, and more preferred is one soluble in water in an amount of at least 5 wt %. For example, methyl ethyl ketone, methyl propyl ketone, cyclohexanone, n-propanol, isopropanol, n-butanol, 2-butanol, isobutanol, t-butanol, cyclohexanol, tetrahydrofuran, 2-methoxyethanol, 2-ethoxyethanol, 2-butoxyethanol, 2-methoxypropanol, 2-ethoxypropanol or diacetone alcohol is preferred.

An apparatus to produce the resin dispersion by adding water after preparing a molten state or a state dissolved in a solvent, is not particularly limited, and for example, a reactor equipped with a stirrer, or a single screw or twin screw kneader may be used. The stirring speed at that time varies to some extent depending upon the choice of the apparatus, but it is usually within a range of from 10 to 1,000 rpm.

The polymer (IC) of the present invention is excellent in dispersibility in water, whereby the aqueous dispersion of the present invention has a merit such that the dispersed particle sizes are fine, and the resin is dispersed stably. Accordingly, by using such an aqueous dispersion, a coated product having an excellent exterior appearance can be obtained.

In the aqueous resin dispersion of the present invention, the solid content based on the entirety is preferably at least 5 wt %, more preferably at least 10 wt %, further preferably at least 20 wt %. Further, it is preferably at most 70 wt %, more preferably at most 60 wt %, further preferably at most 50 wt %, particularly preferably at most 40 wt %. As the amount of the solid content is small, the viscosity tends to be low, whereby it is easy to use, as various coating methods may be used, and as a dispersion, the stability tends to be high. However, for example, in a case where it is used as a primer or an adhesive, the solid content is preferably high in order to save the energy and time for drying of water after coating.

(5-1) Resin (ID)

In the resin dispersion of the present invention, particles made of at least one resin (ID) selected from the group consisting of an acrylic resin, a polyester resin, a polyurethane resin, an epoxy resin and a vinyl ester resin, are also dispersed. It may be a resin dispersible by means of a surfactant.

The 50% particle diameter of the particles made of the resin (ID) is not particularly limited so long as it satisfies the above-described relation with the 50% particle diameter of the polymer (IC). In consideration of the dispersion stability, etc., it is preferably from 0.01 µm to 1.0 µm, more preferably from 0.01 µm to 0.5 µm, further preferably from 0.05 µm to 0.5 µm.

Further, in a case where firstly a dispersion containing the particles made of the resin (ID) is prepared and then combined with the dispersion containing the polymer (IC) particles to obtain the resin dispersion of the present invention, the resin solid content in the dispersion containing the resin (ID) particles is preferably from 15 to 70 wt %, more preferably from 30 to 60 wt %. The liquid viscosity is preferably from 1 to 50,000 mPa·s, more preferably from 1 to 10,000 mPa·s, further preferably from 10 to 10,000 mPa·s.

Now, the resin (ID) will be described in detail.

(ID-1) Acrylic Resin

The acrylic resin of the present invention is not particularly limited so long as it is a (meth)acrylic polymer, but, it is meant for a homopolymer or copolymer of acrylic acid and/or its ester, or a homopolymer or copolymer of methacrylic acid and/or its ester. Here, (meth)acrylic means acrylic and/or methacrylic.

A specific example of the (meth)acrylic acid ester may, for example, be a (meth)acrylic acid ester monomer having a $C_{1-12}$ alkyl group, such as methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, pentyl (meth)acrylate, hexyl (meth)acrylate, cyclohexyl (meth)acrylate, octyl (meth)acrylate, 2-ethylhexyl (meth)acrylate, nonyl (meth)acrylate, decyl (meth)acrylate or dodecyl (meth)acrylate, or a (meth)acrylic acid ester having a $C_{6-12}$ aryl or aralkyl group, such as phenyl (meth)acrylate or benzyl (meth)acrylate.

Or, it may, for example, be a (meth)acrylic acid ester having a $C_{1-20}$ alkyl group containing a hetero atom, such as dimethylaminoethyl (meth)acrylate, diethylaminoethyl (meth)acrylate, 2-aminoethyl (meth)acrylate, glycidyl (meth)acrylate, 2-hydroxyethyl (meth)acrylate, hydroxybutyl (meth)acrylate, 2-methoxyethyl (meth)acrylate, 3-methoxypropyl (meth)acrylate, or an adduct of (meth)acrylic acid and a polyethyleneoxide, a (meth)acrylic acid ester having a $C_{1-20}$ alkyl group containing fluorine atoms, such as trifluoromethyl (meth)acrylate, 2-trifluoromethylethyl (meth)acrylate or 2-perfluoroethylethyl (meth)acrylate, or a (meth)acrylamide monomer such as (meth)acrylamide or (meth)acryldimethylamide.

In addition to the above (meth)acrylic acid and/or its esters, ones having double bonds at the molecular terminals, so-called macromonomers are included. Such (meth)acrylic macromonomers usually have weight average molecular weights within a range of from a few hundreds to 50,000. Such a (meth)acrylic oligomer may be used usually within a range of from 1 to 80 parts by weight per 100 parts by weight of the above-mentioned (meth)acrylic acid and/or its esters.

Further, in addition to the above macromonomers, a caprolactone modified (meth)acrylic oligomer, a terminal hydroxyl group-containing (meth)acrylic oligomer, an oligoester (meth)acrylic oligomer, an urethane (meth)acrylate or an epoxy (meth)acrylate may, for example, be mentioned.

To the acrylic resin, crosslinkable functional groups may be introduced in order to impart water resistance, heat resistance, solvent resistance or chemical resistance, and a crosslinking agent may be used in combination. For example, a copolymer having epoxy groups such as glycidyl (meth)acrylate is combined with a polyfunctional carboxylic acid or a polyfunctional amine as a crosslinking agent; a copolymer having hydroxyl groups such as 2-hydroxyethyl (meth)acrylate or hydroxybutyl (meth)acrylate is combined with a polyfunctional isocyanate; or a copolymer having carbonyl groups such as diacetone acrylamide or acrolein is combined with a crosslinking agent such as a polyfunctional hydrazine such as adipic acid dihydrazide or sebacic acid dihydrazide. Among them, the crosslinking system of the carbonyl group and the polyfunctional hydrazine is preferred, since it is curable at room temperature, while it can be stored in the form of one pack system. The amount of such crosslinkable functional groups is preferably at least 0.5 part by weight, more preferably at least 1 part by weight, per 100 parts by weight of the acrylic resin. However, it is preferably at most 20 parts by weight, more preferably at most 10 parts by weight, per 100 parts by weight of the acrylic resin. As it is higher than the lower limit value, an adequate crosslinking effect tends to be easily obtainable, and as it is lower than the upper limit value, the storage stability, etc. tend to increase.

The polymerization method to produce such an acrylic resin is not particularly limited, and for example, a method such as solution polymerization, bulk polymerization emulsion polymerization or suspension polymerization may be employed.

In order to emulsify in water, an acrylic resin obtained by solution polymerization or bulk polymerization to form an aqueous dispersion, emulsification-dispersion may be carried out by a mechanical force of e.g. a colloid mill in the presence or absence of the solution, and then the remaining solvent may be distilled off under reduced pressure or atmospheric pressure, as the case requires. When emulsion polymerization or suspension polymerization is employed, the polymer can be obtained directly in the form of an aqueous emulsion. A preferred form is an aqueous emulsion obtainable by emulsion polymerization. One available as a commercial product may, for example, be Rikabond manufactured by CSC Co., Ltd. or Acronal manufactured by BASF Japan Ltd.

The acrylic resin of the present invention preferably has a number average molecular weight of at least 1,000, more preferably at least 20,000. However, it is preferably at most 1,000,000, more preferably at least 500,000.

(ID-2) Polyurethane Resin

The polyurethane resin of the present invention is not particularly limited, and it may, for example, be a urethane polymer obtainable by reacting (i) a component containing an average of at least two active hydrogen atoms in one molecule with (ii) a polyvalent isocyanate component, or a urethane polymer obtainable by reacting an isocyanate group-containing prepolymer obtainable by reacting the above components (i) and (ii) under an isocyanate group excessive condition, with a chain extender such as a diol. In such urethane polymers, an acid component (an acid residue) may be contained.

Further, the chain extending method for the isocyanate group-containing prepolymer may be carried out by a known method. For example, using water, a water-soluble polyamine, a glycol or the like as a chain extender, an isocyanate group-containing prepolymer and the chain extender component may be reacted, if necessary, in the presence of a catalyst.

The component containing an average of at least two active hydrogen atoms in one molecule as the above component (i), is not particularly limited, but is preferably one having a hydroxyl group-based active hydrogen. The following may be mentioned as specific examples of such a compound.

(1) Diol compound: Ethylene glycol, propylene glycol, diethylene glycol, triethylene glycol, 1,2-butylene glycol, 1,3-butylene glycol, 2,3-butylene glycol, 1,4-butylene glycol, 1,5-pentandiol, neopentyl glycol, 1,6-hexane glycol, 2,5-hexanediol, dipropylene glycol, 2,2,4-trimethyl-1,3-pentandiol, tricyclodecanedimethanol, 1,4-cyclohexanedimethanol, etc.

(2) Polyether diol: An alkylene oxide adduct of the above diol compound, a ring-opening (co)polymer of an alkylene oxide or cyclic ether (such as tetrahydrofuran), for example, a polyethylene glycol, a polypropylene glycol, an ethylene glycol-propylene glycol (block or random) copolymer, a glycol, a polytetramethylene glycol, a polyhexamethylene glycol, a polyoctamethylene glycol, etc.

(3) Polyesterdiol: One obtained by polycondensation of a dicarboxylic acid (anhydride) such as adipic acid, succinic acid, sebacic acid, glutaric acid, maleic acid, fumaric acid or phthalic acid with a diol compound such as ethylene glycol, propylene glycol, 1,4-butanediol, 1,6-hexanediol, 1,8-octamethylenediol or neopentyl glycol, as mentioned in the above (1) under hydroxyl group-excessive condition. Specifically, an ethylene glycol-adipic acid condensate, a butanediol-adipic condensate, a hexamethylene glycol-adipic acid condensate, an ethylene glycol-propylene glycol-adipic acid condensate, or a polylactonediol obtained by ring-opening polymerization of lactone using glycol as an initiator, may, for example, be exemplified.

(4) Polyetheresterdiol: One obtained by adding an ether group-containing diol (such as the polyetherdiol or diethylene glycol in the above (2)) or a mixture thereof with other glycol, to a dicarboxylic acid (anhydride) as exemplified in the above (3), followed by a reaction with an alkylene oxide, for example, a polytetramethylene glycol-adipic acid condensate, etc.

(5) Polycarbonatediol: A compound represented by the formula HO—R—(O—C(O)—O—R)x-OH (wherein R is a $C_{1-12}$ saturated fatty acid diol residue, x is the number of repeating units of the molecule and usually is an integer of from 5 to 50), etc. Such a compound can be obtained by an ester exchange method of reacting a saturated aliphatic diol with a substituted carbonate (such as diethyl carbonate or diphenyl carbonate) under such a condition that hydroxyl groups would be excessive, or a method of reacting the above saturated aliphatic diol with phosgene, and if necessary, then, further reacting a saturated aliphatic diol.

The compounds as exemplified in the above (1) to (5) may be used alone or in combination as a mixture of two or more of them.

As the polyvalent isocyanate component (ii) to be reacted with the above component (i), an aliphatic, alicyclic or aromatic compound having an average of at least two isocyanate groups per molecule may be used.

As the aliphatic diisocyanate compound, a $C_{1-12}$ aliphatic diisocyanate is preferred, and it may, for example, be hexamethylene diisocyanate or 2,2,4-trimethylhexane diisocyanate. As the alicyclic diisocyanate compound, a $C_{4-18}$ alicyclic diisocyanate is preferred, and it may, for example, be 1,4-cyclohexane diisocyanate or methylcyclohexylene diisocyanate. As the aromatic isocyanate, tolylene diisocyanate, 4,4'-diphenylmethane diisocyanate or xylylene diisocyanate may, for example, be mentioned.

Further, one containing acid residues in an urethane polymer can be dispersed in water without using a surfactant or with a small amount of a surfactant, whereby water resistance of a coating film is expected to be improved. The content of acid residues is suitably within a range of from 25 to 150 (mgKOH/g), preferably from 30 to 100 (mgKOH/g), as an acid value of the urethane polymer. If the acid value is less than 25, the dispersibility in water tends to be inadequate, and it will be required to use a surfactant in many cases. On the other hand, if the acid value is larger than 150, the water resistance of the coating film tends to be poor.

As a method for introducing acid groups into an urethane polymer, a conventional method may be used without any particular restriction. For example, a method for introducing acid groups is preferred wherein a dimethylol alkanoic acid is substituted for some or all of the glycol components mentioned in the above (2) to (4) to have carboxyl groups preliminarily introduced to a polyether diol, a polyester diol or a polyether ester diol. The dimethylol alkanoic acid to be used here may, for example, be dimethylol acetic acid, dimethylol propionic acid or dimethylol butyric acid. As a commercial product, Hydran or Vondic, manufactured by Dainippon Ink and Chemicals, Incorporated or Superflex, manufactured by Dai-Ichi Kogyo Seiyaku Co., Ltd., may, for example, be mentioned.

The urethane resin in the present invention preferably has a number average molecular weight of at least 1,000, more preferably at least 20,000. However, the number average molecular weight is preferably at most 1,000,000, more preferably at most 200,000.

In a case where the aqueous dispersion of the urethane resin of the present invention is to be produced, its production method is not particularly limited, and it can be produced in accordance with the above-described method for producing the aqueous dispersion of the an acrylic resin.

(ID-3) Polyester Resin

The polyester resin of the present invention is not particularly limited, and it may, for example, be one obtained by poly-condensing a dicarboxylic acid such as adipic acid, succinic acid, sebacic acid, glutaric acid, maleic acid, fumaric acid or phthalic acid, and/or its anhydride, with a diol compound such as ethylene glycol, propylene glycol, 1,4-butanediol, 1,6-hexanediol, 1,8-octamethylenediol or neopentyl glycol, or an ether group-containing diol (such as polyethylene glycol, polypropylene glycol or polytetramethylene glycol).

Specifically, it may, for example, be an ethylene glycol-adipic acid condensate, a butanediol-adipic acid condensate, a hexamethylene glycol-succinic acid condensate, ethylene glycol-propylene-glycol-phthalic acid condensate or a polyethylene glycol-adipic acid condensate.

An aqueous dispersion of a polyester resin is obtainable by emulsifying it in water in the presence or absence of a surfactant. The production method is not particularly limited, but it can be produced in accordance with the above-mentioned method for producing an aqueous dispersion of an acrylic resin. One available as a commercial product may, for example, be Vylonal MD-1200 or MD-1245, manufactured by Toyobo Co., Ltd.

The polyester resin of the present invention preferably has a number average molecular weight of at least 1,000, more preferably at least 5,000. However, the number average molecular weight is preferably at most 500,000, more preferably at most 100,000.

(ID-4) Epoxy Resin

The epoxy resin of the present invention is not particularly limited so long as it is a polymer having at least one epoxy group per molecule. For example, it may be a polyvalent glycidyl ether of phenol which can be produced by reacting a polyhydric phenol with epichlorohydrin in the presence of an alkali, or an epoxy group-containing polymer obtainable by reacting such a polyvalent glycidyl ether of phenol with the above-mentioned polyhydric phenol.

The polyhydric phenol which may be used here, may, for example, be bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-t-butylphenyl)-2,2-propane, bis(2-hydroxynaphthyl)methane or 1,5-dihydroxynaphthalene.

Instead of such a polyhydric phenol, a hydrogenated compound having hydrogen added to some or all of double bonds in its phenyl nucleus, may be used.

Further, as the epoxy resin, a polyglycidyl ether of a phenolic novolac resin, or a polyglycidyl ether of a polyhydric alcohol may also be used. Such a polyhydric alcohol may, for example, be ethylene glycol, diethylene glycol, triethylene glycol, 1,2-propylene glycol, 1,4-propylene glycol, 1,5-pentanediol, 1,2,6-hexanetriol, glycerol, bis(4-hydroxycyclohexyl)-2,2-propane or sorbitol.

An aqueous dispersion of an epoxy resin is obtainable by emulsifying such an epoxy resin in water in the presence or absence of a surfactant. The production method is not particularly limited, but it can be produced in accordance with the above-described method for producing an aqueous dispersion of an acrylic resin.

A typical commercial product may, for example, be Denacol EM150 manufactured by Nagase ChemteX Corporation, obtained by forcibly emulsifying by a surfactant (emulsifier) novolac type epoxy resin obtained by adding epichlorohydrin to a phenol novolac resin, Epi-Rez 6006W70 or 5003W55, manufactured by Japan Epoxy Resins Co., Ltd. or WEX-5100, manufactured by Tohto Kasei Co., Ltd.

Further, Denacol EM151 or EM103, obtained by forcibly emulsifying, by an emulsifier, a bisphenol type epoxy resin obtained by similarly adding epichlorohydrin to bisphenol, or Epi-Rez 3510W60, 3515W6, 3522W60 or 3540WY55, manufactured by Japan Epoxy Resins Co., Ltd., may, for example, be mentioned.

Further, as an epoxy resin of alkyl type having epichlorohydrin added to a polyol such as sorbitol, pentaerythritol or glycerol, Denacol EX-611, EX-614, EX-411 or EX-313, manufactured by Nagase ChemteX Corporation may, for example, be mentioned.

The epoxy resin of the present invention preferably has a number average molecular weight of at least 1,000, more preferably at least 20,000. However, the number average molecular weight is preferably at most 1,000,000, more preferably at most 200,000.

(ID-5) Vinyl Ester Resin

The vinyl ester resin of the present invention is a polymer of vinyl ester alone, or a copolymer comprising a polymer of a vinyl ester monomer and another radical polymerizable monomer. As such a radical polymerizable monomer, ethylene, a (meth)acrylic acid ester, an aromatic vinyl, an unsaturated nitrile, an acrylamide, (meth)acrylic acid or an $\alpha,\beta$-unsaturated dicarboxylic acid may, for example, be mentioned.

Further, the vinyl ester monomer may, for example, be vinyl acetate, vinyl propionate, vinyl pivalate, a $C_{8-10}$ vinyl ester of a tertiary carboxylic acid, or an alkanoic acid vinyl ester such as so-called Versatic acid vinyl (such as tradename: Veova10, manufactured by Shell Chemicals Japan Ltd.) Among them, vinyl acetate is preferred, and as the vinyl ester resin, a homopolymer of vinyl acetate, or an ethylene-vinyl acetate copolymer is particularly preferred.

The weight ratio of the ethylene units and the vinyl ester units in the copolymer is such that per 100 parts by weight of the vinyl ester units, the ethylene units contained in this polymer are preferably within a range of from 5 to 70 parts by weight, more preferably from 10 to 50 parts by weight. As the ethylene units are more than 5 parts by weight, the initial adhesion and the water resistance tend to be improved, and as they are less than 70 parts by weight, the adhesive strength tends to be improved.

An emulsion of the copolymer can be produced usually by emulsion polymerization of monomers constituting the above ethylene units and the vinyl ester units. An emulsifier to be used for such emulsion polymerization may, for example, be a water-soluble polymer compound such as hydroxymethyl cellulose or carboxymethyl cellulose, or a protective colloid such as a partially saponified or completely saponified polyvinyl acetate emulsifier. In the present invention, such a partially saponified polyvinyl acetate emulsifier is employed. Among such partially saponified polyvinyl acetate emulsifiers, a partially saponified one having an average polymerization degree of from about 100 to 3,000 and an average saponification degree of from 80 to 98 mol %, is more preferred.

As a specific example of the vinyl ester resin emulsion, a commercially available aqueous emulsion of an ethylene-vinyl ester copolymer, such as SUMIKA flex 400, 401, 305, 455, 500, 510, 700, 751 or 900 (manufactured by Sumitomo Chemical Co., Ltd.), Panflex OM-4000 or OM-4200 (manufactured by Kuraray Co., Ltd.), Polysol EVA AD-2, AD-3, AD-4, AD-5, AD-51, AD-56, AD-59 or P-900 (manufactured by Showa Highpolymer Co., Ltd.), or DENKA EVA tex #20, #30, #40M, #60, #81 or #82 (manufactured by Denki Kagaku Kogyo Kabushiki Kaisha), may, for example, be used as it is.

(5-2) Surfactant

In the resin dispersion of the present invention, the content of a surfactant is at most 10 parts by weight, per 100 parts by weight of the resin component (the total amount of the polymer (IC) and the resin (ID)). Namely, despite the fact that the dispersed particle sizes of the polymer (IC) are very small, a surfactant is not substantially contained or contained only in a very small amount. There is thereby a merit such that when the resin dispersion is employed as a coating material, bleeding out can be prevented, and a coated product excellent in the exterior appearance can be obtained, and the resin dispersion of the present invention can be used as a coating material for the outermost surface of the coating. Further, it is possible to improve the water resistance or oil resistance (GH resistance) of the coating, and the obtainable resin dispersion will be excellent in each of the adhesion, water resistance, moisture resistance, oil resistance (GH resistance) and chemical resistance.

The amount of the surfactant should better be small, and the content of a surfactant in the resin dispersion is preferably at most 5 parts by weight, per 100 parts by weight of the resin component. It is more preferably at most 3 parts by weight, further preferably at most 2 parts by weight. The surfactant may not be substantially contained. The surfactant being not substantially contained means that it is less than 1 part by weight per 100 parts by weight of the total amount of the resin component.

As the surfactant, the one mentioned in (5) under "WITH RESPECT TO THE FIRST EMBODIMENT" may be used in the same manner.

(5-3) Addition of Pigment

A pigment (IE) may be added to the resin dispersion of the present invention. The aqueous resin dispersion containing a pigment (IE) is suitable as a coating material. With respect to a description of the pigment (IE), the description of the pigment (E) in (5-2) under "WITH RESPECT TO THE FIRST EMBODIMENT" applies.

(5-4) Other Additives

To the resin dispersion of the present invention, an acidic substance or basic substance, an additive, a hydrophilic organic solvent, etc. may be incorporated, as the case requires. For their description, the description in (5) under "WITH RESPECT TO THE FIRST EMBODIMENT" applies.

The aqueous resin dispersion of the present invention is useful as e.g. a primer, a primeness coating material or an adhesive, and it is particularly useful as a coating material. The coating material is one to be applied on a surface of an object for coloration, protection or bonding and is a concept including e.g. so-called ink. Such a coating material is suitable particularly for a polyolefin substrate, especially for a propylene polymer substrate. For example, it is useful as a coating material or primer for automobiles e.g. for the interior or exterior of automobiles, as a coating material for home electronics such as mobile phones or personal computers, as a coating material for building materials, as a gravure ink, as an offset ink, etc.

(6) Laminate

The resin dispersion of the present invention or a coating material containing it may be coated on a substrate and heated to form a resin layer thereby to obtain a laminate. Such a resin layer is a layer comprising a polymer (IC) containing a propylene polymer (IA) and at least one resin (ID) selected from the group consisting of an acrylic resin, a polyester resin, a polyurethane resin, an epoxy resin and an vinyl ester resin in a weight ratio of (IA):(ID)=90:10 to 10:90, wherein the content of a surfactant is at most 10 parts by weight, per 100 parts by weight of the total amount of the polymer (IC) and the resin (ID). Such a laminate is useful for various applications for e.g. automobiles, home electronics or building materials. The substrate may be a film, a sheet, a plate or the like without any particular restriction as to its shape.

With respect to other descriptions relating to the laminate and the thermoplastic resin-molded product (IF) of the present invention, the descriptions of the laminate and the thermoplastic resin-molded product (F) in (6) under "WITH RESPECT TO THE FIRST EMBODIMENT" apply.

With Respect to the Third Embodiment

A method for producing an aqueous resin dispersion comprising a modified polyolefin and water of the present invention is one which comprises a dissolving step of dissolving the modified polyolefin in a solvent (a) wherein the solubility of water at 20° C. is from 1.0 to 95.0 wt %, and a dispersing step of adding water thereto, followed by dispersing, and a distillation step of distilling off at least the solvent (a).

Namely, after once dissolving the above modified polyolefin in a solvent wherein the solubility of water is within a specific range, water is added for dispersion, and then the solvent is distilled off, whereby it is possible to obtain an aqueous resin dispersion wherein the dispersed particle sizes are fine, the particle size distribution is narrow, and the particles are dispersed stably. Further, the solvent used can easily be recovered, and thus, the method is excellent also from the environmental and process aspects.

Now, the modified polyolefin of the third embodiment will be described.

The modified polyolefin of the present invention means a polyolefin modified by a hydrophilic polymer and/or an acid. Namely, it is a polymer (IIC) having a hydrophilic polymer (IIB) and/or an acidic group bonded to a polyolefin (IIA). Such a polymer is excellent in dispersibility in water, such being desirable.

Now, it will be described in more detail.

(1) Polyolefin (IIA)

With respect to the polyolefin (IIA), the description of the polyolefin (A1) having no reactive group in (1-1) under "WITH RESPECT TO THE FIRST EMBODIMENT" applies.

(2) Polymer (IIC1) Having Acidic Group Bonded to Polyolefin (IIA)

The acidic group in the present invention is meant for an electron pair accepting group and is not particularly limited. For example, a carboxylic acid group (—COOH), a sulfo group (—SO$_3$H), a sulfino group (—SO$_2$H) or a phosphono group (—PO$_2$H) may be mentioned. Among them, a carboxylic acid group is preferred. Before being dispersed in water, the carboxylic acid group may be at least one member selected from the group consisting of a carboxylic acid group, a dicarboxylic anhydride group (—CO—O—OC—) and a dicarboxylic anhydride monoester group (hereinafter such a group may generally be referred to as a carboxylic acid derivative group). The carboxylic acid group may, for example, be a (meth)acrylic acid group, a fumaric acid group, a maleic acid group or its anhydride group, an itaconic acid group or its anhydride group, or a crotonic acid group.

The amount of the acidic group bonded is preferably within a range of from 0.4 to 5 mmol per 1 g of the polyolefin (IIA), i.e. from 0.4 to 5 mmol/g. The more preferred lower limit value is 0.6 mmol/g, a further preferred lower limit value is 0.8 mmol/g. A more preferred upper limit value is 3 mmol/g, and a further preferred upper limit value is 1.6 mmol/g. As it is higher than the lower limit value, the polarity of the polymer (IIC1) increases, and the hydrophilicity increases, whereby the dispersed particle sizes tend to be small. As it is lower than the upper limit value, the adhesion to a crystalline polyolefin as a substrate tends to increase. Here, a dicarboxylic anhydride group can be regarded as containing two carboxylic acid groups in the group, and therefore, one mol of the dicarboxylic anhydride group is counted as two mols of an acidic group (or a reactive group).

With respect to a method for producing the polyolefin polymer (IIC1), the same method as the method for producing the polyolefin (IIA2) having a reactive group bonded to a polyolefin (IIA), may be used.

(3) Polymer (IIC2) Having Hydrophilic Polymer (IIB) Bonded to Polyolefin (IIA)

The ratio of the polyolefin (IIA) to the hydrophilic polymer (IIB) is usually (IIA):(IIB)=100:5 to 100:500 parts by weight. If the proportion of the hydrophilic polymer (IIB) is smaller than this range, the polymer (IIC2) tends to fail to be well dispersed, and the dispersed particle diameters tend to be large, whereby the particles are likely to be agglomerated or separated. Inversely, if the ratio of the hydrophilic polymer (IIB) is larger than this range, the adhesion to a polyolefin molded product tends to be poor.

The method for producing the polymer (IIC2) by bonding the hydrophilic polymer (IIB) to the polyolefin (IIA), may usually be a method (IIR1) wherein a hydrophilic monomer (IIB) is polymerized in the presence of the polyolefin (IIA) to form the hydrophilic polymer (IIB) bonded to the polyolefin (IIA), or a method (IIR2) wherein a preliminarily polymerized hydrophilic polymer (IIB) is bonded to the polyolefin (IIA). Either method may suitably be selected for use depending upon the types and combination of the polyolefin (IIA) and the hydrophilic polymer (IIB), the desired properties of the polymer (IIC), etc. Further, the hydrophilic polymer (IIB) may be bonded directly to the polyolefin (IIA), or using the after-mentioned polymer (IIA2) having a reactive group bonded to a polyolefin (IIA), a hydrophilic polymer (IIB) may be bonded thereto.

(3-1) Polyolefin (IIA2) Having Reactive Group Bonded to Polyolefin (IIA)

As the polyolefin (IIA2) having reactive groups, it is possible to employ, for example, a copolymer (IIA2a) obtained by copolymerizing an unsaturated compound having no reactive group with an unsaturated compound having a reactive group at the time of polymerization of a polyolefin, or a polymer (IIA2b) obtained by graft-polymerizing a radical polymerizable unsaturated compound having a reactive group to a polyolefin (IIA), or a polymer (IIA2c) obtained by converting a polyolefin having unsaturated terminal groups to one having groups of an element of Group 13 to 17.

With respect to descriptions of the polyolefin (IIA2), the copolymer (IIA2a), the polymer (IIA2b) and the polymer (IIA2c), the descriptions of the polyolefin (A2) having reactive groups in (1-2) under "WITH RESPECT TO THE FIRST EMBODIMENT" apply.

(3-2) Hydrophilic Polymer (IIB)

With respect to descriptions of the hydrophilic polymer (IIB), the descriptions of the hydrophilic polymer (B) in (2) under "WITH RESPECT TO THE FIRST EMBODIMENT" apply.

(3-3) Method for Producing Polymer (IIC2)

The method for producing the polymer (IIC2) by bonding the hydrophilic polymer (IIB) to the polyolefin (IIA) may usually be a method (IIR1) of polymerizing a hydrophilic monomer in the presence of a polyolefin to form the hydrophilic polymer (IIB) bonded to the polyolefin, or a method (IIR2) of bonding a preliminarily polymerized hydrophilic polymer (IIB) to a polyolefin.

With respect to a description of the method (IIR1) for producing the polymer (IIC2), the description of the method (R1) for producing the polymer (C) in (3-1) under "WITH RESPECT TO THE FIRST EMBODIMENT" applies. With respect to a description of the method (IIR2) for producing the polymer (IIC2), the description of the method (R2) for producing the polymer (C) in (3-2) under "WITH RESPECT TO THE FIRST EMBODIMENT" applies.

(4) Process for Producing Aqueous Resin Dispersion of Modified Polyolefin (Polymer (IIC))

The method for producing an aqueous resin dispersion of the present invention comprises a dissolving step of dissolving the above-mentioned modified polyolefin (the polymer (IIC)) in a solvent (a) wherein the solubility of water at 20° C. is from 1.0 to 95.0 wt %, a dispersing step of adding water thereto, followed by dispersing and a distillation step of distilling off at least the solvent (a).

The solubility of water in a certain solvent is the amount of water soluble in the solvent to saturation in the mutual solubility of the solvent and water and is represented by the content of water in 100 g of a solution wherein the water is dissolved in the solvent to its saturation. As a method for measuring the solubility of water, it is, for example, possible to use the method disclosed in e.g. Solvents Guide (compiled by C. Marsden, Cleaver Hume Press Ltd., London (1963), p. 73).

Reference may conveniently be made to "4th Edition, Experimental Chemistry Lecture 1, Basic Operation 1, compiled by Japan Chemical Society, published by Maruzen" p. 153. Water and a solvent are thoroughly mixed at 20° C., and when saturation is reached, the mixture is left to stand still until the two phases are completely separated, whereupon the upper phase or the lower phase is sampled by e.g. a pipette and quantified by e.g. gas chromatography.

The solvent (a) has a solubility of water at 20° C. of from 1.0 to 95.0 wt %. If the solubility of water is less than 1.0 wt %, water being a poor solvent for the modified polyolefin will not penetrate into the solvent (a) which is a good solvent, whereby the polyolefin will not form fine particles. The solubility is preferably at least 3.0 wt %, more preferably at least 5.0 wt %.

On the other hand, if the solubility of water exceeds 95.0 wt %, the liquid-liquid separation from the water after distillation together with the water tends to be inadequate. It is preferably at most 70.0 wt %, more preferably at most 50.0 wt %, further preferably at most 40.0 wt %, most preferably at most 30.0 wt %.

The solvent having such a proper solubility of water is preferably at least one member selected from the group consisting of an alcohol, a ketone and an ester. An alcohol, a ketone or an ester not only has a proper solubility of water, but also is stable with a reactivity not so high as an amine solvent and without forming an oxide like an ether solvent, and is usually inexpensive.

For example, the alcohol may be 1-pentanol (7.0 wt %), cyclohexanol (11.0 wt %), isobutanol (16.0 wt %), n-butanol (20.0 wt %) or 2-butanol (44.0 wt %). The ketone may, for example, be methyl propyl ketone (3.3 wt %), cyclohexanone (9.5 wt %) or methyl ethyl ketone (10.4 wt %). The ester may, for example, be butyl acetate (1.9 wt %), propyl acetate (2.9 wt %), ethyl acetate (2.9 wt %) or methyl acetate (8.0 wt %). Here, in the brackets, the solubilities in water at 20° C. are indicated (source: Solvent Handbook (Kodansha) published in 1976).

These solvents may be used alone as the solvent (a).

One having two or more solvents mixed may be used as the solvent (a). In such a case, it is only required that the solubility of water at 20° C. after the mixing is within the above-mentioned range. For example, aromatic hydrocarbons, aliphatic hydrocarbons, alicyclic hydrocarbons, halogenated hydrocarbons, esters, ketones, etc. may optionally be mixed and used within such a range.

However, in consideration of the recovery after the distillation, efficiency for reuse, etc., it is preferred to use a single type of solvent as the solvent (a).

The amount of the solvent (a) to be used is preferably such that the concentration after dissolving the polyolefin is within a range of from 5 to 50 wt %. In consideration of the efficiency for use of the solvent, the amount of the solvent (a) is preferably not too much to the amount of the modified polyolefin and preferably at least 5 wt %. It is more preferably at least 10 wt %. On the other hand, it is preferably at most 50 wt % so that the viscosity of the solution is not too high, and uniform stirring can be carried out to obtain a uniform dispersion. It is more preferably at most 40 wt %.

After the dissolution step of dissolving the modified polyolefin in such a solvent (a), a dispersing step of adding water thereto for dispersion, is carried out. During the dissolution and dispersion, heating may be carried out as the case requires.

The dissolving step and/or the dispersing step is usually preferably carried out within a temperature range of from 20° C. to 150° C. In general, the higher the temperature, the easier the dissolution and dispersion. The temperature is more preferably at least 40° C. However, if the solvent to be used has a low boiling point, evaporation is likely to proceed. Therefore, the temperature is more preferably at most 100° C., further preferably at most 80° C.

The dissolving step and/or the dispersing step is usually preferably carried out under a pressure of at most 1 MPa. The pressure is more preferably at most 0.5 MPa, further preferably at most 0.2 MPa. However, the pressure is usually at least 0.01 MPa. Most preferably, it is about 0.101 MPa. In general, the dissolution or dispersion can easily be carried out at a high temperature under a high pressure, but it is required to use an expensive apparatus durable at a high temperature under a high pressure, and a large energy will be required for such a high temperature under a high pressure. According to the method for producing the aqueous resin dispersion of the present invention, it is not required to set the pressure high, and dispersion of the resin can easily be carried out, whereby no expensive apparatus is required, and no large energy will be required, such being very advantageous from the viewpoint of the production process.

The amount of water to be added in the dispersing step may vary depending also on the boiling point of the solvent (a), but usually, it is within a range of the solvent (a): water=5:95 to 95:5 by weight ratio. The speed for adding water is preferably such that to 100 g of a solution of the modified polyolefin in the solvent (a), 100 g of water is preferably added over a period of from about 0.01 hour to 10 hours. The method for addition is not particularly limited, but usually water is dropwise added.

Then, the solvent (a) will be distilled off from the mixture comprising the modified polyolefin, the solvent (a) and water. The pressure at that time is not particularly limited and is usually under reduced pressure, preferably within a range of from 0.101 MPa to 0.001 MPa, although it depends also on the boiling point of the solvent (a) or the temperature of the dispersion. At that time, usually, a part of water will also be distilled.

The amount of the solvent (a) in the aqueous resin dispersion after distilling the solvent (a) off, is usually at most 10 wt %. It is preferably at most 5 wt %, further preferably at most 2 wt %.

The following (x), (y) or (z) is conceivable as the order of addition of water and distillation of the solvent (a), and any one of such methods may be employed.

(x) Water is added in its entire amount, followed by the distillation.

(y) After adding water partly, a part of the solvent (a) is distilled off. This operation is carried out repeatedly.

(z) While water is added, the solvent (a) is continuously distilled off.

(5) Aqueous Resin Dispersion

By the method for producing an aqueous resin dispersion of the present invention, it is possible to obtain a dispersion wherein the dispersed particle sizes are fine, and the particle size distribution is narrow. Further, this dispersion is excellent also in the dispersion stability.

The dispersed particle sizes of the resin (modified polyolefin) in the aqueous resin dispersion obtained by the present invention is usually such that the 50% particle diameter is at most 10 μm, preferably at most 1 μm. According to the present invention, the 50% particle diameter can be made to be at most 0.5 μm, more preferably at most 0.3 μm, further preferably at most 0.2 μm, most preferably at most 0.1 μm. When the 90% particle diameter is likewise obtained, the 90% particle diameter is further preferably at most 1 μm, particularly preferably at most 0.5 μm. By making the dispersed particle sizes to be small, it is possible to improve the dispersion stability, to prevent agglomeration and to disperse the particles more stably. Further, the ratio of the 90% particle diameter to the 50% particle diameter being made to be small, means that the particle size distribution becomes narrow, and consequently, the dispersion stability will be improved.

The amount of the solid content in the entire aqueous resin dispersion obtained by the present invention is preferably at least 5 wt %, more preferably at least 10 wt %, further preferably at least 20 wt %. Further, it is preferably at most 70 wt %, more preferably at most 60 wt %, further preferably at most 50 wt %, particularly preferably at most 40 wt %. As the amount of the solid content is small, the viscosity tends to be low, and the dispersion can easily be used as applicable to various coating methods, and the stability tends to be high as a dispersant. However, at the time of using the dispersion as a primer or an adhesive, the solid content should better be high to save the energy and time in drying water after the coating.

To the resin dispersion of the present invention, an aqueous resin or a resin dispersible in water may be mixed for use, as the case requires, within a range not to substantially impair the effects of the present invention. For example, it is thereby possible to improve various physical properties or adhesion to a substrate film, specifically to improve the exterior appearance of the coating (glazing or delustering), to reduce the tackiness or to improve the strength, water resistance, weather resistance, abrasion resistance or solvent resistance of the coating film. For example, a resin mentioned as the hydrophilic polymer (IIB) may be used. The resin dispersible in water may, for example, be an acrylic resin, a polyepoxy resin, a polyester resin, a polyurethane resin, a melamine resin or an alkyd resin. After mixing such a resin to the modified polyolefin, the mixture can be made into a dispersion by means of the method of the present invention.

According to the production method of the present invention, the obtainable resin dispersion can be made so that the content of the surfactant is usually at most 15 parts by weight per 100 parts by weight of the polymer (IIC). Namely, the dispersed particle sizes of the resin are very small, and a surfactant is not substantially contained, or contained only in a very small amount. Heretofore, particularly in the case of an aqueous resin dispersion, if a surfactant is not used in a large amount, there has been a problem that a stabilized dispersion wherein the dispersed particle sizes are fine, can hardly be obtainable. Whereas, according to the method of the present invention, it is possible to obtain a dispersion excellent in the dispersibility as mentioned above, whereby it is not required to use a surfactant in a large amount. There is thereby a merit such that when the resin dispersion is employed as a coating material, bleeding out can be prevented, and a coated product excellent in the exterior appearance can be obtained, and the resin dispersion of the present invention can be used as a coating material for the outermost surface of the coating. Further, it is possible to improve the water resistance or oil resistance (GH resistance) of the coating, and the obtainable resin dispersion will be excellent in each of the adhesion, water resistance, moisture resistance, oil resistance (GH resistance) and chemical resistance.

The amount of the surfactant should better be small, and the content of a surfactant in the resin dispersion is preferably at most 10 parts by weight, per 100 parts by weight of the polymer (IIC). It is more preferably at most 5 parts by weight, further preferably at most 2 parts by weight. The surfactant may not be substantially contained. The surfactant being not substantially contained means that it is less than 1 part by weight per 100 parts by weight of the polymer (IIC). As the surfactant, the one mentioned in (5) under "WITH RESPECT TO THE FIRST EMBODIMENT" may, for example be used.

To the resin dispersion obtainable by the method of the present invention, an acidic substance or basic substance, an additive, a hydrophilic organic solvent, etc., may be incorporated as the case requires. With respect to their description, the description in (5) under "WITH RESPECT TO THE FIRST EMBODIMENT" applies.

The resin dispersion obtainable by the method of the present invention may be coated as a coating material on a substrate and heated to form a resin layer thereby to obtain a laminate. The substrate may be a film, sheet, plate or the like without any particularly restriction as to its shape. Such a laminate is useful for various applications for e.g. automobiles, home electronics or building materials.

With Respect to the Fourth Embodiment

A method for producing a resin dispersion comprising a modified polyolefin and water according to the fourth embodiment of the present invention is one which comprises a dispersing step of adding, to a solution having a modified polyolefin dissolved in a solvent (a1) wherein the solubility of water at 20° C. is less than 1.0 wt %, water and a solvent (a2) wherein the solubility of water at 20° C. is at least 1.0%, followed by dispersing, and a distillation step of distilling off at least the solvents (a1) and (a2).

Namely, the above modified polyolefin is preliminarily dissolved in a solvent (a1) having a low water solubility, and then, a solvent (a2) having a high solubility in water, and water were added thereto, and the modified polyolefin is dispersed, and then, the solvents (a1) and (a2) are distilled off, whereby it is possible to obtain an aqueous resin dispersion wherein the dispersed particle sizes are fine, the particle size distribution is narrow, and the particles are dispersed stably.

The modified polyolefin of the present invention means a polyolefin having a hydrophilic polymer and/or an acid bonded thereto, i.e. a polyolefin modified by the hydrophilic polymer and/or the acid. Such a polymer is excellent in dispersibility in water, such being desirable.

By the way, a polyolefin has a high hydrophobicity, and accordingly, also as a solvent for the modification step, a solvent having a low water solubility such as the solvent (a1) may be employed. Namely, as the solvent (a1), the solvent used in the modifying step of the polyolefin may be used as it is. Therefore, after the completion of the modification step, it is not required to remove the solvent or to carry out evaporation to dryness, and it is possible to carry out the dispersing process in the state of the solution having the modified polyolefin dissolved in the solvent. Accordingly, the production steps can be substantially simplified.

With respect to a description of the modified polyolefin, the description in (1) to (3) under "WITH RESPECT TO THE THIRD EMBODIMENT" applies.

(4) Method for producing an aqueous resin dispersion of modified polyolefin (Polymer (IIC))

The method for producing an aqueous resin dispersion of the present invention comprises a dispersing step of adding, to a solution having a modified polyolefin dissolved in a solvent (a1) wherein the solubility of water at 20° C. is less than 1.0 wt %, water and a solvent (a2) wherein the solubility of water at 20° C. is at least 1.0 wt %, followed by dispersing, and a distillation step of distilling off at least the solvents (a1) and (a2).

The solvent (a1) has a solubility of water at 20° C. of less than 1.0 wt %. If the solubility of water is 1.0 wt % or higher, the solubility of the polyolefin tends to be poor, and it tends to be difficult to be used as a solvent at the time of modification or polymerization of the polyolefin. The solubility of water is preferably at most 0.8 wt %, more preferably at most 0.5 wt %, further preferably at most 0.3 wt %. There is no particularly lower limit value for the solubility of water. However, in view of the purpose of the present invention, it is required to be a solvent capable of dissolving a polyolefin or its modified polyolefin.

As a solvent having such a solubility of water, a hydrocarbon solvent which may be halogenated, may be preferably mentioned. Specifically, at least one member selected from the group consisting of an aromatic hydrocarbon, an aliphatic hydrocarbon and a halogenated hydrocarbon may be mentioned.

For example, the aromatic hydrocarbon may, for example, be toluene or xylene. The aliphatic hydrocarbon includes both of a chain type and a cyclic type and may, for example, be hexane, octane, decane, cyclohexane or methylcyclohexane. The halogenated hydrocarbon may, for example, be methylene chloride, carbon tetrachloride or chlorobenzene.

These solvents may be used alone as the solvent (a1). From the environment viewpoint, a hydrocarbon solvent containing no halogen is more preferred.

The solvent (a2) has a solubility of water at 20° C. of at least 1.0 wt %. If the solubility of water is less than 1.0 wt %, water being a poor solvent for the modified polyolefin will not penetrate into the solvent (a), and the polyolefin will not form fine particles. It is preferably at least 20.0 wt %, more preferably at least 50.0 wt %, further preferably at least 80.0 wt %, still more preferably completely miscible (the solubility of water is infinite).

As a solvent having such a proper solubility of water, at least one member selected from the group consisting of a ketone, an alcohol and an ether may be mentioned.

For example, the ketone may be acetone (infinite), methyl ethyl ketone (10.4 wt %), methyl propyl ketone (3.3 wt) or cyclohexanone (9.5 wt %). The alcohol may, for example, be methanol (infinite), ethanol (infinite), n-propanol (infinite), isopropanol (infinite), n-butanol (20 wt %), 2-butanol (44 wt %), isobutanol (16 wt %), 1-pentanol (7 wt %), cyclohexanol (11 wt %), ethylene glycol (infinite), 1,2-propylene glycol (infinite), 1,3-propylene glycol (infinite), 2-methoxyethanol (infinite), 2-ethoxyethanol (infinite), 2-butoxyethanol (infinite), 2-methoxypropanol (infinite), 2-ethoxypropanol (infinite) or diacetone alcohol (infinite). The ether may, for example, be tetrahydrofuran (infinite). Here, in the brackets, the solubility in water at 20° C. is indicated (source: Solvent Handbook (Kodansha) published in 1976).

These solvents may be used alone as the solvent (a2).

The boiling point of the solvent (a2) is preferably lower than water. Namely, the boiling point is lower than 100° C. It may thereby readily be removed by distillation after dispersing. The boiling point is preferably at most 95° C., more preferably at most 90° C. Specifically, n-propanol, isopropanol, 2-butanol, acetone or methyl ethyl ketone may, for example, be mentioned.

One having two or more solvents mixed, may be used as the solvent (a1) or (a2). In such a case, it is required only that the solubility of water at 20° C. after the mixing is within the above range. However, in consideration of efficiency in recovery and reuse after the distillation, it is preferred to use one type of a solvent alone as the solvent (a1) or (a2).

The amount of the solvent (a1) to be used, is preferably such that the concentration after dissolving the modified polyolefin is within a range of from 5 to 60 wt %. When the efficiency in use of the solvent is taken into consideration, it is desired that the solvent (a1) is not too much relative to the amount of the modified polyolefin, and it is preferably at least 5 wt %, more preferably at least 10 wt %. On the other hand, in order that the viscosity of the solution is not too high, and uniform stirring can be carried out to obtain a uniform dispersion, it is preferably at most 60 wt %, more preferably at most 50 wt %.

The modified polyolefin is preliminarily dissolved in such a solvent (a1). During the dissolution, heating may be carried out as the case requires, and the temperature is usually within a range of from 20° C. to 150° C. Further, the dissolution is carried out usually under a pressure of at most 1 MPa, most preferably about 0.101 MPa. However, the pressure is usually at least 0.01 MPa.

Then, a dispersing step of adding a solvent (a2) and water to this solution, followed by dispersing, is carried out. Also during the dispersing, heating may be carried out as the case requires. The dispersing step is preferably carried out usually within a temperature range of from 20° C. to 150° C. In general, the higher the temperature, the easier the dispersing. It is more preferably at least 40° C. However, if the solvent to be used has a low boiling point, evaporation is likely to proceed and accordingly, it is more preferably at most 100° C., further preferably at most 80° C.

Further, the dispersing step is usually preferably carried out under a pressure of at most 1 MPa, more preferably at most 0.5 MPa, further preferably at most 0.2 MPa. However, the pressure is usually at least 0.01 MPa, most preferably about 0.101 MPa. In general, the dispersing can easily be carried out at a high temperature under a high pressure, but it is required to use an expensive apparatus durable at a high temperature under a high pressure, and a large energy will be required for such a high temperature under a high pressure. According to the method for producing the aqueous resin dispersion of the present invention, it is not required to set the pressure high, and dispersing of the resin can easily be carried out, whereby no expensive apparatus is required, and no large energy will be required, such being very advantageous from the viewpoint of the production process.

The amounts of the solvent (a2) and water to be added in the dispersing step may vary depending also on the boiling point of the solvent (a) and the solvent (a2), but usually, it is within a range of the (solvent (a)):(solvent (a2)+water)=5:95 to 95:5, preferably 10:90 to 50:50, by weight ratio. Further, the amounts of the solvent (a2) and water are usually within a range of (a2): water=5:95 to 95:5, preferably 20:80 to 80:20, by weight ratio.

At the time of carrying out the distillation step, the compositional fraction of the solvent (a1) is preferably smaller than the compositional fraction of the solvent (a1) at the azeotropic point of the solvent (a1), the solvent (a2) and water.

Namely, the solvent (a1) is thereby preferentially distilled off, whereby an aqueous resin dispersion can easily be produced.

The speed for the addition of water and the solvent (a2) is preferably such that when the total of water and the solvent (a2) is 100 g per 100 g of the solution of the modified polyolefin in the solvent (a1), they are added over a period of from about 0.01 hour to 10 hours. The method for the addition is not particularly limited, but usually, they are dropwise added.

Then, the solvent (a1) and the solvent (a2) are distilled off from the mixture of the modified polyolefin, the solvent (a1), the solvent (a2) and water. The pressure at that time is not particularly limited and is usually under reduced pressure, preferably within a range of from 0.101 MPa to 0.001 MPa, although it may depend on the boiling points of the solvent (a1) and the solvent (a2) or the temperature of the dispersion. At that time, usually, a part of water will also be distilled off.

After the distillation of the solvent (a1) and the solvent (a2), the total amount of the solvent (a1) and the solvent (a2) in the aqueous resin dispersion is usually at most 10 wt %, preferably at most 5 wt %, more preferably at most 2 wt %.

The following (x), (y) or (z) is conceivable as the order of addition of water and distillation of the solvent (a1) and the solvent (a2), and either method may be employed.

(x) After adding the entire amount of water and the solvent (a2), distillation of the solvent (a1) and the solvent (a2) is carried out.

(y) After adding water and the solvent (a2) partly, the part of the solvent (a1) and the solvent (a2) are partly distilled off. This operation is carried out repeatedly.

(z) While water and the solvent (a2) are added, the solvent (a1) and the solvent (a2) are continuously distilled off.

Whereas, the modified polyolefin of the present invention is usually produced by the following process steps.

Firstly, by a polymerization step, a polyolefin is obtained by the above-described polymerization reaction of an olefin monomer, and then, by a modifying step of reacting and bonding an acid and/or hydrophilic polymer to the polyolefin, a modified polyolefin is obtained. Usually, firstly, a first modifying step of bonding an acid to the polyolefin is carried out to obtain an acid-modified polyolefin, and if necessary, a second modifying step of further bonding a hydrophilic polymer, is carried out to obtain a hydrophilic polymer-modified polyolefin.

In the present invention, as a solvent for these steps, it is preferred to employ the solvent (a1). Namely, the modifying step is carried out in the above solvent (a1). The reaction solution after the modifying step is a solution having the modified polyolefin dissolved in the solvent (a1), and it may be used as it is in the dispersing step. By using the same solvent throughout many process steps, it is not required to repeat concentration to dryness, purification and dissolution for every step, and the process can be simplified, such being very advantageous from many aspects such as the cost aspect, environmental aspect, etc. More preferably, the polymerization step is also carried out in the above solvent (a1).

The method for producing an aqueous resin dispersion of the present invention preferably further contains a washing step of washing the solution having the modified polyolefin dissolved in the solvent (a1) obtained as a reaction solution after the modifying step, with a solvent (a3) having a solubility in the solvent (a1) at 20° C. of less than 1.0 wt %. The washing step and the process relating thereto will be described in detail in (5).

(5) Method for Producing Modified Polyolefin Solution

The method for producing a modified polyolefin solution of the present invention is one wherein after the modifying step of subjecting a polyolefin to a modification reaction in a solvent (b1) to obtain a solution containing a modified polyolefin, a washing step is carried out to wash this solution with a solvent (b2) having a solubility at 20° C. in the solvent (b1) of less than 1.0 wt %.

Namely, washing is carried out with the solvent (b2) which is a poor solvent to the solvent (b1).

The solvent (b1) is not particularly limited so long as it is a solvent which is capable of dissolving both a polyolefin and a modified polyolefin and which is capable of carrying out the modifying reaction. However, preferred from the viewpoint of the solubility and the reactivity is a hydrocarbon solvent which may be halogenated. Specifically, at least one member selected from the group consisting of an aromatic hydrocarbon, an aliphatic hydrocarbon and a halogenated hydrocarbon may be mentioned. The aromatic hydrocarbon may, for example, be toluene or xylene. The aliphatic hydrocarbon includes both of a chain type and a cyclic type and may, for example, be hexane, octane, decane, cyclohexane or methylcyclohexane. The halogenated hydrocarbon may, for example, be methylene chloride, carbon tetrachloride or chlorobenzene.

The solvent (b2) is not particularly limited so long as the solubility at 20° C. in the solvent (b1) is less than 1.0 wt % and it is capable of extracting and removing impurities (such as unreacted substances or by-products) in the above solution, and it may, for example, be water or an alcohol. However, preferred is water.

In the washing method, usually, the solvent (b2) is firstly added to a solution of the modified polyolefin in the solvent (b1), followed by stirring or shaking, then the mixture is left to stand to have the solvent (b1) layer and the solvent (b2) layer separated, whereupon the solvent (b2) layer is withdrawn. When this cycle is taken as one cycle, this is carried out at least once. By repeating it a few times, the removal rate of impurities can be increased. The number of repetition is not particularly limited, so long as the impurities can sufficiently be removed, but it is usually up to about 30 times.

The amount of the solvent (b2) to be used for washing once is not particularly limited, but it is usually from about 1/10 to about 10 times, by weight ratio, to the solvent (b1).

The time for the stirring or shaking is also not particularly limited, but it is usually from about one minute to about 10 hours.

The temperature of the solvent (b2) at the time of the washing may depend on the boiling points of the solvents (b1) and (b2), but it is usually from 5 to 90° C. In order to increase the performance for extraction and removal of impurities, the temperature is preferably higher than 5° C., more preferably at least 15° C., further preferably at least 25° C., particularly preferably at least 35° C. On the other hand, in order to prevent deterioration of the modified polyolefin or to increase the operation efficiency, the temperature is preferably lower than 90° C., more preferably at most 80° C., further preferably at most 70° C.

In a case where water is used as the solvent (b2), after the washing step, it is preferred to carry out a dehydration step to remove water as far as possible from the solution. The dehydration method is not particularly limited, and for example, a Dean-Stark dehydration apparatus or the like may be employed.

As the modifying step of a polyolefin, the modifying step of reacting and bonding an acid and/or a hydrophilic polymer to a polyolefin as described in (2) and (3) may be mentioned.

For example, firstly, a first modifying step of reacting a polyolefin with an acid to bond an acidic group thereby to obtain an acid-modified polyolefin, is carried out, and if necessary, a second modifying step of further bonding a hydrophilic polymer to obtain a hydrophilic polymer-modified polyolefin is carried out.

As the acidic group, one mentioned in (2) may be used, but it is preferably a carboxylic acid group, and particularly preferred is a dicarboxylic anhydride group (—CO—O—OC—) which has a high reactivity. Namely, a polyolefin is reacted with a dicarboxylic anhydride to obtain a solution containing a polyolefin having dicarboxylic anhydride groups bonded thereto.

As the hydrophilic polymer, one mentioned in (3) may be employed. In a case where only the first modifying step is carried out, the washing step will be carried out thereafter.

In a case where both the first modifying step and the second modifying step are carried out, the washing step may be carried out after either one of them, or may be carried out after each of them. Preferably, the washing step is carried out at least after the first modifying step, whereby an influence of impurities to the second modifying step can be reduced.

In a case where after obtaining a solution containing a polyolefin having dicarboxylic anhydride groups bonded thereto in the first modifying step, a second modifying step is carried out via a washing step, if water remains in the solution after the washing step, it may impair the ring closure of the dicarboxylic anhydride groups, whereby the reactivity with the hydrophilic polymer in the second modifying step may decrease. Accordingly, it is advisable that after the washing step, a dehydration step is carried out to sufficiently ring-close the dicarboxylic anhydride groups, whereupon the second modifying step is carried out.

Heretofore, as the washing step, a method has been common wherein a reaction solution after the modifying step of the polyolefin is concentrated to dryness, then dissolved in e.g. acetone, and then reprecipitation is repeated to carry out purification. Whereas, according to the present invention, the reaction solution is subjected to the above-described washing as it is, whereby it is not necessary to repeat concentration to dryness, purification and dissolution, and the process can be simplified, such being very advantageous from many aspects such as the cost aspect, the environmental aspect, etc.

(6) Aqueous Resin Dispersion

With respect to a description relating to the aqueous resin dispersion obtainable by the method of the present invention, the description in (5) under "WITH RESPECT TO THE THIRD EMBODIMENT" applies.

EXAMPLES

Now, the present invention will be described in further detail with reference to Examples, but it should be understood that the present invention is by no means restricted to the following Examples.

Methods for Measuring and Evaluating Physical Properties
(1) Stereoregularity
(1-1) Stereoregularity of Polypropylene The stereoregularity (mmmm) of a polypropylene was measured by a $^{13}$C-NMR spectrum measuring method by means of an NMR apparatus (manufactured by JEOL Ltd., 400 MHz). A sample of from 350 to 500 mg, was completely dissolved by using about 2.2 ml of o-dichlorobenzene in an NMR sample tube of 10 mm in diameter. Then, as a lock solvent, about 0.2 ml of deuterated benzene was added and homogenized, and then, measurement was carried out by a proton complete decoupling method at 130° C. The measurement conditions were such that the flip angle was 90°, and the pulse interval was at least $5T_1$ ($T_1$ is a longest value in the spin-lattice relaxation time of a methyl group). In a propylene polymer, the spin-lattice relaxation time of a methylene group and a methine group is shorter than that of a methyl group, and accordingly, under these measurement conditions, recovery of magnetization of all carbon is at least 99%. Integration for at least 20 hours was carried out for the measurement.

(1-2) Content (P) of Propylene in Propylene-Butene Copolymer

The propylene content (P) in a propylene-butene copolymer was measured by a $^{13}$C-NMR spectrum measuring method by means of an NMR apparatus (manufactured by JEOL Ltd., 400 MHz). A sample of from 350 to 500 mg, was completely dissolved by using about 2.2 ml of o-dichlorobenzene in an NMR sample tube of 10 mm in diameter. Then, as a lock solvent, about 0.2 ml of deuterated benzene was added and homogenized, and then, measurement was carried out by a proton complete decoupling method at 130° C. The measurement conditions were such that the pulse angle was 90°, a pulse interval-pulse interval was 10 seconds, and the number of integration times was 6,000 times. The chemical shifts and contents of propylene and butene were calculated with reference to the description by J. C. Randall, Macromolecules, 11, 592 (1978).

(2) Molecular Weight

Firstly, 20 mg of a sample was put into a 30 ml vial container, and 20 g of o-dichlorobenzene containing 0.04 wt % of BHT as a stabilizer was added. Using an oil bath heated to 135° C., the sample was dissolved and then thermal filtration was carried out by a PTFE (polytetrafluoroethylene) filter having a pore diameter of 3 µm to prepare a sample solution having a polymer concentration of 0.1 wt %. Then, using GPC150CV manufactured by Waters and equipped with TSKgel GM H-HT (30 cm×4 columns) as columns and an RI detector, GPC measurement was carried out. The measurement conditions were such that injection amount of the sample solution: 500 µl, the column temperature: 135° C., solvent: o-dichlorobenzene, and the flow rate: 1.0 ml/min.

At the time of calculation of a molecular weight, using commercially available monodisperse polystyrene as a standard sample, from the viscosity equation of the polystyrene standard sample and a polypropylene, a calibration curve relating to the retention time and the molecular weight was prepared, and calculation of the molecular weight of the propylene polymer was carried out.

As the viscosity equation, $[\eta]=K \cdot M\alpha$ was used, and for the polystyrene, $K=1.38E-4$, and $\alpha=0.70$ were used, and for the propylene copolymer, $K=1.03E-4$, and $\alpha=0.78$ were used.

(3) Graft Ratio 200 mg of a polymer and 4,800 mg of chloroform were put into a 10 ml sample bottle and heated at 5° C. for 30 minutes to completely dissolve the polymer. Into a liquid cell made of NaCl and having an optical path length of 0.5 mm, chloroform was put and used as a background. Then, the dissolved polymer solution was put into the liquid cell, and using FT-IR460plus, manufactured by JASCO Corporation, the infrared absorption spectrum was measured by 32 integration times. The graft ratio of maleic anhydride was calculated by using a calibration curve prepared by measuring a solution having maleic anhydride dissolved in chloroform. And, based on a calibration curve separately prepared from the area of the absorption peak of a carbonyl group (the maximum peak in the vicinity of 1,780 cm$^{-1}$, 1,750-1,813 cm$^{-1}$), the content of the acid component in the polymer was calculated, and it was taken as the graft ratio (wt %).

(4) Dispersed Particle Size

It was measured by means of Microtrac UPA manufactured by Nikkiso Co., Ltd. (model 9340, batch type, dynamic light scattering method/laser Doppler method). On such basis that the density of the dispersion was 0.9 g/cm$^3$, the particle shape was spherical, the refractive index of particles was 1.50, the dispersing medium was water, the refractive index of the dispersing medium was 1.33, the measurement was carried out for a measurement time of 120 seconds or 180 seconds, and the 50% particle diameter (volume average particle diameter) and the 90% particle diameter were obtained by summation from the finest particle size calculated by volume.

(5) Storage Stability

After adjusting the concentration of a resin dispersion so that the solid content became 20 wt %, it was put into a sealed container having a capacity of 50 ml and stored for three months in a constant temperature chamber at 40° C., and the dispersed particle diameter after the storage was measured. One wherein there was no substantial change in the dispersed particle diameter as between before and after the storage was identified by ○, and one wherein the dispersed particle diameter increased (one agglomerated) was identified by X.

(6) Foaming Property 10 g of a sample was put into a 30 ml sample bottle and vigorously stirred for one minute by a paint shaker. The sample bottle was left to stand still, and three minutes later, the foaming state was visually observed.

○: Foaming is not observed or slight.

X: Vigorous foaming is observed.

(7) Adhesion-100

A polypropylene of automobile exterior grade was injection-molded to obtain a substrate of 70 mm×150 mm×3 mm, and the substrate surface was cleaned with isopropyl alcohol. A resin dispersion having the concentration adjusted so that the solid content became 20 wt % was sprayed thereon so that the applied amount would be about 5 to 10 g/m$^2$. Then, a test specimen after the coating was dried for 10 minutes at 80° C. in Safeven drier and then left to stand still at 25° C. for one hour. Then, on the coated film, as a base coat an acryl-polyol urethane coating material Retane PG80III (manufactured by Kansai Paint Co., Ltd.) having a prescribed curing agent incorporated and further having the viscosity adjusted with a dedicated thinner, was sprayed so that the dried coated amount would be from 50 to 60 g/m$^2$ and baked at 80° C. for 30 minutes to obtain a coated plate.

After the plate was left to stand at 25° C. for 24 hours, a test specimen cross-cut in accordance with the cross-cut adhesion test method disclosed in JIS K 5400, was prepared and, after bonding an adhesive tape (product of Nichiban Co., Ltd.), peeled in a 90° direction, whereby the adhesion was evaluated by the number of cross-cut sections not peeled among 100 cross-cut sections.

(8) Adhesion-25

A propylene of automobile interior grade was injection-molded to obtain a substrate (test specimen) of 70 mm×150 mm×3 mm, and the substrate surface was cleaned with isopropyl alcohol. A sample was sprayed thereon so that the dry weight after coating would be about 15 g/m$^2$. Then, the test specimen after the coating was baked at 70° C. for 20 minutes in Safeven drier to obtain a coated plate.

After the coated plate was left to stand at 23° C. for 24 hours, a test specimen cross-cut with spacing of 2 mm to have 25 sections (5×5) was prepared in accordance with the cross-cut adhesion test method disclosed in JIS K 5400 and, after bonding an adhesive tape (product of Nichiban Co., Ltd.), peeled in a 90° direction, whereby the adhesion was evaluated by the number of cross-cut sections not peeled among the 25 cross-cut sections.

(9) Bleeding Out

A coated plate prepared in the same manner as in the adhesion-25 test, was left to stand for three days at 40° C., whereupon the exterior appearance of the coated plate was visually evaluated and touched with a finger to judge the presence or absence of bleeding out of the surfactant on the coated surface and its state in accordance with the following standards.

○: No bleeding out of the surfactant

Δ: Slight bleeding out of the surfactant

X: Bleeding out of the surfactant is distinctly observed, and stickiness is felt when touched with a finger.

(10) Water Resistance

A coated plate prepared in the same manner as in the adhesion-100 test, was immersed in warm water of 40° C. for 10 days, whereupon the exterior appearance of the coating was visually evaluated. Further, its cross-cut adhesive test was carried out, and the adhesion was evaluated by the number of cross-cut sections not peeled among 100 cross-cut sections.

(11) GH Resistance

A coated plate prepared in the same manner as in the adhesion-100 test was immersed in a mixed liquid of regular gasoline and ethanol maintained at 20° C. (volume ratio: regular gasoline/ethanol=9/1), whereby the time until the peeling became 5 mm, was measured.

(12) Moisture Resistance

A coated plate prepared in the same manner as in the adhesion-25 test, was left to stand in a state of a relative humidity of 95% for one week, whereupon the exterior appearance of the coating was visually evaluated. Further, in the same manner as in the case of the adhesion-25 test, its cross-cut adhesion test was carried out, and the adhesion was evaluated by the number of cross-cut sections not peeled among the 25 cross-cut sections.

(13) Beef Tallow Resistance

On a coated plate prepared in the same manner as in the adhesion-25 test, beef tallow (reagent grade, manufactured by Wako Pure Chemical Industries, Ltd.) was applied so that the coated amount would be about 2 g/100 cm² and left to stand at 80° C. for one day. The beef tallow coated on the surface was cleaned with a neutral cleaner, whereupon the exterior appearance of the coating film was visually evaluated.

◯: Good

X: Swelling or rapture of the coating film observed.

Substances Used

Jeffamine M-1000: Methoxypoly(oxyethylene/oxypropylene)-2-propylamine (polyetheramine manufactured by Huntsman Corporation, molecular weight: 1,000 (nominal value))

MD-1200: Vylonal MD-1200, manufactured by Toyobo Co., Ltd (aqueous polyester resin dispersion, solid content concentration: 35%, resin Tg: 67° C., average particle diameter: 0.08 μm)

BD-2250: Vondic 2250, manufactured by Dainippon Ink and Chemicals, Incorporated (aqueous polyurethane resin dispersion, resin solid content: 35%, average particle diameter: 0.105 μm)

ES-20: Rikabond ES-20, manufactured by CSC Co., Ltd (aqueous acrylic resin dispersion, solid content concentration: 44%, resin Tg: 47° C., average particle diameter: 0.10 μm)

EH-801: Hardlen EH-801 manufactured by Toyo Kasei Kogyo Co., Ltd. (aqueous chlorinated propylene polymer resin dispersion, solid content concentration: 30%, average particle diameter: 0.036 μm, amount of surfactant: 30 wt %)

Thickener 636 (thickener): SN thickener 636, manufactured by San Nopco Limited

EXAMPLES OF FIRST EMBODIMENT

Preparation Example 1-1

Preparation of Polypropylene

Into a 1,000 ml round bottomed flask, 110 ml of deionized water, 22.2 g of magnesium sulfate hepta hydrate and 18.2 g of sulfuric acid were put and dissolved with stirring. In this solution, 16.7 g of commercial available granulated montmorillonite (Benclay SL, manufactured by Mizusawa Industrial Chemicals, Ltd.) was dispersed, then the temperature was raised to 100° C. over two hours, and stirring was carried out at 100° C. for two hours. Then, the mixture was cooled to room temperature over one hour, and the obtained slurry was subjected to filtration, and a wet cake was recovered. The recovered cake was again slurried with 500 ml of deionized water in a 1,000 ml round bottomed flask and subjected to filtration. This operation was repeated twice. The finally obtained cake was dried overnight at 110° C. in a nitrogen atmosphere to obtain 13.3 g of chemically treated montmorillonite.

To 4.4 g of the obtained chemically treated montmorillonite, 20 ml of a toluene solution of triethyl aluminum (0.4 mmol/ml) was added, followed by stirring at room temperature for one hour. To this suspension, 80 ml of toluene was added, and after stirring, the supernatant was removed. This operation was repeated twice, and then toluene was added to obtain a clay slurry (slurry concentration=99 mg clay/ml).

In a separate flask, 0.2 mmol of triisobutyl aluminum (manufactured by Tosoh Akzo Corporation) was put, and 19 ml of the clay slurry obtained and a toluene-diluted solution of 131 mg (57 μmol) of dichloro[dimethylsilylene(cyclopentadienyl)(2,4-dimethyl-4H-1-azulenyl)hafnium were added, followed by stirring at room temperature for 10 minutes to obtain a catalyst slurry (see JP-A-2004-002310 with respect to the method for producing the catalyst, etc.).

Then, into an induction stirring type autoclave having an internal capacity of 24 L, 11 L of toluene, 3.5 mmol of triisobutyl aluminum and 2.64 L of liquid propylene were introduced. At room temperature, the above catalyst slurry was introduced in its entire amount, then the temperature was raised to 67° C., and while the total pressure during the polymerization was maintained to be constant at 0.65 MPa, stirring was continued at the same temperature for two hours. After completion of the stirring, unreacted propylene was purged to terminate the polymerization. The autoclave was opened, the toluene solution of the polymer was recovered in its entire amount, and the solvent and clay residue were removed to obtain 11 kg of a 13.5 wt % propylene polymer toluene solution (1.5 kg of propylene polymer). The weight average molecular weight of the obtained polypropylene was 191,000, and the stereoregularity (mmmm) was 45.8%.

Preparation Example 1-2

Preparation of Maleic Anhydride-Modified Polypropylene

Into a glass flask equipped with a reflux condenser, a thermometer and a stirrer, 650 g of toluene and 350 g of the polypropylene obtained in Preparation Example 1-1 were put, and the interior was substituted with nitrogen gas, and the temperature was raised to 110° C. After raising the temperature, 14 g of maleic anhydride was added, and 4.7 g of t-butylperoxyisopropyl monocarbonate (Perbutyl I, manufactured by NOF Corporation) was added, whereupon stirring was continued at the same temperature for 10 hours to carry out the reaction. After completion of the reaction, the system was cooled to near room temperature, and acetone was added, whereupon the precipitated polymer was collected by filtration. Further, precipitation with acetone and filtration were repeated, and the finally obtained polymer was washed with acetone. The polymer obtained after the washing was dried under reduced pressure to obtain a white powdery modified polymer. This modified polymer was subjected to an infrared absorption spectrum measurement, whereby the content (graft ratio) of maleic anhydride groups was 1.25 wt % (0.125 mmol/g as maleic anhydride groups, and 0.25 mmol/g as reactive groups). Further, the weight average molecular weight was 120,000.

Preparation Example 1-3

Preparation of Maleic Anhydride-Modified Polypropylene

The preparation was carried out in the same manner as in Preparation Example 1-2 except that the amount of maleic anhydride was changed to 28 g, and the amount of t-butylperoxyisopropyl monocarbonate was changed to 9.3 g. The content (graft ratio) of maleic anhydride groups was 2.4 wt % (0.24 mmol/g as maleic anhydride groups, and 0.48 mmol/g as reactive groups). Further, the weight average molecular weight was 100,000.

Preparation Example 1-4

Preparation of Maleic Anhydride-Modified Polypropylene

The preparation was carried out in the same manner as in Preparation Example 1-2 except that the amount of maleic anhydride was changed to 21 g, and the amount of t-butylperoxyisopropyl monocarbonate was changed to 7.0 g. The content (graft ratio) of maleic anhydride groups was 1.6 wt % (0.16 mmol/g as maleic anhydride groups, and 0.32 mmol/g as reactive groups). Further, the weight average molecular weight was 110,000.

Preparation Example 1-5

Preparation of Pigment-Dispersed Paste

A water-soluble acrylic resin (Joncryl 683 manufactured by Johnson Polymer Corporation (resin acid value: 160 mgKOH/g)) was neutralized with 2-amino-2-methylpropanol and dissolved in water.

20 g of this aqueous solution (solid content concentration: 25 wt %), 7.5 g of carbon black (manufactured by Mitsubishi Chemical Corporation), 60 g of titanium oxide (R-5N, manufactured by Sakai Chemical Industry Co., Ltd.), 2.5 g of a defoaming agent (SURFYNOL 440, manufactured by Air Products), 60 g of deionized water and 150 g of zirconia beads were mixed, and stirred and dispersed by a paint shaker for 30 minutes. The dispersion was subjected to filtration with a metal net of 400 mesh to obtain a pigment-dispersed paste having a solid content concentration of 50 wt %.

Preparation Example 1-6

Preparation of Maleic Anhydride-Modified Polypropylene Solution

A polypropylene was prepared in the same manner as Preparation Example 1-1 except that the temperature during the polymerization was 71° C. and introduction was carried out so that the hydrogen concentration in the system became 8,600 ppm, whereby 11.3 kg of a toluene solution containing 15.5 wt % of the propylene polymer (corresponding to 1.75 kg of the propylene polymer) was obtained. The weight average molecular weight of the obtained polypropylene was 38,000, and the stereoregularity (mmmm) was 38.9%.

Into a glass flask equipped with a reflux condenser, a thermometer and a stirrer, 300 g of the obtained polypropylene and 200 g of toluene were put, and the interior of the container was substituted with nitrogen gas, and the temperature was raised to 110° C. After raising the temperature, 9.0 g of maleic anhydride was added, and 4.5 g of t-butylperoxyisopropyl monocarbonate (Perbutyl I, manufactured by NOF Corporation) was added, whereupon stirring was continued at the same temperature for 7 hours to carry out the reaction. After completion of the reaction, 250 g of toluene was added to dilute the reaction solution to a solid content concentration of 40 wt %, and the liquid temperature was adjusted to 60° C.

1,200 g of warm water of 60° C. was added thereto, followed by vigorous stirring for 30 minutes, whereupon the mixture was left to stand still to separate it into a toluene layer and a water layer. The water layer was removed, and unreacted maleic anhydride and by-products derived from maleic anhydride were removed (warm water washing). This warm water washing was further repeated three times, and then, the obtained toluene layer was heated for dehydration to obtain a toluene solution of maleic anhydride-modified polypropylene (solid content concentration: 40 wt %).

A part of this modified polymer was sampled, heated and dried, whereupon the infrared absorption spectrum was measured. As a result, the content (graft ratio) of maleic anhydride groups was 1.2 wt % (0.12 mmol/g as maleic anhydride groups, and 0.24 mmol/g as reactive groups), and the weight average molecular weight was 35,000.

Preparation Example 1-7

Preparation of Maleic Anhydride-Modified Propylene-Butene Copolymer

In a twin screw extruder with a diameter of 45 mm (PCM40, manufactured by IKEGAI Ltd.), a blend comprising 10 kg of a propylene-butene copolymer (TAFMER XM7070, Mitsui Chemicals, Inc.) (1 kg out of the 10 kg is one having pellets freeze-pulverized into a powder), 0.2 kg of maleic anhydride and 0.1 kg of Perbutyl I (manufactured by NOF Corporation), was melt-kneaded under the following extrusion conditions.

Cylinder temperature: 200° C.
Screw rotational speed: 200 rpm
Extrusion amount: 10 kg/hour As a result of an infrared absorption spectrum measurement of the obtained modified polymer, the content (graft ratio) of maleic anhydride groups was 0.6 wt % (as maleic anhydride groups: 0.06 mmol/g, as reactive groups: 0.12 mmol/g), and the weight average molecular weight was 78,000.

Example 1-1

Into a glass flask equipped with a reflux condenser, a thermometer and a stirrer, 30 g of the maleic anhydride-modified polypropylene prepared in Preparation Example 1-2 (content of maleic anhydride groups: 3.75 mmol) and 60 g of toluene were added and completely dissolved by raising the temperature to 110° C. Then, a solution having 7.5 g of Jeffamine M-1000 (7.5 mmol, corresponding to 25 parts by weight of the hydrophilic polymer (B) per 100 parts by weight of the polyolefin (A)) dissolved in 10 g of toluene, was added and reacted at 110° C. for 3 hours.

After cooling, toluene was distilled off under reduced pressure to obtain 37 g of a yellow polymer. The obtained product was subjected to an infrared absorption spectrum analysis, and as a result, it was observed that a peak corresponding to maleic anhydride in the vicinity of 1,784 $cm^{-1}$ was extinct, and the maleic anhydride-modified polypropylene and the polyether amine were completely bonded. It is in the form of a graft copolymer having the polyether amine graft-bonded to the maleic anhydride-modified polypropylene.

To 25 g of the obtained yellow polymer, 75 g of THF was added, and the polymer was completely dissolved at 60° C. At the same temperature, 84 g of pure water was dropwise added thereto over a period of one hour, to obtain a hazy yellow solution. This solution was cooled to 40° C., and by lowering the reduced pressure degree gradually from a reduced pressure degree of 0.03 MPa to 0.0045 MPa, distillation under reduced pressure was carried out until the concentration became 25 wt %, to obtain a translucent slightly yellow resin dispersion. It is considered that the dispersed particle sizes are so fine that the dispersion looks translucent.

The dispersed particle sizes were measured, whereby the 50% particle diameter was 0.068 μm. The adhesion, water resistance and GH resistance were evaluated. The results are shown in Table 1-1.

The methoxypoly(oxyethylene/oxypropylene)-2-propylamine (Jeffamine M-1000) used in Example 1-1 had an insoluble content of at most 1 wt %, when dissolved at a concentration of 10 wt % in water of 25° C., and it is a hydrophilic polymer.

Example 1-2

44 g of a yellow polymer was obtained in the same manner as in Example 1-1 except that 30 g of the maleic anhydride-modified polypropylene obtained in Preparation Example 1-3 (content of maleic anhydride groups: 7.2 mmol) was used as the maleic anhydride-modified polypropylene, and 14.4 g of Jeffamine M-1000 (14.4 mmol, corresponding to 48 parts by weight of the hydrophilic polymer (B) per 100 parts by weight of the polyolefin (A)) was used. It is in the form of a graft copolymer having the polyether amine graft-bonded to the maleic anhydride-modified polypropylene.

To 20 g of the obtained yellow polymer, 80 g of THF was added, and the polymer was completely dissolved at 60° C. At the same temperature, 100 g of pure water was dropwise added thereto over a period of one hour, to obtain a yellow solution. This solution was cooled to 40° C., and by lowering the reduced pressure degree gradually from a reduced pressure degree of 0.03 MPa to 0.0045 MPa, distillation under reduced pressure was carried out until the concentration became 20 wt %, to obtain a transparent yellow resin dispersion. It is considered that the dispersed particle sizes are so fine that the dispersion looks almost transparent.

The dispersed particle sizes were measured, whereby the 50% particle diameter was 0.011 μm. In the same manner as in Example 1-1, the adhesion, water resistance and GH resistance were evaluated. The results are shown in Table 1-1.

Example 1-3

Into a glass flask equipped with a reflux condenser, a thermometer and a stirrer, 30 g of the maleic anhydride-modified polypropylene prepared in Preparation Example 1-4 (content of maleic anhydride groups: 4.8 mmol) and 70 g of toluene were added and completely dissolved by raising the temperature to 110° C. Then, a solution having 4.5 g of Jeffamine M-1000 (4.5 mmol, corresponding to 15 parts by weight of the hydrophilic polymer (B) per 100 parts by weight of the polyolefin (A)) dissolved in 4.5 g of toluene, was added and reacted at 110° C. for one hour. Then, 0.4 g (4.5 mmol) of morpholine was added and reacted at 110° C. for one hour.

After cooling, toluene was distilled off under reduced pressure to obtain 34 g of the yellow polymer. The obtained product was subjected to an infrared absorption spectrum analysis, and as a result, it was observed that 90% of a peak corresponding to maleic anhydride in the vicinity of 1,784 cm$^{-1}$ was extinct, and the maleic anhydride-modified polypropylene and the polyether amine were bonded. It is in the form of a graft copolymer having the polyether amine graft-bonded to the maleic anhydride-modified polypropylene.

To 25 g of the obtained yellow polymer, 75 g of THF was added, and the polymer was completely dissolved at 60° C. At the same temperature, 84 g of pure water was dropwise added thereto over a period of one hour, to obtain a hazy yellow solution. This solution was cooled to 40° C., and by lowering the reduced pressure degree gradually from a reduced pressure degree of 0.03 MPa to 0.0045 MPa, distillation under reduced pressure was carried out until the concentration became 25 wt %, to obtain a translucent slightly yellow resin dispersion. It is considered that the dispersed particle sizes are so fine that the dispersion looks translucent.

The dispersed particle sizes were measured, whereby the 50% particle diameter was 0.086 μm. The adhesion, water resistance and GH resistance were evaluated. The results are shown in Table 1-1.

Reference Example 39 g of a yellow polymer was obtained in the same manner as in Example 1-1 except that instead of the maleic anhydride-modified polypropylene, a maleic anhydride-modified chlorinated polypropylene (manufactured by Toyo Kasei Kogyo Co., Ltd., the content (graft ratio) of maleic anhydride groups was 2.1 wt % (0.21 mmol/g)) was used, 9 g of Jeffamine M-1000 (9 mmol, corresponding to 30 parts by weight of the hydrophilic polymer (B) per 100 parts by weight of the polyolefin (A)) was used, and the polymer was dissolved in 9 g of toluene. It is in the form of a graft copolymer having the polyether amine graft-bonded to the maleic anhydride-modified chlorinated polypropylene.

To 25 g of the obtained yellow polymer, 75 g of THF was added, and the polymer was completely dissolved at 60° C. At the same temperature, 100 g of pure water was dropwise added thereto over a period of one hour, to obtain a yellow solution. This solution was cooled to 40° C., and by lowering the reduced pressure degree gradually from a reduced pressure degree of 0.03 MPa to 0.0045 MPa, distillation under reduced pressure was carried out until the concentration became 20 wt %, to obtain a transparent yellow resin dispersion. It is considered that the dispersed particle sizes are so fine that the dispersion looks almost transparent.

The dispersed particle sizes were measured, whereby the 50% particle diameter was 0.098 μm. In the same manner as in Example 1-1, the adhesion, water resistance and GH resistance were evaluated. The results are shown in Table 1-1.

Comparative Example 1-1

Into a glass flask equipped with a reflux condenser, a thermometer and a stirrer, 20 g of the maleic anhydride-modified polypropylene obtained in Preparation Example 1-2 and 80 g of toluene were put and completely dissolved by raising the temperature to 110° C. After cooling to 50° C., 3 g of polyoxyethylene cetyl ether (nonionic surfactant, EMULGEN 220, manufactured by Kao Corporation, HLB=14.2) and 3 g of polyoxyethylene lauryl ether (nonionic surfactant, EMULGEN 147, manufactured by Kao Corporation, HLB=16.3) were added and dissolved, followed by cooling to 35° C.

140 g of water was gradually added thereto and thoroughly stirred, and then using an internal shearing type emulsifier Clearmix CLM-0.8S (manufactured by M Technique Co., Ltd.), emulsifying was carried out at 21,000 rpm for 3 minutes. Then, into the system, an aqueous solution having 2-amino-2-methyl-1-propanol diluted with water to 10 wt %, was added, and the pH was adjusted to 8. This crude emulsified product was subjected to distillation of toluene by gradually reducing the reduced pressure degree from a reduced pressure degree of 0.02 MPa to 0.0045 MPa, to obtain a milky white resin dispersion having a concentration of 25 wt %.

The dispersed particle sizes were measured, whereby the 50% particle diameter was 0.25 μm. In the same manner as in Example 1-1, the adhesion, water resistance and GH resistance were evaluated. The results are shown in Table 1-1. Both the 50% particle diameter and the 90% particle diameter were substantially larger than Examples, and agglomeration was observed by storage for three months, and the water resistance was poor.

Comparative Example 1-2

37 g of a yellow polymer was obtained in the same manner as in Example 1-1 except that to 30 g of the maleic anhydride-modified polypropylene obtained in Preparation 1-2 (content of maleic anhydride groups: 3.75 mmol), 7.5 g of the polyester polyol (P-2010, manufactured by Kuraray Co., Ltd., molecular weight: 2,000 (nominal value)) (3.75 mmol, corresponding to 25 parts by weight per 100 parts by weight of the polyolefin (A)) and 0.3 g of dimethylbenzylamine were added. It is in the form of a graft copolymer having the polyester polyol graft-bonded to the maleic anhydride-modified polypropylene.

To 20 g of the obtained yellow polymer, 80 g of THF was added, and the polymer was completely dissolved at 60° C. At the same temperature, 100 g of pure water was dropwise added thereto over a period of one hour, whereby the yellow polymer was separated, and no resin dispersion was obtained.

The polyester polyol used in Comparative Example 1-2 (P-2010, manufactured by Kuraray Co., Ltd.,) is not a hydrophilic polymer, as the insoluble content exceeds 1 wt % when it is dissolved in water at 25° C. to a concentration of 10 wt %.

the same temperature for 10 hours to carry out the reaction. After completion of the reaction, the system was cooled to near room temperature, acetone was added, and a precipitated polymer was collected by filtration. Further, precipitation with acetone and filtration were repeated, and the finally obtained polymer was washed with acetone. The polymer obtained after the washing was dried under reduced pressure to obtain a white powdery maleic anhydride-modified polymer. The infrared absorption spectrum measurement of this modified polymer was carried out, whereby the content (graft ratio) of the maleic anhydride groups was 2.1 wt % (0.21 mmol/g as maleic anhydride groups, and 0.42 mmol/g as carboxy acid groups). Further, the weight average molecular weight was 110,000.

Then, into a glass flask equipped with a reflux condenser, a thermometer and a stirrer, 30 g of the obtained maleic anhydride-modified polymer (content of maleic anhydride groups:

TABLE 1-1

| | Maleic-modified polyolefin | Graft ratio (wt %) | Dispersed particle sizes immediately after preparation | | Dispersed particle sizes after 3 months | | Storage stability | Adhesion-100 | Water resistance | GH resistance |
| | | | 50% Particle diameter | 90% Particle diameter | 50% Particle diameter | 90% Particle diameter | | | | |
|---|---|---|---|---|---|---|---|---|---|---|
| Ex. 1-1 | Prep. Ex. 1-2 | 1.25 | 0.068 | 0.12 | 0.071 | 0.12 | ○ | 100/100 | 100/100 | >60 min |
| Ex. 1-2 | Prep. Ex. 1-3 | 2.4 | 0.011 | 0.015 | 0.011 | 0.015 | ○ | 100/100 | 100/100 | >60 min |
| Ex. 1-3 | Prep. Ex. 1-4 | 1.6 | 0.086 | 0.17 | 0.090 | 0.19 | ○ | 100/100 | 100/100 | >60 min |
| Ref. Ex. | Chlorinated PP | 2.1 | 0.098 | 0.18 | 0.096 | 0.19 | ○ | 100/100 | 100/100 | >60 min |
| Comp. Ex. 1-1 | Prep. Ex. 1-2 | 1.25 | 0.25 | 3.1 | 0.28 | 6.0 | X | 100/100 | 80/100 | >60 min |
| Comp. Ex. 1-2 | Prep. Ex. 1-2 | 1.25 | | | No resin dispersion obtained | | | | | |
| Comp. Ex. 1-4 | Prep. Ex. 1-4 | 1.6 | | | No resin dispersion obtained | | | | | |

Example 1-5 to 1-8, and Comparative Example 1-3

To 10 g of each of the resin dispersions (solid content concentration: 25 wt %) of Examples 1-1 to 1-4 and Comparative Example 1-1, 10 g of the pigment-dispersed paste (solid content concentration: 50 wt %) of Preparation Example 1-5 and 5.7 g of the aqueous acryl resin dispersion ES-20 were mixed to obtain a coating material, and in the same manner as in Example 1-1, the adhesion, water resistance, GH resistance and bleeding out were evaluated. The results are shown in Table 1-2.

6.3 mmol) and 70 g of toluene were added and completely dissolved by raising the temperature to 110° C. Then, a solution having 6 g of Jeffamine M-1000 (6 mmol, corresponding to 20 parts by weight of the hydrophilic polymer (B) per 100 parts by weight of the copolymer (A)) dissolved in 6 g of toluene, was added and reacted at 110° C. for one hour. Then, 0.53 g (6 mmol) of morpholine was added and reacted at 110° C. for one hour.

A small amount was sampled from the reaction solution, and toluene was distilled off under reduced pressure, and then an infrared absorption spectrum analysis was carried out,

TABLE 1-2

| | Maleic-modified polyolefin | Graft ratio (wt %) | Adhesion-100 | Water resistance | GH resistance | Bleeding out |
|---|---|---|---|---|---|---|
| Ex. 1-5 | Prep. Ex. 1-2 | 1.25 | 100/100 | 100/100 | >60 min | ○ |
| Ex. 1-6 | Prep. Ex. 1-3 | 2.4 | 100/100 | 100/100 | >60 min | ○ |
| Ex. 1-7 | Prep. Ex. 1-4 | 1.6 | 100/100 | 100/100 | >60 min | ○ |
| Ex. 1-8 | Chlorinated PP | 2.1 | 100/100 | 100/100 | >60 min | ○ |
| Comp. Ex. 1-3 | Prep. Ex. 1-2 | 1.25 | 24/100 | 16/100 | >60 min | X |

Example 1-9

Into a glass flask equipped with a reflux condenser, a thermometer and a stirrer, 650 g of toluene and 350 g of a propylene-butene copolymer (Tafmer XM-7070, manufactured by Mitsui Chemicals, Inc.) were put, and the interior of the container was replaced with nitrogen gas, and the temperature was raised to 110° C. After raising the temperature, 35 g of maleic anhydride was added, and 10.7 g of t-butylperoxyisopropyl monocarbonate (Perbutyl I, manufactured by NOF Corporation) was added, whereupon stirring was continued at whereby it was observed that 90% of a peak corresponding to maleic anhydride in the vicinity of 1,784 cm$^{-1}$ was extinct, and the maleic anhydride-modified polymer and the polyether amine were bonded. It is in the form of a graft copolymer having the polyether amine graft-bonded to the maleic anhydride-modified polymer.

While the temperature of the obtained reaction solution was maintained at 60° C., a mixed liquid of 120 g of isopropanol and 30 g of water was dropwise added over one hour under heating with stirring to obtain a hazy slightly yellow liquid. Further, a mixed liquid of 30 g of isopropanol and water was dropwise added over one hour while the temperature of the reaction solution was maintained at 60° C., to obtain a translucent yellow solution. This solution was cooled to 45° C., and by lowering the reduced pressure degree gradually from a reduced pressure degree of 0.02 MPa to 0.004 MPa, toluene, isopropanol and water were distilled off under reduced pressure until the polymer concentration became 25 wt %, to obtain a slightly yellow transparent aqueous resin dispersion. It is considered that the dispersed particle sizes are so fine that the dispersion looks transparent.

The dispersed particle sizes were measured, whereby the 50% particle diameter was 0.099 μm, and the 90% particle diameter was 0.184 μm. The evaluation results of the adhesion of the obtained aqueous resin dispersion are shown in Table 1-3. Also, the propylene content in the propylene-butene copolymer used (Tafmer XM-7070, manufactured by Mitsui Chemicals, Inc.) is shown.

Here, evaluation of the adhesion in this Example was carried out as follows.

A polypropylene of automobile exterior grade was injection-molded to obtain a substrate (test specimen) of 70 mm×150 mm×3 mm, and the substrate surface was cleaned with isopropyl alcohol. A test sample was sprayed thereon so that the coated amount (dry weight after coating) would be about 15 g/m$^2$. Then, a test specimen after the coating was dried and baked at 80° C. for 40 minutes in Safeven drier to obtain a coated plate.

After the coated plate was left to stand at 23° C. for 24 hours, a test specimen cross-cut with spacing of 2 mm to have 25 sections (5×5) was prepared in accordance with the cross-cut adhesion test method disclosed in JIS K 5400, and after bonding an adhesive tape (product of Nichiban Co., Ltd.), peeled in a 90° direction, whereby the adhesion was evaluated by the number of cross-cut sections not peeled among the 25 cross-cut sections.

TABLE 1-3

| Content of propylene (P) (mol %) | Graft ratio (wt %) | Dispersed particle sizes immediately after preparation | | Adhesion-25 |
|---|---|---|---|---|
| | | 50% Particle diameter | 90% Particle diameter | |
| Ex. 1-9 73.9 | 2.1 | 0.099 | 0.184 | 25/25 |

Comparative Example 1-4

Into a glass flask equipped with a reflux condenser, a thermometer and a stirrer, 30 g of the maleic anhydride-modified polypropylene obtained in Preparation Example 1-4 (content of maleic anhydride groups: 4.8 mmol) and 70 g of toluene were put and completely dissolved by raising the temperature to 110° C. Then, 2 g (23 mmol) of morpholine was added and reacted at 110° C. for one hour. After cooling, toluene was distilled off under reduced pressure to obtain 32 g of a yellow polymer.

To 25 g of the obtained yellow polymer, 75 g of THF was added, and the polymer was completely dissolved at 60° C. At the same temperature, 84 g of pure water was dropwise added over one hour, whereby the yellow polymer was separated, and no resin dispersion was obtained.

Here, morpholine is a hydrophilic compound but not a hydrophilic polymer as its molecular weight is 89.

Comparative Example 1-5

Dispersing of Non-Modified Polypropylene by Means of Surfactant

A resin dispersion was obtained in the same manner as in Comparative Example 1-1 except that the polypropylene obtained in Preparation Example 1-1 was used.

The dispersed particle sizes were measured, whereby the 50% particle diameter was 0.32 μm. Then, in the same manner as in Example 1-1, evaluation of the adhesion was carried out, whereby at all cross-cut sections, the coated film was peeled from the base coating, and the result was 0/100.

Comparative Example 1-6

Dispersing of Non-Modified Polypropylene by Means of Jeffamine M-1000

Into a glass flask equipped with a reflux condenser, a thermometer and a stirrer, 25 g of the polypropylene obtained in Preparation Example 1-1 and 70 g of THF were added and completely dissolved by raising the temperature to 60° C. A solution having 9 g (9 mmol) of Jeffamine M-1000 dissolved in 27 g of THF, was added thereto, and then the temperature was adjusted to 60° C. Then, at the same temperature, 84 g of pure water was dropwise added over one hour, whereby during the dropwise addition, the liquid turbidified, the resin was separated, and no resin dispersion was obtained.

Namely, Jeffamine M-1000 has no ability to disperse the non-modified polypropylene and is not a surfactant.

Example 1-10

Into a glass flask equipped with a reflux condenser, a thermometer and a stirrer, 600 g of the toluene solution of the maleic anhydride-modified polypropylene obtained in Preparation Example 1-6 (content of maleic anhydride-modified polypropylene: 240 g) was added by raising the temperature to 110° C. A solution having 36.0 g of Jeffamine M-1000 (36.0 mmol, corresponding to 15 parts by weight per 100 parts by weight of the propylene polymer) dissolved in 54.0 g of toluene, was added and reacted at 110° C. for one hour.

After cooling, a part of the reaction solution was sampled, and the toluene was distilled off under reduced pressure, whereupon the infrared absorption spectrum analysis of the polymer obtained was carried out, whereby it was confirmed that a peak corresponding to maleic anhydride in the vicinity of 1,784 cm$^{-1}$ decreased, and the maleic anhydride-modified polypropylene and the polyether amine were bonded. It is in the form of a graft copolymer having the polyether amine graft-bonded to the maleic anhydride-modified polypropylene.

Then, 100 g of the obtained toluene solution of the polyalkylene glycol-modified polypropylene (polymer content: 40 g) was added to a glass flask equipped with a reflux condenser, a thermometer and a stirrer, and the temperature was raised to 65° C.

A mixed solvent comprising 120 g of isopropyl alcohol (IPA) and 30 g of distilled water was dropwise added thereto over one hour to obtain a translucent slightly yellow solution. The pressure was gradually reduced and 120 g of the mixed solvent of toluene/IPA/water was distilled off under reduced pressure.

Then, a mixed solvent of 15 g of IPA and 135 g of distilled water was dropwise added at 65° C. over 30 minutes, and then the solvent was distilled off under reduced pressure in the same manner to obtain a white resin dispersion having a solid content concentration of 25 wt %.

The particle sizes were measured, whereby the 50% particle diameter was 0.142 μm. Further, upon expiration of three months, the particle sizes were measured, and the storage stability was evaluated. The results are shown in Table 1-4.

Example 1-11

A slightly yellow translucent resin dispersion was obtained in the same manner as in Example 1-10 except that the dropwise added mixed solvent at the first stage was changed to a mixture comprising 120 g of IPA, 30 g of distilled water and 0.4 g of 2-amino-2-methyl-1-propanol.

The dispersed particle sizes were measured, whereby the 50% particle diameter was 0.084 μm. The results are shown in Table 1-4.

Example 1-12

A slightly yellow translucent resin dispersion was obtained in the same manner as in Example 1-10 except that the dropwise added mixed solvent at the first stage was changed to a mixture comprising 120 g of IPA, 30 g of distilled water and 0.4 g of N,N-dimethylethanolamine.

The dispersed particle sizes were measured, whereby the 50% particle diameter was 0.076 μm. The results are shown in Table 1-4.

Example 1-13

Into a glass flask equipped with a reflux condenser, a thermometer and a stirrer, 100 g of the maleic anhydride-modified propylene-butene copolymer prepared in Preparation Example 1-7 (content of maleic anhydride groups: 6 mmol) and 200 g of toluene were added, and the temperature was raised to 65° C. Then, 12 g (12 mmol) of Jeffamine M-1000 was added and reacted at the same temperature for one hour.

A mixed solvent comprising 120 g of IPA and 30 g of distilled water was prepared, and to one fourth thereof, 1.1 g of 2-methyl-2-amino-1-propanol was added to obtain a solution, which was dropwise added over 30 minutes. Then, the remaining mixed solvent of IPA and distilled water was dropwise added at the same temperature for one hour, to obtain a translucent slightly yellow solution. The pressure was gradually reduced and 120 g of the mixed solvent of toluene/IPA/water was distilled off under reduced pressure.

Then, a mixed solvent of 15 g of IPA and 135 g of distilled water was dropwise added at 65° C. over 30 minutes, and then the solvent was distilled off under reduced pressure in the same manner to obtain a white resin dispersion having a solid content concentration of 25 wt %.

The particle sizes were measured, whereby the 50% particle diameter was 0.132 μm. The results are shown in Table 1-4.

Examples Relating to Second Embodiment

Preparation Example 2-1

Preparation of Polypropylene

In the same manner as in Preparation Example 1-1, a catalyst slurry was obtained.

Then, into an induction stirring type autoclave having an internal capacity of 24 L, 11 L of toluene, 3.5 mmol of triisobutyl aluminum and 2.64 L of liquid propylene were introduced. At room temperature, the above catalyst slurry was introduced in its entire amount, then the temperature was raised to 63° C., and while the total pressure during the polymerization was maintained to be constant at 0.65 MPa, stirring was continued at the same temperature for two hours. After completion of the stirring, unreacted propylene was purged to terminate the polymerization. The autoclave was opened, the toluene solution of the polymer was recovered in its entire amount, and the solvent and clay residue were removed to obtain 11 kg of a 12.8 wt % propylene polymer toluene solution (1.4 kg of propylene polymer). The weight average molecular weight of the obtained polypropylene was 180,000, and the stereoregularity (mmmm) was 47.5%.

Preparation Example 2-2

Preparation of Maleic Anhydride-Modified Polypropylene

Into a glass flask equipped with a reflux condenser, a thermometer and a stirrer, 350 g of the polypropylene obtained in Preparation Example 2-1 and 650 g of toluene were put, and the interior of the container was replaced with nitrogen gas, and the temperature was raised to 110° C. After raising the temperature, 17.5 g of maleic anhydride was added, and 8.75 g of t-butylperoxyisopropyl monocarbonate (Perbutyl I, manufactured by NOF Corporation) was added, whereupon stirring was continued at the same temperature for 7 hours to carry out the reaction. After completion of the reaction, the system was cooled to near room temperature, and acetone was added, whereupon the precipitated polymer was collected by filtration. Further, precipitation with acetone and filtration were repeated, and the finally obtained polymer was washed with acetone. The polymer obtained after the washing was dried under reduced pressure to obtain a white powdery maleic anhydride-modified polymer. The infrared absorption spectrum measurement of this modified polymer was carried out, whereby the content (graft ratio) of maleic anhydride groups was 1.2 wt % (0.12 mmol/g). Further, the weight average molecular weight was 110,000.

TABLE 1-4

| | Maleic-modified polyolefin | Graft ratio (wt %) | Dispersed particle sizes immediately after preparation | | Dispersed particle sizes after 3 months | | Storage stability |
|---|---|---|---|---|---|---|---|
| | | | 50% Particle diameter | 90% Particle diameter | 50% Particle diameter | 90% Particle diameter | |
| Ex. 1-10 | Prep. Ex. 1-6 | 1.2 | 0.142 | 0.22 | 0.16 | 0.23 | ○ |
| Ex. 1-11 | Prep. Ex. 1-6 | 1.2 | 0.084 | 0.14 | 0.090 | 0.15 | ○ |
| Ex. 1-12 | Prep. Ex. 1-6 | 1.2 | 0.076 | 0.14 | 0.085 | 0.15 | ○ |
| Ex. 1-13 | Prep. Ex. 1-7 | 0.6 | 0.132 | 0.24 | 0.14 | 0.25 | ○ |

Preparation Example 2-3

Preparation of Aqueous Resin Dispersion of Polyalkylene Glycol-Modified Polypropylene Into a glass flask equipped with a reflux condenser, a thermometer and a stirrer, 30 g of the maleic anhydride-modified polypropylene prepared in Preparation Example 2-2 (content of maleic anhydride groups: 3.6 mmol) and 70 g of toluene were added and completely dissolved by raising the temperature to 110° C. Then, a solution having 7.5 g of Jeffamine M-1000 (7.5 mmol, corresponding to 25 parts by weight per 100 parts by weight of the propylene polymer) dissolved in 7.5 g of toluene, was added and reacted at 110° C. for 3 hours.

After cooling, toluene was distilled off under reduced pressure to obtain 37 g of the yellow polymer. The infrared absorption analysis of the obtained product was carried out, whereby it was confirmed that a peak corresponding to maleic anhydride in the vicinity of 1,784 cm$^{-1}$ was extinct, and the maleic anhydride-modified polypropylene and the polyether amine were completely bonded. It is in the form of a graft copolymer having the polyether amine graft-bonded to the maleic anhydride-modified polypropylene.

To 20 g of the obtained yellow polymer, 80 g of THF was added, and the polymer was completely dissolved at 65° C. At the same temperature, 100 g of pure water was dropwise added thereto over a period of one hour, to obtain a hazy yellow solution. This solution was cooled to 40° C., and by lowering the reduced pressure degree gradually from a reduced pressure degree of 0.03 MPa to 0.0045 MPa, THF and water were distilled off under reduced pressure until the concentration became 25 wt %, to obtain a translucent slightly yellow aqueous resin dispersion. It is considered that the dispersed particle sizes are so fine that the dispersion looks translucent.

The dispersed particle sizes were measured, whereby the 50% particle diameter was 0.04 μm, and the 90% particle diameter was 0.07 μm.

Here, Jeffamine M-1000 had an insoluble content of at most 1 wt % when it was dissolved in water at 25° C. at a concentration of 10 wt %, and is a hydrophilic polymer.

Preparation Example 2-4

Preparation of Aqueous Dispersion of Maleic Acid-Modified Polypropylene

Into a glass flask equipped with a reflux condenser, a thermometer and a stirrer, 20 g of the maleic anhydride-modified polypropylene obtained in Preparation Example 2-2 and 80 g of toluene were put and completely dissolved by raising the temperature to 110° C. After cooling to 50° C., 5 g of polyoxyethylene cetyl ether (nonionic surfactant, EMULGEN 220, manufactured by Kao Corporation, HLB=14.2) and 5 g of polyoxyethylene lauryl ether (nonionic surfactant, EMULGEN 147, manufactured by Kao Corporation, HLB=16.3) were added and dissolved, followed by cooling to 35° C.

100 g of water was added thereto and thoroughly stirred, and then using an internal shearing type emulsifier Clearmix CLM-0.8S (manufactured by M Technique Co., Ltd.), emulsifying was carried out at 21,000 rpm for 3 minutes. Then, into the system, an aqueous solution having 2-amino-2-methyl-1-propanol diluted with water to 10 wt %, was added, and the pH was adjusted to 8. From this crude emulsified product, toluene and water were distilled off by lowering the reduced pressure degree gradually from a reduced pressure degree of 0.02 MPa to 0.0045 MPa, to obtain a milky white resin dispersion having a concentration of 25 wt %.

The dispersed particle sizes were measured, whereby the 50% particle diameter was 0.25 μm, and the 90% particle diameter was 3.1 μm. Both the 50% particle diameter and the 90% particle diameter were substantially larger than Examples.

Preparation Example 2-5

Preparation of Pigment-Dispersed Paste

A water-soluble acrylic resin (Joncryl 683 manufactured by Johnson Polymer Corporation (resin acid value: 160 mgKOH/g)) was neutralized with 2-amino-2-methylpropanol and dissolved in water.

20 g of this aqueous solution (solid content concentration: 25%), 7.5 g of carbon black (manufactured by Mitsubishi Chemical Corporation), 60 g of titanium oxide (R-5N, manufactured by Sakai Chemical Industry Co., Ltd.), 2.5 g of a defoaming agent (SURFYNOL 440, manufactured by Air Products), 60 g of deionized water and 150 g of zirconia beads were mixed, and stirred and dispersed by a paint shaker for 30 minutes. The dispersion was subjected to filtration with a metal net of 400 mesh to obtain a pigment-dispersed paste having a solid content concentration of 50 wt %.

Preparation Example 2-6

Preparation of Propylene Polymer 11 kg of a 12.9 wt % propylene-ethylene copolymer toluene solution was obtained (1.42 kg of the propylene polymer) in the same manner as in Preparation Example 2-1 except that the polymerization temperature was 50° C., the total pressure during the polymerization was 0.5 MPa, and ethylene was introduced in an amount corresponding to 6.3% of the total pressure. The weight average molecular weight of the obtained propylene-ethylene copolymer was 217,000, the stereoregularity (mmmm) was 40.1%, and the ethylene content was 3.1 mol %.

Preparation Example 2-7

Preparation of Maleic Anhydride-Modified Propylene Polymer

A maleic anhydride-modified propylene ethylene copolymer was obtained in the same manner as in Preparation Example 2-2 except that the propylene-ethylene copolymer obtained in Preparation Example 2-6 was used. The infrared absorption spectrum measurement of this modified polymer was carried out, whereby the content (graft ratio) of maleic anhydride groups was 1.3 wt % (0.12 mmol/g). Further, the weight average molecular weight was 116,000.

Preparation Example 2-8

Preparation of an Aqueous Dispersion of Polyalkylene Glycol-Modified Propylene Polymer A translucent slightly yellow aqueous resin dispersion was obtained in the same manner as in Preparation Example 2-3 except that the maleic anhydride-modified propylene-ethylene copolymer of Preparation Example 2-7 was used. It is considered that the dispersed particle sizes are so fine that the dispersion looks translucent.

The dispersed particle sizes were measured, whereby the 50% particle diameter was 0.016 μm, and the 90% particle diameter was 0.027 μm.

Example 2-1

Aqueous Resin Dispersion

As a propylene polymer resin, 12 g (3 g as solid content) of the polyalkylene glycol-modified polypropylene aqueous resin dispersion obtained in Preparation Example 2-3 was used and blended with 20 g (7 g as solid content) of Vylonal MD-1200, to obtain an aqueous resin dispersion of propylene polymer/polyester=30/70 (weight ratio) The evaluation results are shown in Table 2-1.

Examples 2-2 and 2-3, Comparative Examples 2-1 to 2-6

Aqueous resin dispersions were prepared in the same manner as in Example 2-1 except that the compositions as shown in Table 2-1 were employed. The evaluation results are shown in Table 2-1. In the Table, component (IC) and component (ID) represent values calculated as solid contents.

TABLE 2-1

|  |  | 50% Particle diameter | Ex. 2-1 | Ex. 2-2 | Ex. 2-3 | Comp. Ex. 2-1 | Comp. Ex. 2-2 | Comp. Ex. 2-3 | Comp. Ex. 2-4 | Comp. Ex. 2-5 | Comp. Ex. 2-6 |
|---|---|---|---|---|---|---|---|---|---|---|---|
| Component (IC) | Prep. Ex. 2-3 | 0.040 μm | 3 | 5 | 3 |  |  |  |  |  |  |
|  | Prep. Ex. 2-4 | 0.25 μm |  |  |  | 3 | 5 | 3 |  |  |  |
|  | EH-801 | 0.036 μm |  |  |  |  |  |  | 3 | 5 | 3 |
| Component (ID) | MD-1200 | 0.050 μm | 7 |  |  | 7 |  |  | 7 |  |  |
|  | BD-2250 | 0.105 μm |  | 5 |  |  | 5 |  |  | 5 |  |
|  | ES-20 | 0.100 μm |  |  | 7 |  |  | 7 |  |  | 7 |
| Thickener 636 |  |  |  | 0.1 | 0.1 |  | 0.1 | 0.1 |  | 0.1 | 0.1 |
| Deionized water |  |  |  |  |  |  |  |  | 2 | 3.3 | 2 |
| IA content *1 |  |  | 25.5 | 44.4 | 25.5 | 30.0 | 50.0 | 30.0 | 30.0 | 50.0 | 30.0 |
| (IC + ID) content *2 |  |  | 31.3 | 29.2 | 35.8 | 31.3 | 29.2 | 35.8 | 31.3 | 29.2 | 35.8 |
| Amount of surfactant/(IC + ID) |  |  | 0% | 0% | 0% | 9% | 15% | 9% | 9% | 15% | 9% |
| Particle diameter ratio (IC/ID) |  |  | 0.80 | 0.38 | 0.40 | 5.00 | 2.38 | 2.50 | 0.72 | 0.34 | 0.36 |
| Foaming property |  |  | ○ | ○ | ○ | X | X | X | X | X | X |
| Adhesion-25 |  |  | 25/25 | 25/25 | 25/25 | 0/25 | 25/25 | 0/25 | 0/25 | 25/25 | 5/25 |
| Bleeding out |  |  | ○ | ○ | ○ | Δ | X | Δ | ○ | Δ | ○ |
| Moisture resistance |  |  | 22/25 | 25/25 | 24/25 | 0/25 | 23/25 | 0/25 | 0/25 | 0/25 | 5/25 |

*1 IA content = IA/(IA + ID) * 100
*2 (IC + ID) content = (IC + ID)/(IC + ID + water) * 100

The aqueous resin dispersions of Examples 2-1 to 2-3 are excellent in each of the foaming property, initial adhesion and moisture resistance, and no bleeding out was observed, and thus they were found to be excellent.

Examples 2-4 to 2-6, Comparative Examples 2-7 to 2-9

Coating Materials

The coating materials were prepared to have compositions as identified in Table 2-2. Here, butyl cellosolve (ethylene glycol monobutyl ether) was incorporated as a film-forming assistant. The evaluation results are shown in Table 2-2. In the Table, component (IC) and component (ID) represent values calculated as solid contents.

TABLE 2-2

|  |  | 50% Particle diameter | Ex. 2-4 | Ex. 2-5 | Ex. 2-6 | Comp. Ex. 2-7 | Comp. Ex. 2-8 | Comp. Ex. 2-9 |
|---|---|---|---|---|---|---|---|---|
| Component (IC) | Prep. Ex. 2-3 | 0.040 μm | 7 | 7 |  |  |  |  |
|  | Prep. Ex. 2-4 | 0.25 μm |  |  |  | 7 |  | 7 |
|  | Prep. Ex. 2-8 | 0.016 μm |  |  | 3 |  |  |  |
|  | EH-801 | 0.036 μm |  |  |  |  | 7 |  |
| Component (ID) | ES-20 | 0.100 μm | 3 |  | 7 | 3 | 3 |  |
|  | MD-1200 | 0.050 μm |  | 3 |  |  |  | 3 |
| Component (IE) | Prep. Ex. 2-5 |  | 20 | 20 | 20 | 20 | 20 | 20 |
| Thickener 636 |  |  | 0.1 | 0.1 | 0.1 | 0.1 | 0.1 | 0.1 |
| Butyl cellosolve |  |  | 2 | 2 | 2 | 2 | 2 | 2 |
| IA content *1 |  |  | 65.1 | 65.1 | 65.1 | 70.0 | 70.0 | 70.0 |
| (IC + ID) content *2 |  |  | 28.7 | 27.3 | 31.3 | 28.7 | 33.2 | 27.3 |

TABLE 2-2-continued

|  | 50% Particle diameter | Ex. 2-4 | Ex. 2-5 | Ex. 2-6 | Comp. Ex. 2-7 | Comp. Ex. 2-8 | Comp. Ex. 2-9 |
|---|---|---|---|---|---|---|---|
| Amount of surfactant/ (IC + ID) |  | 0% | 0% | 0% | 21% | 21% | 21% |
| Particle diameter ratio (IC/ID) |  | 0.40 | 0.80 | 0.16 | 5.00 | 0.36 | 2.50 |
| Foaming property |  | ○ | ○ | ○ | Δ | Δ | Δ |
| Adhesion-25 |  | 25/25 | 25/25 | 25/25 | 10/25 | 25/25 | 5/25 |
| Bleeding out |  | ○ | ○ | ○ | Δ | ○ | Δ |
| Moisture resistance |  | 25/25 | 25/25 | 25/25 | 0/25 | 15/25 | 0/25 |
| Beef tallow resistance |  | ○ | ○ | ○ | X | X | X |

*1 IA content = IA/(IA + ID) * 100
*2 (IC + ID) content = (IC + ID)/(IC + ID + water) * 100

The coating materials of Examples 2-4 to 2-6 are excellent in each of the foaming property, initial adhesion, moisture resistance and beef tallow resistance, and no bleeding out was observed, and thus they were found to be excellent.

Preparation Example 2-9

Preparation of Polypropylene

In the same manner as in Preparation Example 1-1, a catalyst slurry was obtained.

Then, into an injection stirring type autoclave having an internal capacity of 24 L, 11 L of toluene, 3.5 mmol of triisobutyl aluminum and 2.64 L of liquid propylene were introduced, at room temperature. The above catalyst slurry was introduced in its entire amount, then the temperature was raised to 67° C., and while the total pressure during the polymerization was maintained to be constant at 0.65 MPa, stirring was continued at the same temperature for two hours. After completion of the stirring, unreacted propylene was purged to terminate the polymerization. The autoclave was opened, the toluene solution of the polymer was recovered in its entire amount, and the solvent and clay residue were removed to obtain 11 kg of a 13.5 wt % propylene polymer toluene solution (1.5 kg propylene polymer). The weight average molecular weight of the obtained polypropylene was 191,000, and the stereoregularity (mmmm) was 45.8%.

Preparation Example 2-10

Preparation of Maleic Anhydride-Modified Polypropylene

Into a glass flask equipped with a reflux condenser, a thermometer and a stirrer, 650 g of toluene and 350 g of the polypropylene obtained in Preparation Example 2-9 were put, and the interior of the container was replaced with nitrogen gas, and the temperature was raised to 110° C. After raising the temperature, 14 g of maleic anhydride was added, and 4.7 g of t-butylperoxyisopropyl monocarbonate (Perbutyl I, manufactured by NOF Corporation) was added, whereupon stirring was continued at the same temperature for 10 hours to carry out the reaction. After completion of the reaction, the system was cooled to near room temperature, and acetone was added, whereupon the precipitated polymer was collected by filtration. Further, precipitation with acetone and filtration were repeated, and the finally obtained polymer was washed with acetone. The polymer obtained after the washing was dried under reduced pressure to obtain a white powdery modified polymer. The infrared absorption spectrum measurement of this modified polymer was carried out, whereby the content (graft ratio) of maleic anhydride groups was 1.25 wt % (0.125 mmol/g as maleic anhydride groups, and 0.25 mmol/g as calculated as groups represented by —C(=O)O—). Further, the weight average molecular weight was 120,000.

Preparation Example 2-11

Preparation of Maleic Anhydride-Modified Polypropylene

The preparation was carried out in the same manner as in Preparation Example 2-2 except that the amount of maleic anhydride was changed to 28 g, and the amount of t-butylperoxyisopropyl monocarbonate was changed to 9.3 g. The content (graft ratio) of maleic anhydride groups was 2.4 wt % (0.24 mmol/g as maleic anhydride groups, and 0.48 mmol/g as calculated as —C(=O)O— groups). Further, the weight average molecular weight was 100,000.

Preparation Example 2-12

Preparation of Maleic Anhydride-Modified Polypropylene

The preparation was carried out in the same manner as in Preparation Example 2-2 except that the amount of maleic anhydride was changed to 21 g, and the amount of t-butylperoxyisopropyl monocarbonate was changed to 7.0 g. The content (graft ratio) of maleic anhydride groups was 1.6 wt % (0.16 mmol/g as maleic anhydride groups, and 0.32 mmol/g as calculated as —C(=O)O— groups). Further, the weight average molecular weight was 110,000.

Preparation Example 2-13

Preparation of Maleic Anhydride-Modified Polypropylene

The preparation was carried out in the same manner as in Preparation Example 2-10 except that the amount of maleic anhydride was changed to 105 g, and the amount of t-butylperoxyisopropyl monocarbonate was changed to 70 g. The content (graft ratio) of maleic anhydride groups was 5.1 wt % (0.51 mmol/g as maleic anhydride groups, and 1.02 mmol/g as calculated as —C(=O)O— groups). Further, the weight average molecular weight was 68,000.

Preparation Example 2-14

Preparation of Polyalkylene Glycol-Modified Polypropylene Aqueous Dispersion

Into a glass flask equipped with a reflux condenser, a thermometer and a stirrer, 30 g of the maleic anhydride-modified polypropylene obtained in Preparation Example 2-10 (content of maleic anhydride groups: 3.75 mmol) and 60 g of toluene were added and completely dissolved by raising the temperature to 110° C. Then, a solution having 7.5 g of Jeffamine M-1000 (7.5 mmol, corresponding to 25 parts by weight of the hydrophilic polymer (IB) per 100 parts by weight of the propylene polymer (IA)) dissolved in 10 g of toluene, was added and reacted at 110° C. for 3 hours.

After cooling, toluene was distilled off under reduced pressure to obtain 37 g of the yellow polymer. The infrared absorption analysis of the obtained product was carried out, whereby it was observed that a peak corresponding to maleic anhydride in the vicinity of 1,784 cm$^{-1}$ was extinct, and the maleic anhydride-modified polypropylene and the polyether amine were completely bonded. It is in the form of a graft copolymer having the polyether amine graft-bonded to the maleic anhydride-modified polypropylene.

To 25 g of the obtained yellow polymer, 75 g of THF was added, and the polymer was completely dissolved at 60° C. At the same temperature, 84 g of pure water was dropwise added thereto over a period of one hour, to obtain a hazy yellow solution. This solution was cooled to 40° C., and by lowering the reduced pressure degree gradually from a reduced pressure degree of 0.03 MPa to 0.0045 MPa, distillation under reduced pressure was carried out until the concentration became 25 wt %, to obtain a translucent slightly yellow resin dispersion. It is considered that the dispersed particle sizes are so fine that the dispersion looks translucent.

The dispersed particle sizes were measured, whereby the 50% particle diameter was 0.068 μm.

Preparation Example 2-15

Preparation of Polyalkylene Glycol-Modified Polypropylene Aqueous Dispersion 44 g of a yellow polymer was obtained in the same manner as in Preparation Example 2-14 except that as the maleic anhydride-modified polypropylene, 30 g of maleic anhydride-modified polypropylene obtained in Preparation Example 2-11 (content of maleic anhydride groups: 7.2 mmol) was used, and 14.4 g of Jeffamine M-1000 (14.4 mmol, corresponding to 48 parts by weight of the hydrophilic polymer (IB) per 100 parts by weight of the propylene polymer (IA)) was used. It is in the form of a graft copolymer having the polyether amine graft-bonded to the maleic anhydride-modified polypropylene.

To 20 g of the obtained yellow polymer, 80 g of THF was added, and the polymer was completely dissolved at 60° C. At the same temperature, 100 g of pure water was dropwise added thereto over a period of one hour, to obtain a yellow solution. This solution was cooled to 40° C., and by lowering the reduced pressure degree gradually from a reduced pressure degree of 0.03 MPa to 0.0045 MPa, distillation under reduced pressure was carried out until the concentration became 20 wt %, to obtain a transparent yellow resin dispersion. It is considered that the dispersed particle sizes are so fine that the dispersion looks almost transparent.

The dispersed particle sizes were measured, whereby the 50% particle diameter was 0.011 μm.

Preparation Example 2-16

Preparation of Polyalkylene Glycol-Modified Polypropylene Aqueous Dispersion

Into a glass flask equipped with a reflux condenser, a thermometer and a stirrer, 30 g of the maleic anhydride-modified polypropylene obtained in Preparation Example 2-2 (content of maleic anhydride groups: 4.8 mmol) and 70 g of toluene were added and completely dissolved by raising the temperature to 110° C. Then, a solution having 4.5 g of Jeffamine M-1000 (4.5 mmol, corresponding to 15 parts by weight of the hydrophilic polymer (IB) per 100 parts by weight of the propylene polymer (IA)) dissolved in 4.5 g of toluene, was added and reacted at 110° C. for one hour. Then, 0.4 g (4.5 mmol) of morpholine was added and reacted at 110° C. for one hour.

After cooling, toluene was distilled off under reduced pressure to obtain 34 g of the yellow polymer. The infrared absorption analysis of the obtained product was carried out, whereby it was observed that 90% of a peak corresponding to maleic anhydride in the vicinity of 1,784 cm$^{-1}$ was extinct, and the maleic anhydride-modified polypropylene and the polyether amine were completely bonded. It is in the form of a graft copolymer having the polyether amine graft-bonded to the maleic anhydride-modified polypropylene.

To 25 g of the obtained yellow polymer, 75 g of THF was added, and the polymer was completely dissolved at 60° C. At the same temperature, 84 g of pure water was dropwise added thereto over a period of one hour, to obtain a hazy yellow solution. This solution was cooled to 40° C., and by lowering the reduced pressure degree gradually from a reduced pressure degree of 0.03 MPa to 0.0045 MPa, distillation under reduced pressure was carried out until the concentration became 25 wt %, to obtain a translucent slightly yellow resin dispersion. It is considered that the dispersed particle sizes are so fine that the dispersion looks translucent.

The dispersed particle sizes were measured, whereby the 50% particle diameter was 0.086 μm.

Preparation Example 2-17

Preparation of Polyalkylene Glycol-Modified Polypropylene Aqueous Dispersion 39 g of a yellow polymer was obtained in the same manner as in Preparation Example 2-14 except that instead of the maleic anhydride-modified polypropylene, the maleic anhydride-modified chlorinated polypropylene (manufactured by Toyo Kasei Kogyo Co., Ltd., the content (graft ratio) of maleic anhydride groups was 2.1 wt % (0.21 mmol/g)) was used, and 9 g of Jeffamine M-1000 (9 mmol, corresponding to 30 parts by weight of the hydrophilic polymer (IB) per 100 parts by weight of the propylene polymer (IA)) was used. It is in the form of a graft copolymer having the polyether amine graft-bonded to the maleic anhydride-modified chlorinated polypropylene.

To 25 g of the obtained yellow polymer, 75 g of THF was added, and the polymer was completely dissolved at 60° C. At the same temperature, 100 g of pure water and 0.9 g (10 mmol) of 2-amino-2-methyl-1-propanol were dropwise added thereto over a period of one hour, to obtain a yellow solution. This solution was cooled to 40° C., and by lowering the reduced pressure degree gradually from a reduced pressure degree of 0.03 MPa to 0.0045 MPa, distillation under reduced pressure was carried out until the concentration became 20 wt %, to obtain a transparent yellow resin dispersion. It is considered that the dispersed particle sizes are so fine that the dispersion looks almost transparent.

The dispersed particle sizes were measured, whereby the 50% particle diameter was 0.072 μm.

Preparation Example 2-18

Preparation of Maleic Anhydride-Modified Polypropylene Aqueous Dispersion

Into a glass flask equipped with a reflux condenser, a thermometer and a stirrer, 25 g of the maleic anhydride-modified polypropylene obtained in Preparation Example 2-13 (content of maleic anhydride groups: 12.75 mmol) and 75 g of THF were added and completely dissolved at 60° C. To this solution, 2.3 g (26.0 mmol) of N,N-dimethylethanolamine was dropwise added, and then at the same temperature, 84 g of pure water was dropwise added over one hour, to obtain a hazy yellow solution. This solution was cooled to 40° C., and by lowering the reduced pressure degree gradually from a reduced pressure degree of 0.03 MPa to 0.0045 MPa, distillation under reduced pressure was carried out until the concentration became 25 wt %, to obtain a translucent slightly yellow resin dispersion. It is considered that the dispersed particle sizes are so fine that the dispersion looks translucent.

The dispersed particle sizes were measured, whereby the 50% particle diameter was 0.060 μm.

Preparation Example 2-19

Preparation of Maleic Anhydride-Modified Propylene Polymer

Into a glass flask equipped with a reflux condenser, a thermometer and a stirrer, 650 g of toluene, 175 g of the polypropylene obtained in Preparation Example 2-9 and 175 g of a propylene-1-butene copolymer prepared by means of a metallocene catalyst (Tafmer XM-7070, manufactured by Mitsui Chemicals, Inc., propylene/1-butene=75/25 (molar ratio), the weight average molecular weight Mw: 240,000, Mw/Mn=2.2, melting point: 80° C.) were put, and the interior of the container was replaced with nitrogen gas, and the temperature was raised to 110° C. After raising the temperature, 35 g of maleic anhydride was added, and 17.5 g of t-butylperoxyisopropyl monocarbonate (Perbutyl I, manufactured by NOF Corporation) was added, whereupon stirring was continued at the same temperature for 7 hours. After completion of the reaction, in the same manner as in Preparation Example 2-2, acetone was added, and a precipitated polymer was collected by filtration to obtain a white powdery maleic anhydride-modified polymer. The infrared absorption spectrum measurement of this modified polymer was carried out, whereby the content (graft ratio) of the maleic anhydride groups was 2.0 wt % (0.20 mmol/g as calculated as —C(=O)O— groups).

Preparation Example 2-20

Preparation of Aqueous Dispersion of Polyalkylene Glycol-Modified Propylene Polymer Into a glass flask equipped with a reflux condenser, a thermometer and a stirrer, 30 g of the maleic anhydride-modified propylene polymer prepared in Preparation Example 2-19 and 70 g of toluene were added and completely dissolved by raising the temperature to 110° C. Then, a solution having 6.0 g of Jeffamine M-1000 (corresponding to 20 parts by weight of the hydrophilic polymer (IB) per 100 parts by weight of the propylene polymer (IA)) dissolved in 6.0 g of toluene, was added and reacted at 110° C. for 3 hours. In the same manner as in Preparation Example 2-3, THF was dropwise added thereto, followed by distillation under reduced pressure to obtain a translucent slightly yellow aqueous resin dispersion. The dispersed particle sizes were so fine that the dispersion looked translucent. The dispersed particle sizes were measured, whereby the 50% particle diameter was 0.009 μm, and the 90% particle diameter was 0.011 μm.

Preparation Example 2-21

Preparation of Maleic Anhydride-Modified Propylene Polymer

Into a glass flask equipped with a reflux condenser, a thermometer and a stirrer, 650 g of toluene and 350 g of a propylene-1-butene copolymer prepared by means of a Ziegler Natta catalyst (Tafmer XR-110T, manufactured by Mitsui Chemicals, Inc., propylene/1-butene=76/24 (molar ratio), the weight average molecular weight Mw: 290,000, Mw/Mn=4.1, melting point: 110° C.) were put, and the interior of the container was replaced with nitrogen gas, and the temperature was raised to 110° C. After raising the temperature, 35 g of maleic anhydride was added, and 17.5 g of t-butylperoxyisopropyl monocarbonate (Perbutyl I, manufactured by NOF Corporation) was added, whereupon stirring was continued at the same temperature for 7 hours to carry out the reaction. After completion of the reaction, in the same manner as in Preparation Example 2-2, acetone was added, and a precipitated polymer was collected by filtration to obtain a white powdery maleic anhydride-modified polymer. The infrared absorption spectrum measurement of this modified polymer was carried out, whereby the content (graft ratio) of the maleic anhydride groups was 2.1 wt % (0.21 mmol/g as maleic anhydride groups, and 0.42 mmol/g as calculated as —C(=O)O— groups).

Preparation Example 2-22

Preparation of Aqueous Dispersion of Polyalkylene Glycol-Modified Propylene Polymer Into a glass flask equipped with a reflux condenser, a thermometer and a stirrer, 30 g of the maleic anhydride-modified propylene polymer obtained in Preparation Example 2-21 and 70 g of toluene were added and completely dissolved by raising the temperature to 110° C. Then, a solution having 7.5 g of Jeffamine M-1000 (corresponding to 25 parts by weight of the hydrophilic polymer (IB) per 100 parts by weight of the propylene polymer (IA)) dissolved in 6.0 g of toluene, was added and reacted at 110° C. for 3 hours. In the same manner as in Preparation Example 2-3, THF was dropwise added thereto, followed by distillation under reduced pressure. The average particle diameter of the obtained emulsion was very large at a level of at least 1 μm, and precipitates were substantial, and a good aqueous dispersion was not obtained.

Preparation Example 2-23

Preparation of Aqueous Dispersion of Polypropylene Modified by Non-Hydrophilic Polymer 37 g of a yellow polymer was obtained in the same manner as in Example 2-1 except that to 30 g of the maleic anhydride-modified polypropylene obtained in Preparation 2-10 (content of maleic anhydride groups: 3.75 mmol), 7.5 g of a polyester polyol (P-2010, manufactured by Kuraray Co., Ltd., molecular weight: 2,000 (nominal value)) (3.75 mmol, corresponding to 25 parts by weight per 100 parts by weight of the polyolefin (IA)) and 0.3 g of dimethylbenzylamine were added. It is in the form of a graft copolymer having the polyester polyol graft-bonded to the maleic anhydride-modified polypropylene.

To 20 g of the obtained yellow polymer, 80 g of THF was added, and the polymer was completely dissolved at 60° C. At the same temperature, 100 g of pure water was dropwise added thereto over a period of one hour, whereby the yellow polymer was separated, and no resin dispersion was obtained.

Here, the polyester polyol employed (P-2010, manufactured by Kuraray Co., Ltd.) had an insoluble content of more than 1 wt % when it was dissolved in water at 25° C. at a concentration of 10 wt % and is not a hydrophilic polymer.

Examples 2-7 to 2-12, Comparative Examples 2-10 to 2-12

To 10 g of each of the resin dispersions (solid content concentration: 25 wt %) of Preparation Examples shown in Table 2-3, 10 g of the pigment-dispersed paste (solid content concentration: 50 wt %) of Preparation Example 2-5 and 5.7 g of the aqueous acryl resin dispersion ES-20 were added and mixed to prepare a coating material, and the adhesion, water resistance and GH resistance were evaluated.

However, with respect to Comparative Examples 2-11 and 2-12 (Preparation Examples 2-22 and 2-23), the dispersed state was poor, and it was impossible to carry out a coating test.

The results are shown in Table 2-3. It is evident that the coating materials of Examples 2-7 to 2-12 are excellent in any of the initial adhesion, moisture resistance and GH resistance.

average molecular weight of the obtained polypropylene was 180,000, and the stereoregularity (mmmm) was 47.5%.

Preparation Example 3-2

Preparation of Maleic Anhydride-Modified Polypropylene

Into a glass flask equipped with a reflux condenser, a thermometer and a stirrer, 650 g of toluene and 350 g of the polypropylene obtained in Preparation Example 3-1 were put, and the interior of the container was replaced with nitrogen gas, and the temperature was raised to 110° C. After raising the temperature, 28 g of maleic anhydride was added, and 14 g of t-butylperoxyisopropyl monocarbonate (Perbutyl I, manufactured by NOF Corporation) was added, whereupon stirring was continued at the same temperature for 7 hours to carry out the reaction. After completion of the reaction, the system was cooled to near room temperature, and acetone was added, whereupon the precipitated polymer was collected by filtration. Further, precipitation with acetone and filtration were repeated, and the obtained polymer was washed with acetone. The polymer obtained after the washing was dried under reduced pressure to obtain a white powdery maleic anhydride-modified polymer. The infrared absorption spectrum measurement of this modified polymer was carried out, whereby the content (graft ratio) of maleic anhydride groups was 2.1 wt % (0.21 mmol/g as maleic anhydride groups, and 0.42 mmol/g as reactive groups). Further, the weight average molecular weight was 95,000.

TABLE 2-3

|  | Component (IC) | 50% particle diameter of (IC) | Ratio to (ID) particle diameter | Adhesion-100 | Water resistance | GH resistance |
| --- | --- | --- | --- | --- | --- | --- |
| Ex. 2-7 | Prep. Ex. 2-14 | 0.068 μm | 0.68 | 100/100 | 100/100 | >60 min |
| Ex. 2-8 | Prep. Ex. 2-15 | 0.011 μm | 0.11 | 100/100 | 100/100 | >60 min |
| Ex. 2-9 | Prep. Ex. 2-16 | 0.086 μm | 0.68 | 100/100 | 100/100 | >60 min |
| Ex. 2-10 | Prep. Ex. 2-17 | 0.072 μm | 0.72 | 100/100 | 100/100 | >60 min |
| Ex. 2-11 | Prep. Ex. 2-18 | 0.060 μm | 0.60 | 100/100 | 100/100 | 40 min |
| Ex. 2-12 | Prep. Ex. 2-20 | 0.009 μm | 0.09 | 100/100 | 100/100 | >60 min |
| Comp. Ex. 2-10 | Prep. Ex. 2-4 | 0.25 μm | 2.5 | 24/100 | 16/100 | >60 min |
| Comp. Ex. 2-11 | Prep. Ex. 2-22 | At least 1 μm | Impossible to carry out coating test | | | |
| Comp. Ex. 2-12 | Prep. Ex. 2-23 | Not emulsifiable | Impossible to carry out coating test | | | |

Examples Relating to Third Embodiment

Preparation Example 3-1

Preparation of Polyolefin

In the same manner as in Preparation Example 1-1, a catalyst slurry was obtained.

Then, into an induction stirring type autoclave having an internal capacity of 24 L, 11 L of toluene, 3.5 mmol of triisobutyl aluminum and 2.64 L of liquid propylene were introduced. At room temperature, the above catalyst slurry was introduced in its entire amount, then the temperature was raised to 63° C., and while the total pressure during the polymerization was maintained to be constant at 0.65 MPa, stirring was continued at the same temperature for two hours. After completion of the stirring, unreacted propylene was purged to terminate the polymerization. The autoclave was opened, the toluene solution of the polymer was recovered in its entire amount, and the solvent and clay residue were removed to obtain 11 kg of a 12.8 wt % propylene polymer toluene solution (1.4 kg of propylene polymer). The weight

Preparation Example 3-3

Preparation of Polyalkylene Glycol-Modified Polypropylene

Into a glass flask equipped with a reflux condenser, a thermometer and a stirrer, 30 g of the maleic anhydride-modified polypropylene obtained in Preparation Example 3-2 and 70 g of toluene were added and completely dissolved by raising the temperature to 110° C. Then, a solution having 9 g (9 mmol) of Jeffamine M-1000 dissolved in 9 g of toluene, was added and reacted at 110° C. for 3 hours.

After cooling, toluene was distilled off under reduced pressure to obtain 39 g of a yellow polymer. The infrared absorption analysis of the obtained product was carried out, whereby it was observed that a peak corresponding to maleic anhydride in the vicinity of 1,784 cm$^{-1}$ was extinct, and the maleic anhydride-modified polypropylene and the polyether amine were completely bonded. It is in the form of a graft copolymer having the polyether amine graft-bonded to the maleic anhydride-modified polypropylene.

In the following Examples, the operation was carried out under atmospheric pressure (0.101 MPa) unless otherwise specified.

Example 3-1

To 20 g of the polyalkylene glycol-modified polypropylene obtained in Preparation Example 3-3, 80 g of isobutanol (solubility of water at 20° C., 16.4 wt %) was added, and the polypropylene was completely dissolved at 100° C. Then, the solution was cooled to 65° C., and at the same temperature, 120 g of pure water was dropwise added over one hour to obtain a turbidified solution. The operation up to here was carried out under atmospheric pressure (0.101 MPa).

Then, this liquid was cooled to 40° C., and distillation was initiated under a pressure of 0.02 MPa. Further, by lowering the pressure gradually from 0.02 MPa to 0.004 MPa, isobutanol and water were distilled off until the resin concentration became 25 wt %, to obtain a slightly yellow translucent aqueous resin dispersion. The amount of isobutanol in the dispersion was not more than 5 wt %. The distilled liquid was 140 g.

The dispersed particle sizes were measured, whereby the 50% particle diameter was 0.015 μm, and the 90% particle diameter was 0.021 μm. Further, the distilled liquid was separated into an upper layer of isobutanol layer and a lower layer of water layer, and thus liquid-liquid separation was possible. The results are shown in Table 3-1.

Example 3-2

An aqueous resin dispersion was obtained in the same manner as in Example 3-1 except that isobutanol was changed to n-butanol (solubility of water at 20° C., 20.0 wt %), and the amount of the dropwise added pure water was changed to 200 g. The state before the distillation was a turbified solution like in Example 3-1. The amount of n-butanol in the dispersion was not more than 10 wt %. The distilled liquid was 220 g.

The dispersed particle sizes were measured, whereby the 50% particle diameter was 0.011 μm, and the 90% particle diameter was 0.015 μm. Further, the distilled liquid was separated into an upper layer of n-butanol layer and a lower layer of water layer, and thus liquid-liquid separation was possible.

Comparative Example 3-1

An aqueous resin dispersion was obtained in the same manner as in Example 3-1 except that isobutanol was changed to THF (solubility of water at 20° C.: infinite), and the temperature at the time of dissolution was changed to 65° C. The amount of THF in the dispersion was not more than 5 wt %. The distilled liquid was 140 g.

The dispersed particle sizes were measured, whereby the 50% particle diameter was 0.011 μm, and the 90% particle diameter was 0.014 μm. The distilled layer was uniform layer, and its separation was impossible.

Comparative Example 3-2

This Example was carried out in the same manner as in Example 3-1 except that isobutanol was changed to toluene (solubility of water: 0.05 wt %). As water was dropwise added, the solution became turbid, and finally, a solid substance started to separate. No dispersion was obtained.

Comparative Example 3-3

Into a glass flask equipped with a reflux condenser, a thermometer and a stirrer, 20 g of the maleic anhydride-modified polypropylene obtained in Preparation Example 3-2 and 80 g of toluene were put and completely dissolved by raising the temperature to 110° C. Then, after cooling to 50° C., 5 g of polyoxyethylene cetyl ether (EMULGEN 220, manufactured by Kao Corporation, nonionic surfactant, HLB=14.2) and 5 g of polyoxyethylene lauryl ether (EMULGEN 147, manufactured by Kao Corporation, nonionic surfactant, HLB=16.3) were added and dissolved, followed by cooling to 35° C.

100 g of water was added thereto and thoroughly stirred, and then using an internal shearing type emulsifier Clearmix CLM-0.8S (manufactured by M Technique Co., Ltd.), emulsifying was carried out at 21,000 rpm for 3 minutes. Then, into the system, an aqueous solution having 2-amino-2-methyl-1-propanol diluted with water to 10 wt %, was added, and the pH was adjusted to 8. From this crude emulsified product, toluene and water were distilled off by reducing the reduced pressure degree gradually from a reduced pressure degree of 0.02 MPa to 0.0045 MPa at a temperature of 50° C., to obtain a milky white aqueous resin dispersion having a concentration of 25 wt %. The amount of toluene in the dispersion was not more than 5 wt %.

The dispersed particle sizes were measured, whereby the 50% particle diameter was 0.25 μm, and the 90% particle diameter was 3.1 μm. Further, distilled liquid was separated into an upper layer of toluene layer and a lower layer of water layer, and liquid-liquid separation was possible.

TABLE 3-1

| | Solvent | | Dispersed particle sizes | | Liquid-liquid |
| | Type | Solubility of water at 20° C. | 50% Particle diameter (μm) | 90% Particle diameter (μm) | separation of distilled liquid |
|---|---|---|---|---|---|
| Ex. 3-1 | Isobutanol | 16.4 | 0.015 | 0.021 | ◯ |
| Ex. 3-2 | n-butanol | 20.0 | 0.011 | 0.015 | ◯ |
| Comp. Ex. 3-1 | THF | Infinite | 0.011 | 0.014 | X |
| Comp. Ex. 3-2 | Toluene | 0.05 | No dispersion obtained | | Not distilled |
| Comp. Ex. 3-3 | Toluene (Surfactant used) | 0.05 | 0.25 | 3.1 | ◯ |

Examples Relating to Fourth Embodiment

Preparation Example 4-1

Preparation of Polyolefin

In the same manner as in Preparation Example 1-1, a catalyst slurry was obtained.

Then, into an induction stirring type autoclave having an internal capacity of 24 L, 11 L of toluene, 3.5 mmol of triisobutyl aluminum and 2.64 L of liquid propylene were introduced. At room temperature, the above catalyst slurry was introduced in its entire amount, then the temperature was raised to 63° C., and while the total pressure during the polymerization was maintained to be constant at 0.65 MPa, stirring was continued at the same temperature for two hours. After completion of the stirring, unreacted propylene was purged to terminate the polymerization. The autoclave was opened, the toluene solution of the polymer was recovered in its entire amount, and the solvent and clay residue were removed by No. 60 filter paper manufactured by ADVANTEC Company, to obtain 11 kg of a 11.5 wt % propylene polymer toluene solution (1.26 kg of propylene polymer). The weight average molecular weight of the obtained polypropylene was 197,000, and the stereoregularity (mmmm) was 46.2%.

Preparation Example 4-2

Preparation of Maleic Anhydride-Modified Polypropylene

A reflux condenser, a thermometer and a stirrer were attached to a 5 L glass flask equipped with a bottom-discharge cock and an oil-circulation jacket, and 3.04 kg of the toluene solution of the polypropylene obtained in Preparation Example 4-1 was put, and the temperature was raised to 60° C., and the pressure was gradually reduced to 0.06 MPa to remove 2.04 kg of toluene, whereupon nitrogen was introduced to return the pressure to normal pressure to obtain 1 kg of a toluene solution containing 35 wt % of the polypropylene.

The interior of the container was replaced with nitrogen gas, and the temperature was raised to 110° C., then 21 g of maleic anhydride was added, and 7 g of t-butylperoxyisopropyl monocarbonate (Perbutyl I, manufactured by NOF Corporation) was added, whereupon stirring was continued at the same temperature for 10 hours to carry out the reaction. By the infrared absorption spectrum analysis, it was observed that the absorption by the double bond of maleic anhydride in the vicinity of 830 cm$^{-1}$ was extinct upon expiration of 10 hours, and all such double bonds were reacted. Further, a part of the reaction solution was sampled, and acetone was added for precipitation, and further, precipitation with acetone and filtration were repeated to remove the unreacted and by-products to obtain a maleic anhydride-modified polymer. The infrared absorption spectrum measurement of this modified polymer was carried out, whereby the content (graft ratio) of maleic anhydride groups was 1.5 wt % (0.15 mmol/g as maleic anhydride groups, and 0.30 mmol/g as reactive groups). Further, the weight average molecular weight was 110,000.

After completion of the reaction, 0.4 kg of toluene was added, followed by cooling to bring the liquid temperature to 60° C.

2.1 kg of warm water of 60° C. was added thereto, and the mixture was stirred for 30 minutes at a rotational speed of 300 rpm and then left to stand for 10 minutes, whereby it was separated into an upper layer of toluene layer and a lower layer of water layer, and from the bottom discharge cock, water was withdrawn (water washing step). This water washing step was further repeated four times, whereby a total of 9.9 kg of acidic waste water (94% recovery) was withdrawn. Then, using a Dean-Stark dehydration apparatus, dehydration operation was carried out at a jacket temperature of 140° C. Further, when the internal temperature became 113° C., the dehydration operation was carried out for 3 hours. Then, 230 g of toluene was distilled off to obtain 1,170 g of a toluene solution of the maleic anhydride-modified polypropylene (30 wt %).

Preparation Example 4-3

Preparation of Polyalkylene Glycol-Modified Polypropylene

Into a glass flask equipped with a reflux condenser, a thermometer and a stirrer, 500 g (solid content: 150 g) of the toluene solution of the maleic anhydride-modified polypropylene obtained in Preparation Example 4-2 was added, and the temperature was raised to 110° C. Then, a solution having 45 g (45 mmol) of Jeffamine M-1000 dissolved in 45 g of toluene, was added and reacted at 110° C. for 3 hours.

A small amount of the reaction product was taken, and toluene was distilled off under reduced pressure to obtain a sample, and with respect to the sample, the infrared absorption spectrum analysis was carried out, whereby it was observed that a peak corresponding to maleic anhydride in the vicinity of 1,784 cm$^{-1}$ was extinct, and the maleic anhydride-modified polypropylene and the polyether amine were completely bonded. It is in the form of a graft copolymer having the polyether amine graft-bonded to the maleic anhydride-modified polypropylene.

Preparation Example 4-4

Preparation of Polyalkylene Glycol-Modified Polypropylene

Into a glass flask equipped with a reflux condenser, a thermometer and a stirrer, 500 g (solid content: 150 g) of the toluene solution of the maleic anhydride-modified polypropylene obtained in Preparation Example 4-2 was added, and the temperature was raised to 110° C. Then, a solution having 30 g (30 mmol) of Jeffamine M-1000 dissolved in 30 g of toluene, was added and reacted at 110° C. for one hour. Further, 2.6 g (30 mmol) of morpholine was added and reacted at 110° C. for one hour.

A small amount of the reaction product was taken, and toluene was distilled off under reduced pressure to obtain a sample, and with respect to the sample, the infrared absorption spectrum analysis was carried out, whereby it was observed that 90% of a peak corresponding to maleic anhydride in the vicinity of 1,784 cm$^{-1}$ was extinct, and the maleic anhydride-modified polypropylene and the polyether amine were completely bonded. It is in the form of a graft copolymer having the polyether amine graft-bonded to the maleic anhydride-modified polypropylene.

In the following Examples, operations were carried out under atmospheric pressure (0.101 MPa) unless otherwise specified.

Example 4-1

While 100 g of the toluene solution (solid content: 33 wt %) of the polyalkylene glycol-modified polypropylene obtained in Preparation Example 4-3 was heated to 60° C. and stirred, a mixed liquid comprising 120 g of isopropanol (solubility of water at 20° C.: infinite) and 30 g of water, was dropwise added over one hour at 65° C. A slightly yellow hazy liquid was obtained. Further, a mixed liquid comprising 30 g of isopropanol and 160 g of water was dropwise added over one hour, while the internal temperature was maintained to be 65°

C., to obtain a translucent yellow liquid. Here, the solubility of water in toluene at 20° C. is 0.05 wt %.

Then, this liquid was cooled to 40° C., and distillation was initiated under a pressure of 0.02 MPa. Further, by lowering the pressure gradually from 0.02 MPa to 0.004 MPa, toluene, isopropanol and water were distilled off until the resin concentration became 25 wt %, to obtain a slightly yellow translucent aqueous resin dispersion. The total amount of toluene and isopropanol in the dispersion was not more than 5 wt %. The distilled liquid was 308 g.

The dispersed particle sizes were measured, whereby the 50% particle diameter was 0.028 μm, and the 90% particle diameter was 0.046 μm. The results are shown in Table 4-1.

Example 4-2

While 100 g of the toluene solution (solid content: 33 wt %) of the polyalkylene glycol-modified polypropylene obtained in Preparation Example 4-3 was heated to 60° C. and stirred, a mixed liquid comprising 120 g of isopropanol (solubility of water at 20° C.: infinite) and 30 g of water, was dropwise added over one hour at 65° C. A slightly yellow hazy liquid was obtained. Then, this liquid was cooled to 45° C., and distillation was initiated under a pressure of 0.02 MPa. Further, by lowering the pressure gradually from 0.02 MPa to 0.008 MPa, toluene, isopropanol and water were distilled off in a total amount of 160 g until the resin concentration became 33 wt %.

Then, a mixed liquid comprising 18 g of isopropanol and 162 g of water was dropwise added for one hour at 65° C. to obtain a translucent yellow solution. Then, this solution was cooled to 45° C., and distillation was initiated under a pressure of 0.02 MPa. Further, by lowering the pressure gradually from 0.02 MPa to 0.004 MPa, toluene, isopropanol and water were distilled off until the resin concentration became 25 wt %, to obtain a slightly yellow translucent aqueous resin dispersion.

The distilled water was 148 g. The total amount of toluene and isopropanol in the dispersion was not more than 5 wt %.

The dispersed particle sizes were measured, whereby the 50% particle diameter was 0.030 μm, and the 90% particle diameter was 0.049 μm.

Example 4-3

An aqueous resin dispersion was obtained in the same manner as in Example 4-1 except that the toluene solution (solid content: 33 wt %) of the polyalkylene glycol-modified polypropylene obtained in Preparation Example 4-4 was used. The total amount of toluene and isopropanol in the dispersion was not more than 5 wt %.

The dispersed particle sizes were measured, whereby the 50% particle diameter was 0.048 μm, and the 90% particle diameter was 0.079 μm.

Example 4-4

An aqueous resin dispersion was obtained in the same manner as in Example 4-2 except that the toluene solution (solid content: 33 wt %) of the polyalkylene glycol-modified polypropylene obtained in Preparation Example 4-4 was used. The total amount of toluene and isopropanol in the dispersion was not more than 5 wt %.

The dispersed particle sizes were measured, whereby the 50% particle diameter was 0.055 μm, and the 90% particle diameter was 0.088 μm.

Comparative Example 4-1

Into a glass flask equipped with a reflux condenser, a thermometer and a stirrer, 60 g (solid content: 18 g) of the toluene solution of the maleic anhydride-modified polypropylene obtained in Preparation Example 4-2 and 40 g of toluene were added, and the temperature was raised to 50° C. Then, 5 g of a polyoxyethylene cetyl ether (EMULGEN 220, manufactured by Kao Corporation, nonionic surfactant, HLB=14.2) and 5 g of a polyoxyethylene lauryl ether (EMULGEN 147, manufactured by Kao Corporation, nonionic surfactant, HLB=16.3) were added and dissolved, followed by cooling to 35° C.

100 g of water was added thereto and thoroughly stirred, and then using an internal shearing type emulsifier Clearmix CLM-0.8S (manufactured by M Technique Co., Ltd.), emulsifying was carried out at 21,000 rpm for 3 minutes. Then, into the system, an aqueous solution having 2-amino-2-methyl-1-propanol diluted with water to 10 wt %, was added, and the pH was adjusted to 8. From this crude emulsified product, toluene and water were distilled off by reducing the reduced pressure degree gradually from a reduced pressure degree of 0.02 MPa to 0.0045 MPa at a temperature of 50° C., to obtain a milky white aqueous resin dispersion having a concentration of 25 wt %. The amount of toluene in the dispersion was not more than 5 wt %.

The dispersed particle sizes were measured, whereby the 50% particle diameter was 0.4 μm, and the 90% particle diameter was 5 μm.

TABLE 4-1

|  | Dispersed particle sizes | |
| --- | --- | --- |
|  | 50% Particle diameter (μm) | 90% Particle diameter (μm) |
| Ex. 4-1 | 0.028 | 0.046 |
| Ex. 4-2 | 0.030 | 0.049 |
| Ex. 4-3 | 0.048 | 0.079 |
| Ex. 4-4 | 0.055 | 0.088 |
| Comp. Ex. 4-1 | 0.4 | 5 |

The entire disclosures of Japanese Patent Application No. 2005-164597 filed on Jun. 3, 2005, Japanese Patent Application No. 2005-199454 filed on Jul. 7, 2005, Japanese Patent Application No. 2006-039898 filed on Feb. 16, 2006 and Japanese Patent Application No. 2006-092591 filed on Mar. 29, 2006 including specifications, claims, drawings and summaries are incorporated herein by reference in their entireties.

The invention claimed is:

1. An aqueous resin dispersion having dispersed in water a polymer (C) having a hydrophilic polymer (B) bonded to a polyolefin (A) in a ratio of (A):(B)=100:5 to 100:500 (weight ratio), wherein
the polymer (C) is a graft copolymer having the hydrophilic polymer (B) graft-bonded to the polyolefin (A),
the polyolefin (A) is a stereo-block polypropylene polymer having isotactic blocks and atactic blocks and having a propylene content of at least 50 mol%, and/or a propylene-butene copolymer having a butene content of from 15 to 50 mol%, which copolymer may include ethylene in an amount of at most 5 mol%, and
the hydrophilic polymer (B) is a polyether resin.

2. The aqueous resin dispersion according to claim 1, wherein the polymer (C) is dispersed in water with its 50% particle diameter of at most 0.5 μm.

3. The aqueous resin dispersion according to claim 1, wherein the polymer (C) is dispersed in water with its 50% particle diameter of at most 0.2 μm.

4. The aqueous resin dispersion according to claim 1, wherein the polyolefin (A) contains substantially no chlorine.

5. The aqueous resin dispersion according to claim 1, wherein the hydrophilic polymer (B) is bonded in an amount of from 0.01 to 5 mmol per 1 g of the polyolefin (A).

6. The aqueous resin dispersion according to claim 1, wherein the polyolefin (A) has at least one member selected from the group consisting of a carboxylic acid group, a dicarboxylic anhydride group and a dicarboxylic anhydride monoester group.

7. The aqueous resin dispersion according to claim 1, wherein the hydrophilic polymer (B) has at least one reactive group per molecule.

8. The aqueous resin dispersion according to claim 7, wherein the hydrophilic polymer (B) has at least an amino group as the reactive group.

9. A coating material made of the aqueous resin dispersion as defined in claim 1.

10. A laminate having formed on a thermoplastic resin-molded product (F) a layer comprising a polymer (C) having a hydrophilic polymer (B) bonded to a polyolefin (A) in a ratio of (A):(B)=100:5 to 100:500 (weight ratio), wherein
the polymer (C) is a graft copolymer having the hydrophilic polymer (B) graft-bonded to the polyolefin (A),
the polyolefin (A) is a stereo-block polypropylene polymer having isotactic blocks and atactic blocks and having a propylene content of at least 50 mol%, and/or a propylene-butene copolymer having a butene content of from 15 to 50 mol%, which copolymer may include ethylene in an amount of at most 5 mol%, and
the hydrophilic polymer (B) is a polyether resin.

11. A laminate having a resin layer formed by applying and heating the aqueous resin dispersion as defined in claim 1, on a thermoplastic resin-molded product (F).

12. A method for producing a laminate, which comprises forming a resin layer by applying and heating the aqueous resin dispersion as defined in claim 1, on a thermoplastic resin-molded product (F).

* * * * *